(12) United States Patent  (10) Patent No.: US 7,990,840 B2
Laroia et al.  (45) Date of Patent: Aug. 2, 2011

(54) METHODS AND APPARATUS FOR EFFICIENT DIGITAL BROADCAST SIGNALING IN A WIRELESS COMMUNICATIONS SYSTEM

(75) Inventors: Rajiv Laroia, Basking Ridge, NJ (US); Arnab Das, Summit, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1261 days.

(21) Appl. No.: 11/369,899

(22) Filed: Mar. 7, 2006

(65) Prior Publication Data

US 2006/0223520 A1  Oct. 5, 2006

Related U.S. Application Data

(60) Provisional application No. 60/659,509, filed on Mar. 8, 2005, provisional application No. 60/696,847, filed on Jul. 6, 2005, provisional application No. 60/697,865, filed on Jul. 8, 2005.

(51) Int. Cl.
*H04J 11/00* (2006.01)
*H04J 1/00* (2006.01)
*H04W 4/00* (2009.01)

(52) U.S. Cl. ................ 370/208; 370/328; 370/343
(58) Field of Classification Search ........ 370/319, 370/328, 326, 331, 343, 345
See application file for complete search history.

(56) References Cited

U.S. PATENT DOCUMENTS

| 5,838,917 A | 11/1998 | Paolini |
| 5,946,326 A | 8/1999 | Rinne |
| 6,078,412 A | 6/2000 | Fuse et al. |
| 6,314,289 B1 * | 11/2001 | Eberlein et al. ............... 455/427 |
| 6,621,808 B1 * | 9/2003 | Sadri ............................. 370/335 |
| 6,795,407 B2 | 9/2004 | Chesson |
| 7,002,904 B2 | 2/2006 | Jung |
| 7,047,556 B2 | 5/2006 | Cole et al. |
| 7,200,402 B2 | 4/2007 | Apostolopoulos et al. |

(Continued)

FOREIGN PATENT DOCUMENTS

EP  1045541  10/2000

(Continued)

OTHER PUBLICATIONS

WO2004086656, Vare et al. Oct. 7, 2004.*

(Continued)

*Primary Examiner* — Melanie Jagannathan
(74) *Attorney, Agent, or Firm* — Raphael Freiwirth

(57) ABSTRACT

First and second transmitters transmit signals communicating the same information, e.g., program segment, but at different times. Different carriers may, but need not be, used by the different transmitters. If a wireless terminal can not recover broadcast segment information from one carrier, the wireless terminal can switch to another transmitter and recover the information, e.g., on another carrier, since the broadcasts are intentionally offset in time. In some embodiments, the timing is offset such that a single channel receiver is able to recover signals corresponding to the same program segment from two sources, and perform a decoding and information recovery using input from both sources, where recovery using input from a single source is not possible. Symbol level timing synchronization of base stations is not required thereby allowing for simpler implementations and/or lower overhead, as compared to systems which require base stations to be synchronized to the symbol timing level.

25 Claims, 27 Drawing Sheets

U.S. PATENT DOCUMENTS

| | | | |
|---|---|---|---|
| 2002/0187811 A1* | 12/2002 | Gerogiokas | 455/562 |
| 2003/0145038 A1* | 7/2003 | Bin Tariq et al. | 709/202 |
| 2004/0057400 A1 | 3/2004 | Walsh et al. | |
| 2004/0106412 A1 | 6/2004 | Laroia et al. | |
| 2004/0224691 A1 | 11/2004 | Hadad | |

FOREIGN PATENT DOCUMENTS

| | | |
|---|---|---|
| EP | 1 059 594 | 12/2000 |
| JP | 11155167 | 6/1999 |
| JP | 2001257660 | 9/2001 |
| WO | WO 94/30024 | 12/1994 |
| WO | WO03094389 | 11/2003 |

OTHER PUBLICATIONS

International Search Report and Written Opinion of the International Searching Authority from International Application No. PCT/US2006/008028, pp. 1-12, dated Jul. 6, 2006.

International Preliminary Report on Patentability from International Application No. PCT/US2006/008028, pp. 1-8, dated Feb. 1, 2007.

Lawrey Eric, The suitability of OFDM as a modulation technique for wireless telecommunications, with a CDMA comparison, Oct. 1997, James Cook University, p. v.

* cited by examiner

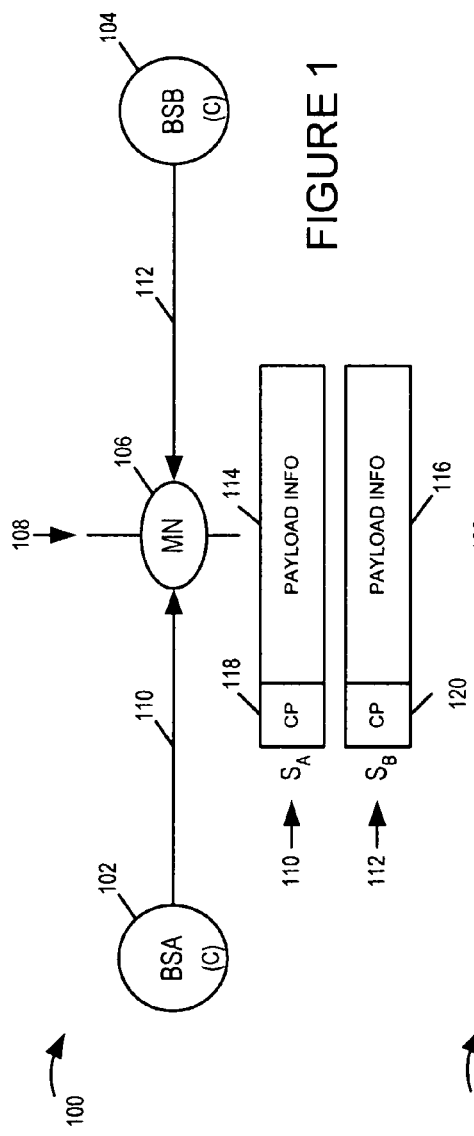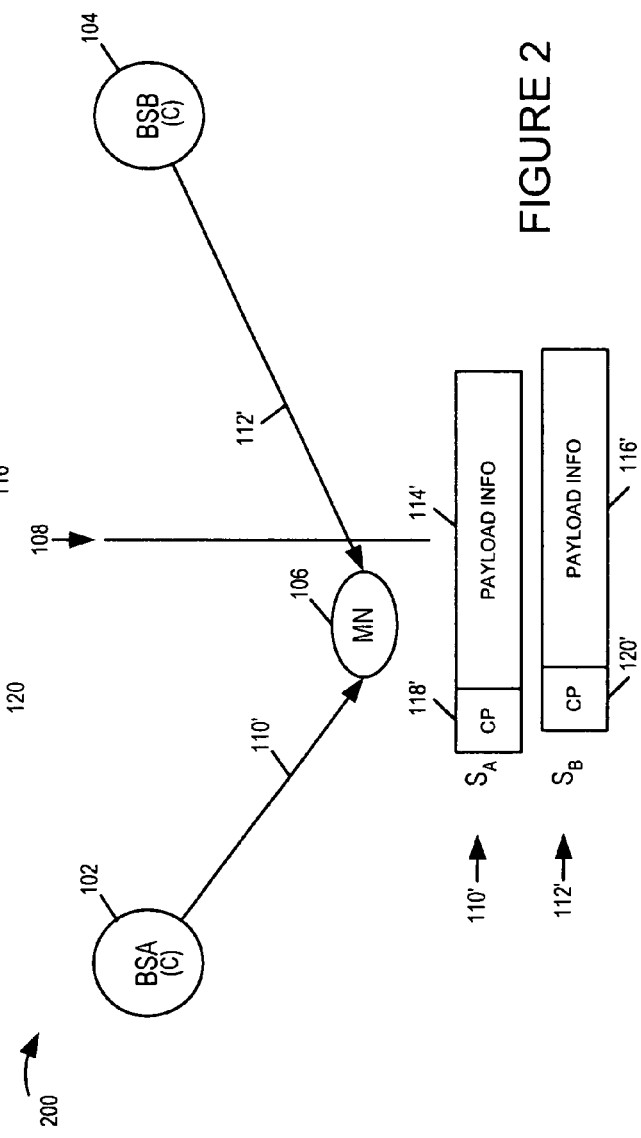

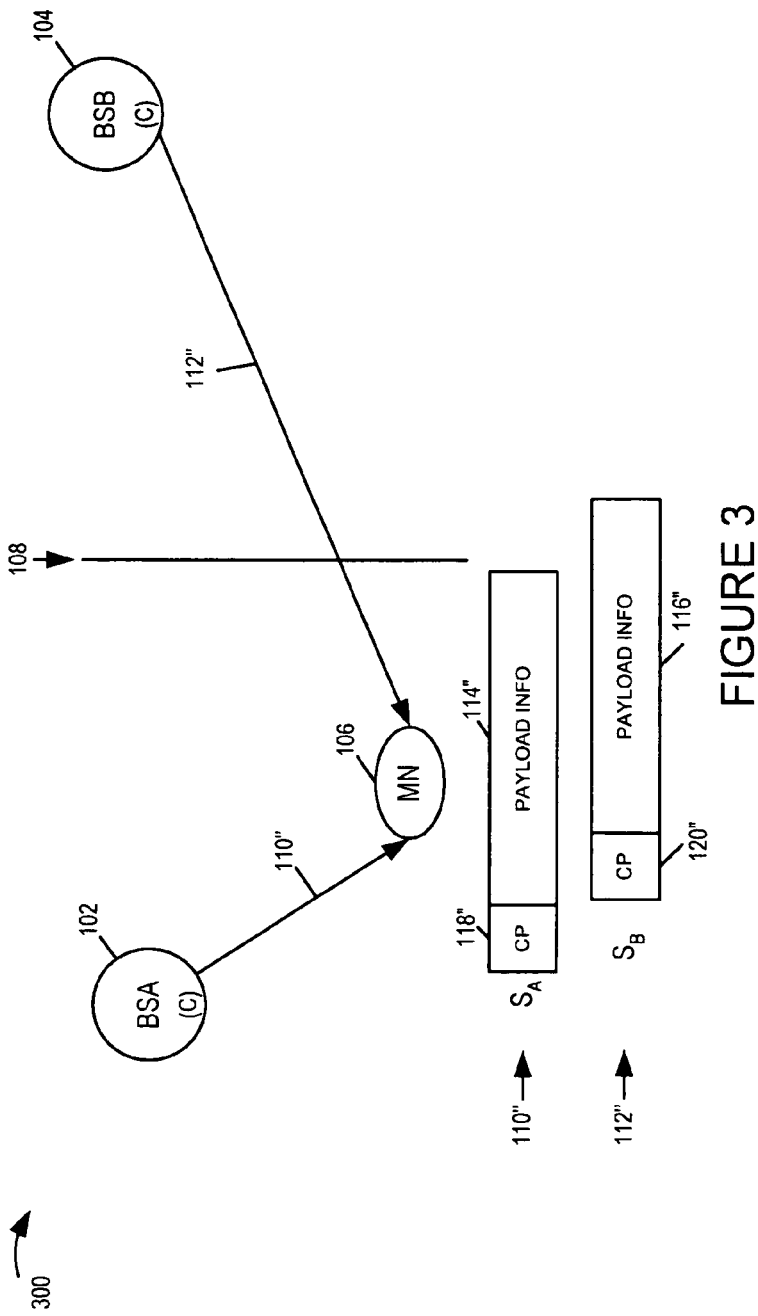
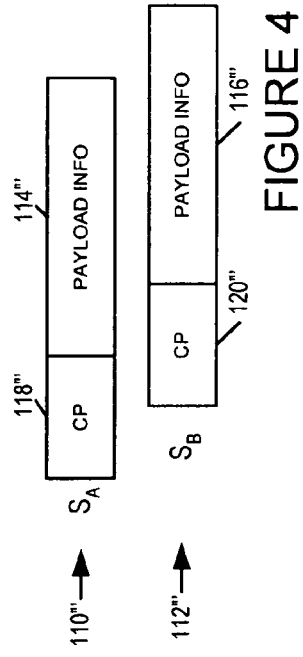
FIGURE 3
FIGURE 4

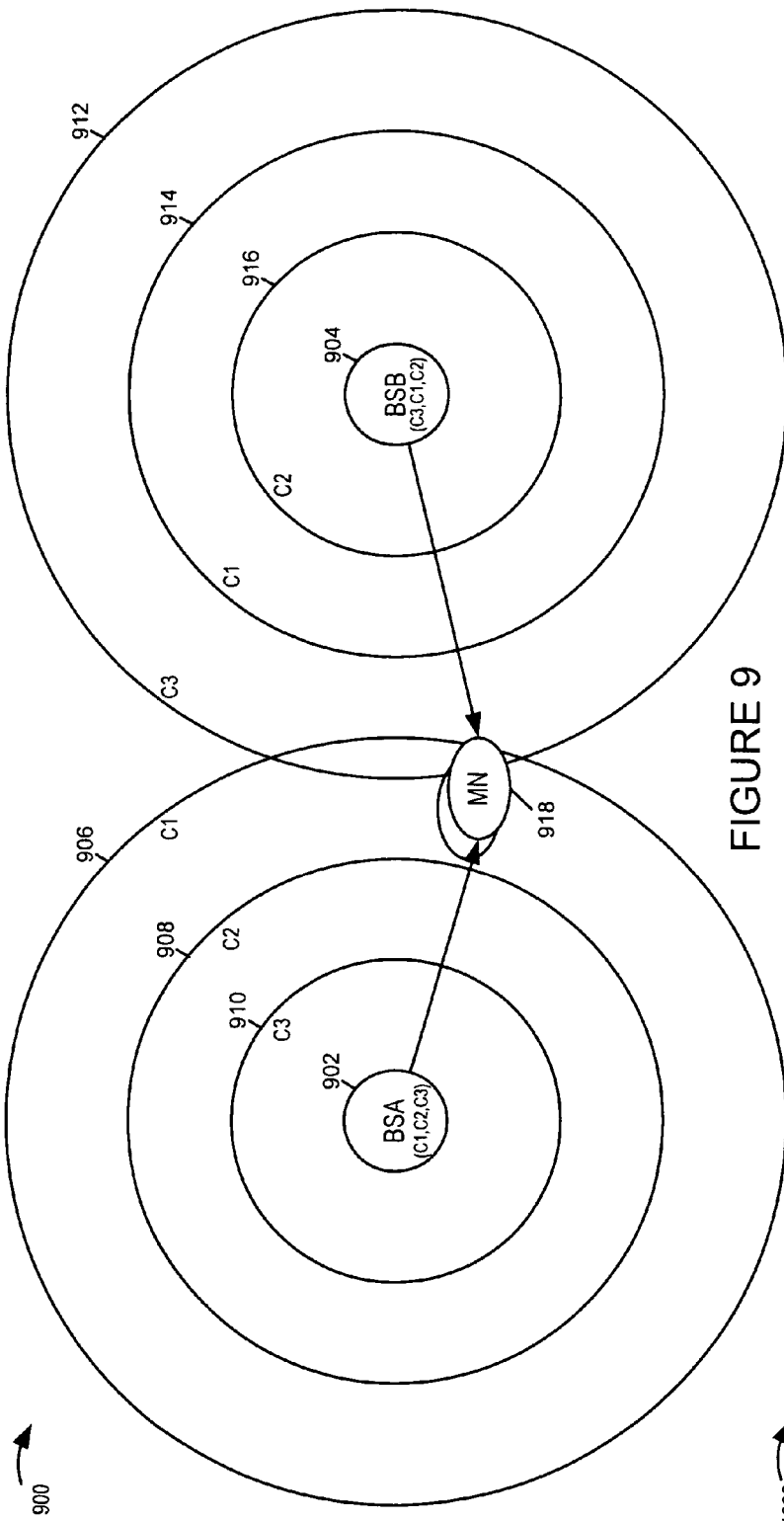
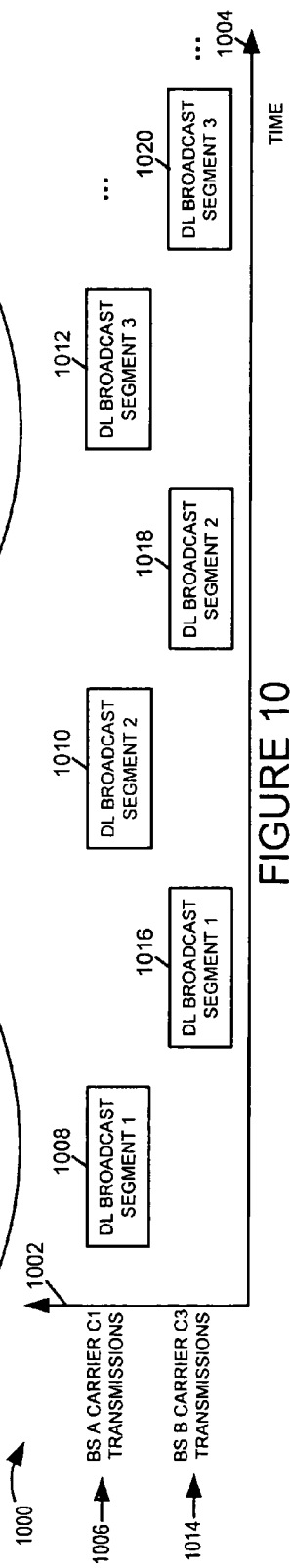
FIGURE 9
FIGURE 10

US 7,990,840 B2

METHODS AND APPARATUS FOR EFFICIENT DIGITAL BROADCAST SIGNALING IN A WIRELESS COMMUNICATIONS SYSTEM

RELATED APPLICATIONS

The present application claims the benefit of U.S. Provisional Patent Application Ser. No. 60/659,509, filed on Mar. 8, 2005, U.S. Provisional Patent Application Ser. No. 60/696, 847, filed on Jul. 6, 2005, and U.S. Provisional Patent Application Ser. No. 60/697,865, filed on Jul. 8, 2005, each of which is titled "METHODS AND APPARATUS FOR EFFICIENT DOWNLINK DIGITAL VIDEO BROADCAST SIGNALING IN AN OFDM WIRELESS COMMUNICATIONS SYSTEM", and all of which are hereby expressly incorporated by reference.

FIELD OF THE INVENTION

The present invention relates to digital broadcasts and, more particularly, to broadcasting the information, e.g., video or audio signals, to multiple users in a region serviced by one or more base stations.

BACKGROUND

In some wireless communications systems, it may be desired to broadcast digital video or other information signals, e.g., radio show broadcasts, to mobile users via a downlink. As mobile nodes move throughout the system, it is desirable that the user of the mobile node be able to receive and decode a continuous or nearly continuous program signal, e.g., a television show to be decoded and displayed in real time. One approach employed is for adjacent base stations in the system to simultaneously broadcast the same signals, with timing synchronization between the base stations' transmitters being controlled to the symbol level. The same information is transmitted at the same time on the same tones by different adjacent base stations. This approach has the disadvantage of requiring a high level of symbol transmission timing synchronization between base stations so that signals received from different base stations do not differ in time by more than a small portion of a symbol transmission time period.

FIG. 1 is a drawing 100 showing an example where two adjacent base stations (BS A 102, BS B 104) transmit the same signal at the same time using a single carrier frequency (C) and the same sub-carrier frequencies, e.g., tones, conveying modulation symbols conveying encoded digital broadcast information bits. In FIG. 1, a mobile node 106 is located equidistant from BS A 102 and BS B 104. With respect to the MN 106, signal A ($S_A$) 110 from BS A 102 arrives at the same time as signal B ($S_B$) 112 from BS B 104, as illustrated by $S_A$ 110 and $S_B$ 112 being aligned in FIG. 1 with respect to line 108, where line 108 represents the equidistance point between the two base stations (102, 104). Distance is used herein to indicate a travel time of a signal from one point to another, e.g., from a base station to a mobile node. Circumstances in the environment, e.g., reflecting objects, could make a signal travel time different from the straight-line distance between points. Distance is used for convenience of illustration. For symbol timing synchronization to be maintained between the signals received from the different base stations, the BSs (102, 104) need to be tightly synchronized and the synchronization level maintained between the base stations. $S_A$ 110 and $S_B$ 112 each include payload information (114, 116), respectively, e.g., a modulation symbol value portion, and a cyclic prefix portion (CP), (118, 120), respectively, used for synchronization. The signals ($S_A$ 110 and $S_B$ 112) combine over the airlink, and the combined signal is received and decoded by the MN 106 recovering the information bits.

FIG. 2 is a drawing 200 illustrating that when the MN 106 is not equidistance from the two BSs (102,104), the received signals ($S_A$ 110', $S_B$ 112') will tend to lose synchronization relative to one another, the amount of synchronization loss being a function of signal path distance differences between the MN and each BS. $S_B$ 112' is delayed with respect to signal $S_A$ 110' from the MNs 106 perspective. The MN 106 may be able to recover received signals in which there is at least some overlap between the cyclic prefixes, e.g., in cases where the signal delay difference between two signals does not exceed the duration of the cyclic prefix. $S_A$ 110' includes payload portion 114' and CP portion 118'; $S_B$ 112' includes payload portion 116' and CP portion 120'. Drawing 200 illustrates partial overlap between CP 118' and CP 120' from the perspective of the MN 106 receiving both signals 110' and 112'.

FIG. 3 is a drawing 300 illustrating an example where the MN 106 is located such that the cyclic prefix 118" from $S_A$ 110" does not overlap with the cyclic prefix 120" from $S_B$ 112", so that $S_A$ 110" interferes with $S_B$ 112" and vice versa. The MN 106 would typically be unable to recover and decode such a broadcast signal due to the degradation in signal quality resulting from this interference. FIG. 4, shows one known approach used to remedy this a problem. The length of the cyclic prefix is increased, thus allowing a larger overlap region. However, the cyclic prefix represents signaling overhead, thus any increase in cyclic prefix length corresponds to a decrease in information bit throughput in the system.

Compare MN 106 received signal timing of FIG. 3 and FIG. 4. In FIG. 3 $S_A$ 110" includes payload information 114" and CP 118", and $S_B$ 112" includes payload information 116" and CP 120". In FIG. 4 $S_A$ 110''' includes payload information 114''' and CP 118''', and $S_B$ 112''' includes payload information 116''' and CP 120'''. Note that CPs (118''' and 120''') are longer in duration than CPs (118" and 120"); however, payload information portions (114''' and 116''') are shorter in duration than payload information portions (114" and 116"). The increase in CP duration represented by FIG. 4 has resulted in an overlap between CPs (118''' and 120''') facilitating the possibility of successful recovery of the payload information; however, this comes at a cost of decrease in payload.

FIG. 5 is a drawing 500 illustrating that exemplary OFDM downlink tones have a tone interspacing. N exemplary downlink tones (tone 1 502, tone 2, 504, tone 3 506, tone 4 508, . . . , tone N−1 510, tone N 512) are shown with tone interspacing delta f 514. One approach that can be used to compensate for lost capacity due to larger cyclic prefix length, is to make the tone spacing smaller than might otherwise have been done, thus fitting more tones into a given frequency band. This approach can pack more information bits into the same frequency capacity assuming that all the tones can still be received reliably. This approach of decreasing tone spacing is bad for mobility, and particularly high velocity mobility users, e.g., a user traveling in a car, bus, or train, since motion can distort the perceived frequency of the signals making it difficult to reliably decode closely spaced tones.

In view of the above discussion, it should be appreciated that known approaches of simulcast broadcasting, e.g., digital video broadcasting, often include some or all of the following undesirable effects: (i) symbol transmission timing synchronization needs to be maintained to within a high degree between different base stations, e.g., within the duration of a cyclic prefix or less; (ii) the cyclic prefix needs to be relatively lengthy resulting in an undesirable amount of overhead, and (iii) the use of narrow tone spacing tends to interfere with reception and processing by mobile devices which can result in insufficient support for mobility. In addition, when channel conditions are not uniform quality may tend to be degraded.

In view of the above discussed problems, there is a need for new methods and apparatus to facilitate downlink broadcasting, e.g., downlink digital video broadcasting, in an OFDM wireless communications system which reduce and/or overcome one or more of the above discussed problems.

SUMMARY

Various embodiments are directed to transmitter apparatus and methods, e.g., methods and apparatus for transmitting broadcast signals such as television, radio, advertisements and/or other programs or information. The methods and apparatus can be implemented using transmitter apparatus, e.g., base stations, that broadcast the same information, e.g., program content, but at different times.

In accordance with one feature of various embodiments, a receiver can receive signals from each of the base stations at different times, and then combine information recovered from the received signals to form a complete program or set of information to be presented to a user.

Various options exist for implementing the receiving and combining features. If a receiver is unable to successfully decode a signal received from a first base station, e.g., a program segment, it may switch to another base station and receive a signal conveying the same information, e.g., program segment. After combining the signals received from different base stations the receiver may be able to successfully decode the combined signal and recover the communicated information, e.g., the broadcast program segment.

In accordance with other combining options, the receiver may receive a signal and decode it from a first transmitter, e.g., first base station and then switch to receiving and decoding signals from another transmitter, e.g., a second base station. The switching may, but need not be, in response to being unable to decode signals from the first base station as the receiver, e.g., wireless terminal, moves away from the first base station and towards the second base station. Because of the time difference between transmissions, a program segment or other information which can not be successfully recovered from one base station may be recovered from the other base station.

Program segments recovered from signals received from different base stations may be combined to form a complete program, e.g., television show, which may be presented to a user of the device receiving the broadcast segments.

The methods and apparatus of various embodiments provide for a wide range of possibilities and the different transmitters which transmit the same information content but at different times may use the same or different carrier frequencies.

While base stations may be timing synchronized to within a cyclic prefix period, various embodiments do not require such a fine degree of synchronization between adjacent base stations. The methods of various embodiments can, and in some embodiments are, used with adjacent base station transmitters which are not timing synchronized to a cyclic prefix duration and may, in some cases, not even be synchronized to within a symbol duration.

While some features are directed to transmitter apparatus other features are directed to receiver apparatus. The transmitters may, but need not be, implemented in base stations. Receiver methods and apparatus may be implemented in wireless terminals, but need not be limited to such devices and may be used in devices which include a wireless receiver in addition to a wired connection to another device or network. Various embodiments are also directed to data storage devices, e.g., memory devices, which store one or more routines which can be used to implement one or more steps as well as circuits, e.g., integrated circuit chips, which can be used to implement one or more modules or apparatus.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 1 is a drawing showing an example where two adjacent base stations transmit the same signal at the same time using a single carrier frequency and the same sub-carrier frequencies, e.g., tones, conveying modulation symbols conveying encoded digital broadcast information bits.

FIG. 2 is a drawing illustrating that when a mobile node is not equidistance from the two base stations, the received signals will tend to lose synchronization relative to one another, the amount of synchronization loss being a function of signal path distance differences between the mobile node and each base station.

FIG. 3 is a drawing illustrating an example where a mobile node is located such that the cyclic prefix of a received first base station downlink signal does not overlap with the cyclic prefix of a received second base station downlink signal, so that received downlink signal from the first base station interferes with the received downlink signal from the second base station and vice versa.

FIG. 4 shows one known approach used to remedy the problem of FIG. 3 in which the length of the cyclic prefix is increased, thus allowing a larger overlap region; however overhead is increased.

FIG. 9 illustrates another exemplary system which is similar to the system of FIG. 6; however, the base station downlink signal timing structure for the FIG. 9 embodiment is slightly different than the timing structure which corresponds to the FIG. 6 embodiment.

FIG. 10, which corresponds to FIG. 9, includes a drawing plotting different base station carrier transmissions vs time.

DETAILED DESCRIPTION

The methods and apparatus of various embodiments can be used to provide broadcast services, e.g., television or audio broadcasts, but can also be used to provide multicast services where a multicast is a particular type of broadcast. Multicast services may be well suited for applications where signals are transmitted with the intention of providing the information to a particular group of users but not everyone.

The methods of various embodiments can be used to support a wide variety of services including, e.g., a pay per view service were paying customers may be provided with sufficient information to decrypt broadcast signals for which they pay for access but not other signals. However, the methods are not limited to such embodiments and can be used where a subscription is not required to be entitled to receive, decode and use broadcast signals.

Figure 5:
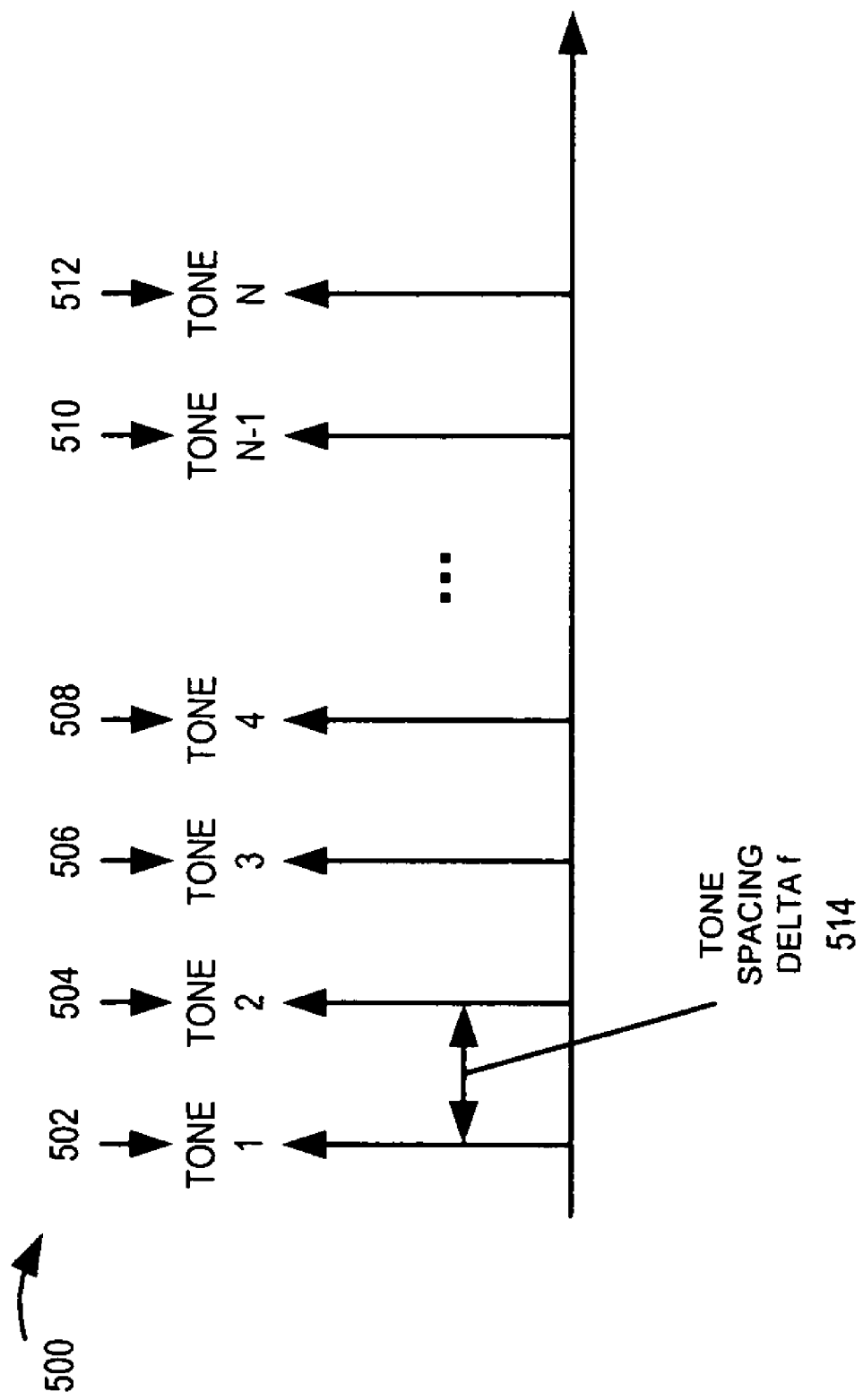
FIG. 5 is a drawing illustrating that exemplary OFDM downlink tones have a tone interspacing.
Figure 6:
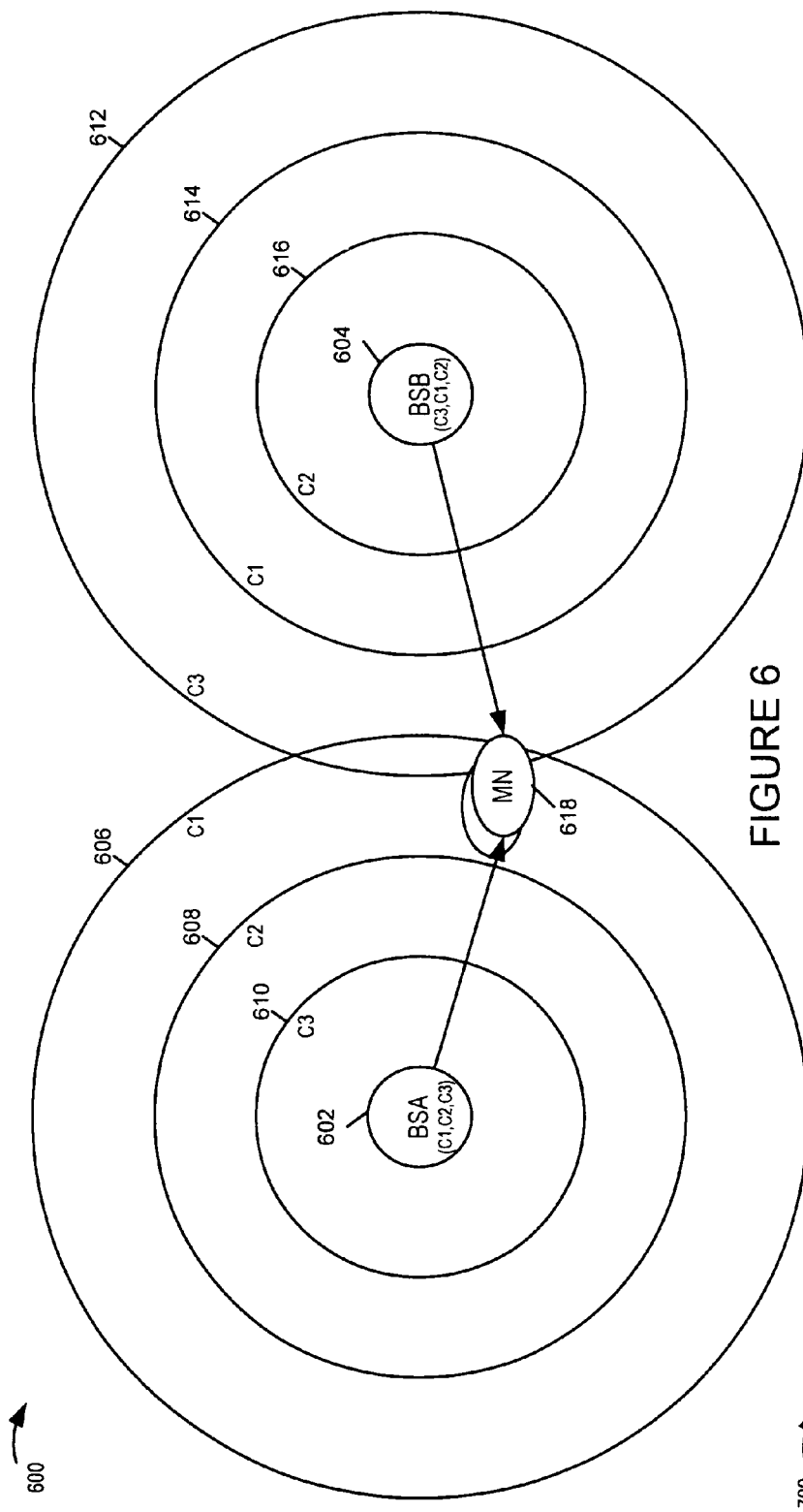
FIG. 6 illustrates an exemplary wireless communications system supporting downlink digital broadcasting, e.g., radio (audio) or video program broadcasts.
Figure 13:
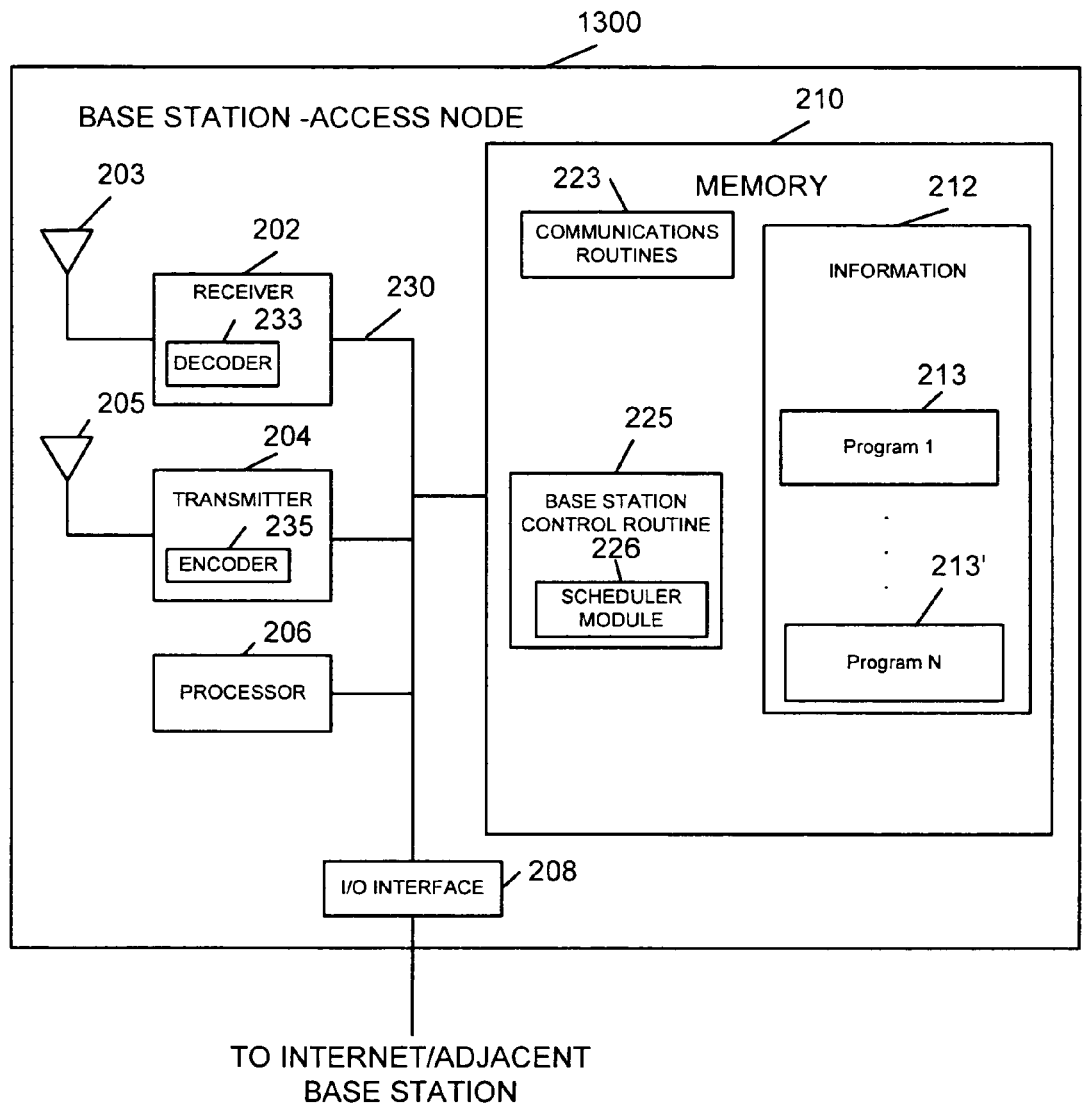
FIG. 13 illustrates an exemplary base station.
Figure 14:
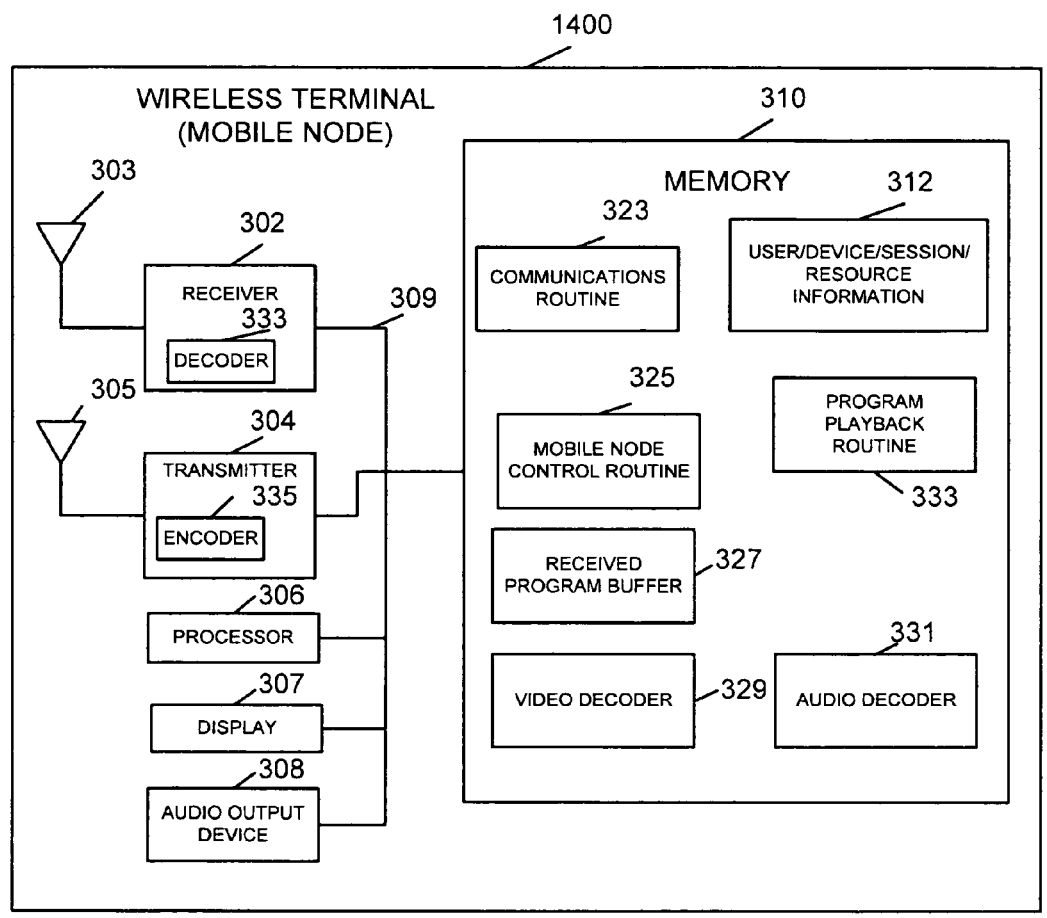
FIG. 14 illustrates an exemplary wireless terminal.
Figure 15:
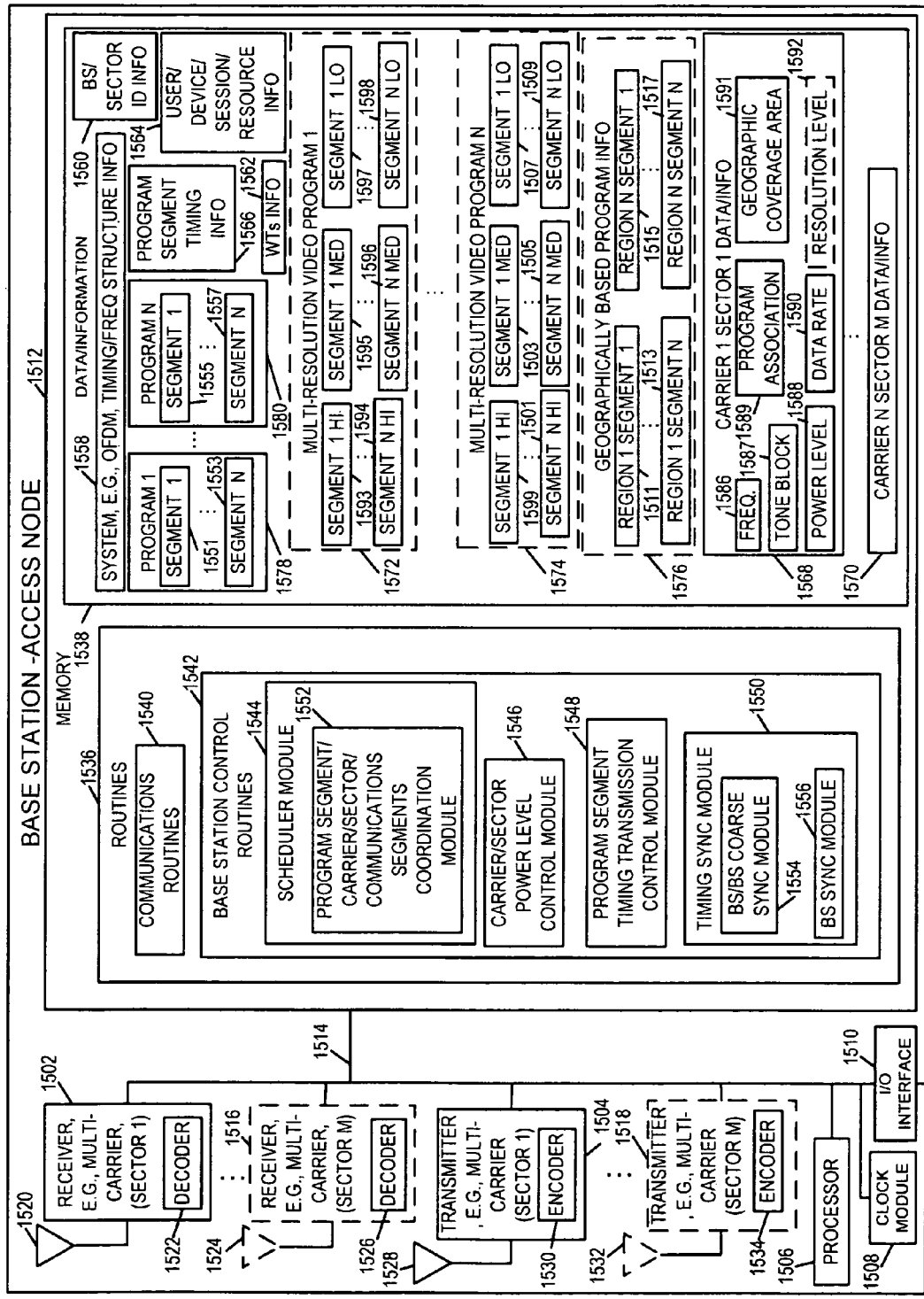
FIG. 15 is a drawing of an exemplary base station.
Figure 16:
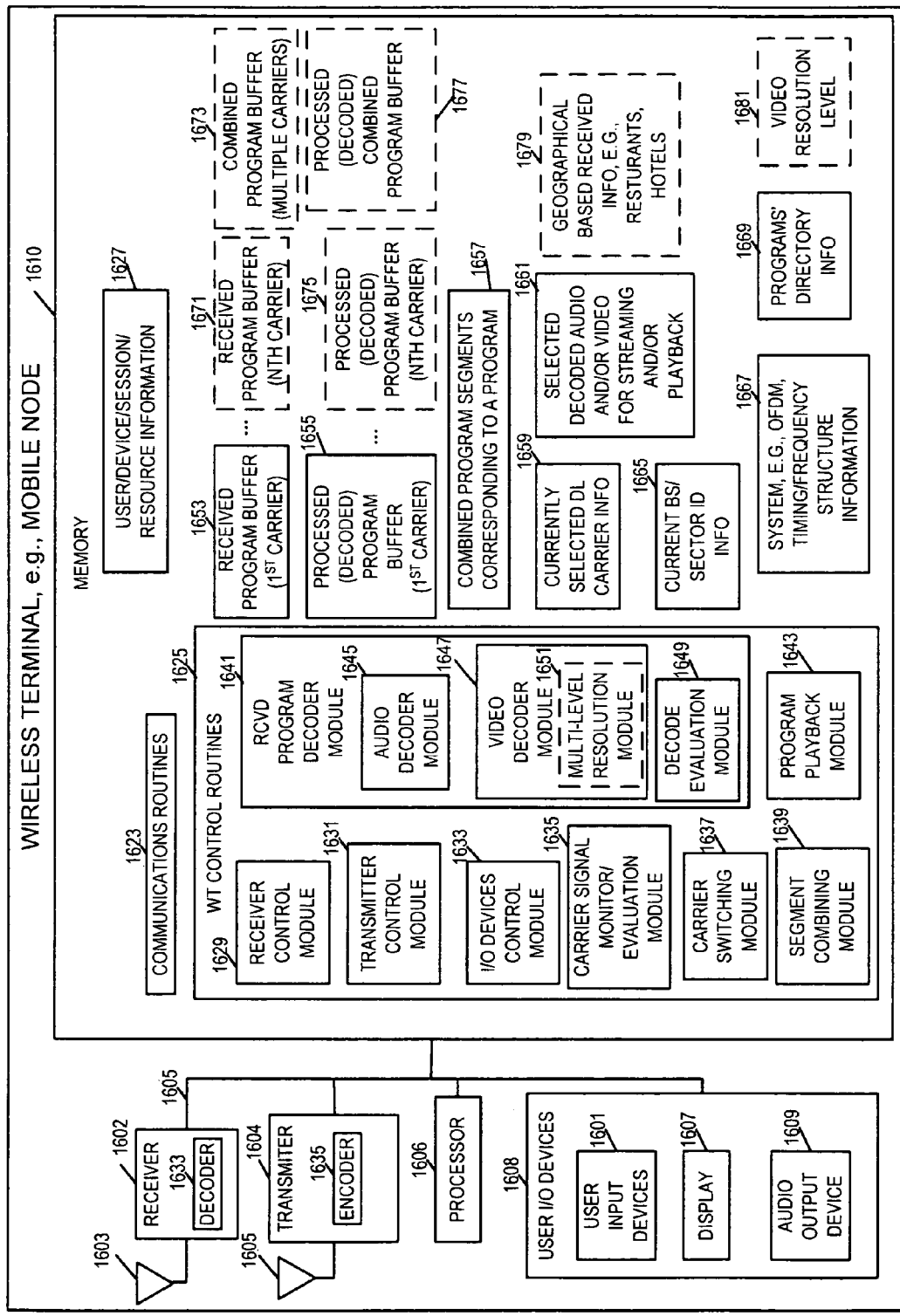
FIG. 16 illustrates an exemplary wireless terminal, e.g., mobile node.

FIG. 6 illustrates a wireless communications system 600 supporting downlink digital broadcasting, e.g., radio (audio) or video program broadcasts. The exemplary system 600 includes a plurality of base stations 602, 604 (BS A, BS B), each base station supporting OFDM signaling on at least two different carrier frequencies, e.g., multiple carrier frequencies C1, C2, C3. In the example of FIG. 6, each base station 602, 604 supports three carriers (C1, C2, C3), with different transmission power levels being associated with, and used for, each carrier, as represented by different size circles surrounding each base station 602, 604. Base station A 602 transmits downlink signals on carriers (C1, C2, C3) at (high, intermediate, low) power levels as indicated by circles (606, 608, 610), respectively. Base station B 604 transmits downlink signals on carriers (C3, C1, C2) at (high, intermediate, low) power levels as indicated by circles (612, 614, 616), respectively. Adjacent base stations 602, 604 use a different ordering of power levels associated with carriers so that the adjacent base stations normally do not use the same power level for the same carrier. Thus, while adjacent base stations 602, 604 may use the same carriers C1 and C3, they will use different power levels on the carriers C1, C3. Another common carrier, e.g., C2, when used, may be transmitted at the same power level by each BS 602, 604 or at different power levels at each BS. The exemplary system 600 also includes a plurality of wireless terminals, e.g., mobile nodes. Exemplary MN 618 is shown in system 600, and exemplary MN 618 may be moving. FIG. 13 and FIG. 15 illustrate exemplary base stations (1300, 1500). FIG. 14 and FIG. 16 illustrate exemplary wireless terminals (1400, 1600).

Figure 7:
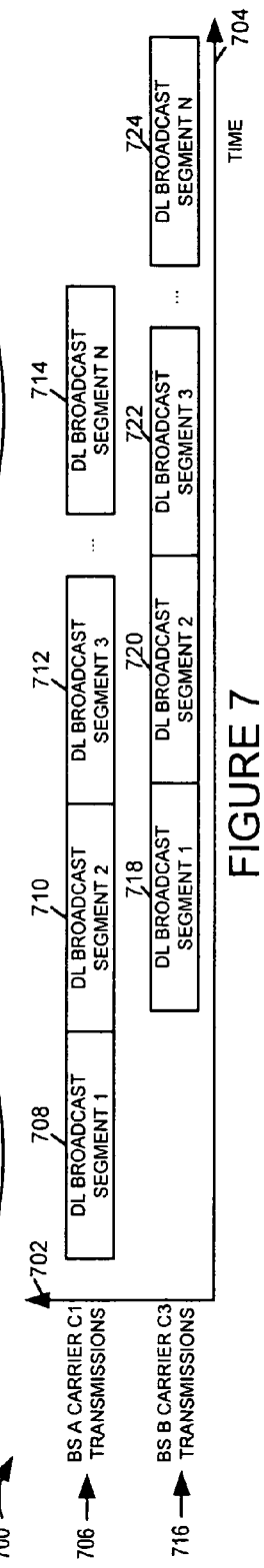
FIG. 7, which corresponds to FIG. 6, includes a drawing plotting different base station carrier transmissions vs time.

Two different carriers, e.g., C1 and C3, from two different adjacent base stations 602, 604 convey the same broadcast information, but at different times. A downlink broadcast segment may be, e.g., approximately 20 ms in length. The two adjacent base stations are not tightly synchronized to a symbol level, but rather a very coarse level of synchronization exists between the base stations, e.g., synchronization exists at a level which is normally outside the cyclic prefix used to transmit symbols and the BSs 602, 604 may not even be synchronized to within a symbol transmission time period. FIG. 7 includes a drawing 700 plotting different BS carrier transmissions on vertical axis 702 vs time on horizontal axis 704. Drawing 700 includes a sequence of exemplary BS A carrier C1 downlink broadcast transmission segments 706 (segment 1 708, segment 2, 710, segment 3 712, . . . , segment N 714) and a sequence of exemplary BS B carrier C3 downlink broadcast transmission segments 716 (segment 1 718, segment 2, 720, segment 3 722, . . . , segment N 724). FIG. 7 illustrates exemplary transmission timing of segments (708, 710, 712, . . . , 714) from BS A using carrier frequency C1 and exemplary transmission timing of segments (718, 720, 722, . . . , 724) from BS B using carrier frequency C3. The same information is conveyed from the different BSs, but at different times and using different carriers, C1 and C3, respectively. For example, downlink broadcast segment 1 708 transmitted by BS A 602 using carrier C1 conveys the same information as downlink broadcast segment 1 718 transmitted by BS B 604 using carrier C3; however, the two segments are offset in time. In some embodiments, the two segments conveying the same information are offset in time by more than a segment duration. In some embodiments, the difference in time, between the end of transmission for a segment from a first base station, e.g., the end of transmission of DL broadcast segment 1 708, and the start of transmission of the corresponding segment from an adjacent base station, e.g., the start of DL broadcast segment 1 718, may be, e.g., less than one segment interval apart, but one or several, e.g., 2, 3, 10 or more, symbol transmission time periods apart. In some embodiments, the two segments conveying the same information are offset in time by less than a segment duration, but one or several, e.g., 2, 3, 10 or more, symbol transmission time periods apart.

Figure 8:
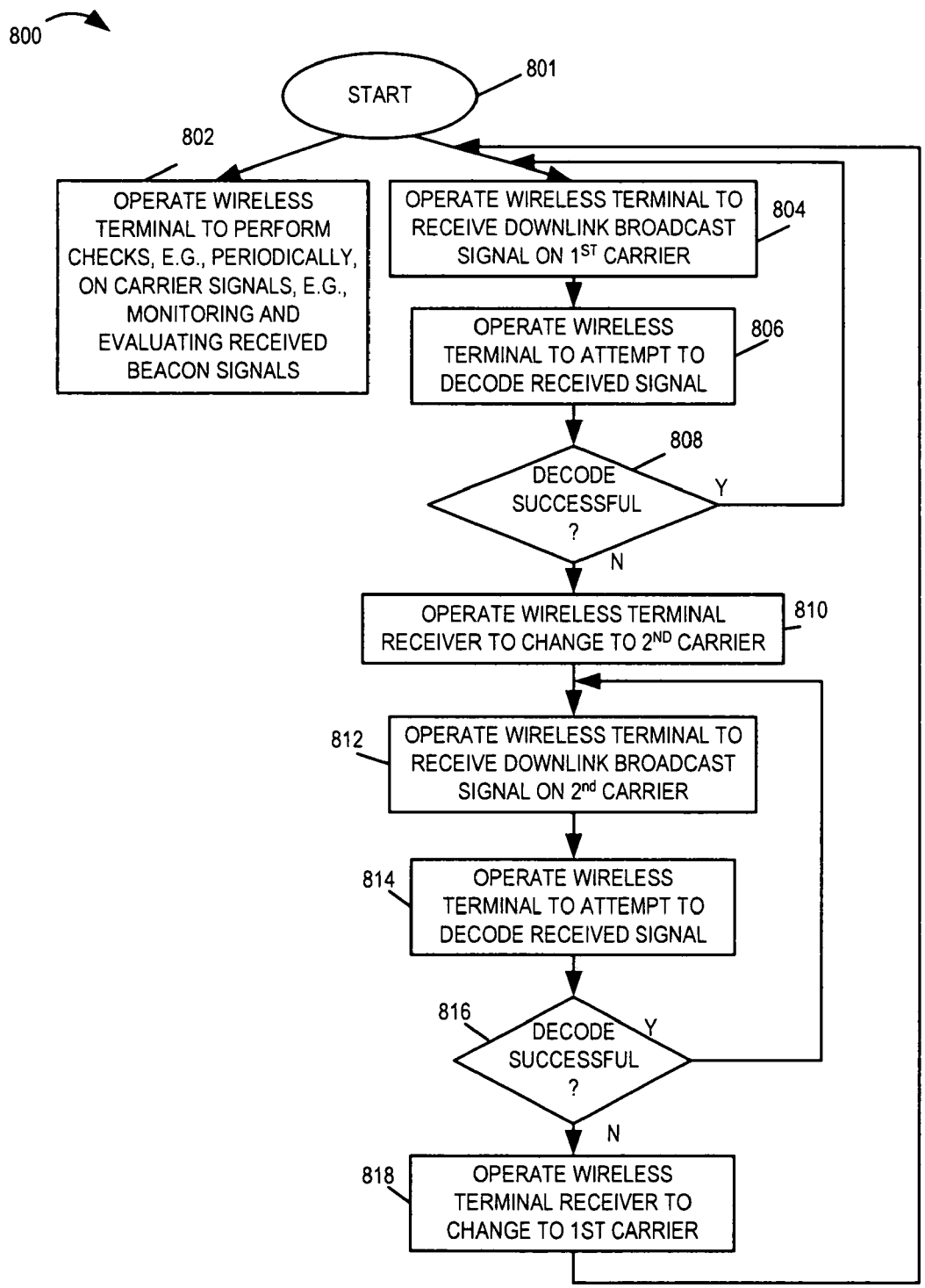
FIG. 8 is a flowchart of an exemplary method of operating a wireless terminal to receive downlink broadcast signaling from multiple adjacent base stations using different carrier frequencies for each base station to convey the same information.

FIG. 8 is a flowchart 800 of an exemplary method of operating a wireless terminal to receive downlink broadcast signaling from multiple adjacent base stations using different carrier frequencies for each base station to convey the same information. The wireless terminal and adjacent base stations may be part of an exemplary OFDM communications system. The exemplary wireless terminal may have a single RF receiver chain. Operation starts in step 801 where the WT, e.g., the exemplary MN 618 of FIG. 6, is powered on and initialized. Operation proceeds from step 801 to step 802 and step 804. In, step 802, the WT is operated to perform checks, e.g., periodically, on carrier signals. For example, beacon signals transmitted from a BS 602, 604 may be monitored, received and evaluated, and a $1^{st}$ carrier identified corresponding to a first base station and a $2^{nd}$ carrier identified corresponding to a carrier of an adjacent base station which carries the same broadcast information as the identified first carrier, but with a timing offset. The first carrier may be, e.g., carrier C1 corresponding to BS A 602 of FIG. 6, while the $2^{nd}$ carrier may be carrier C3 corresponding to BS B 604 of FIG. 6.

In step 804, the WT is operated to receive downlink broadcast signals on the first carrier C1, e.g., signals from BS A 602 using carrier C1. Next in step 806, the WT is operated to attempt to decode the received signal. In step 808, if the decoding was successful, operation proceeds back to step 804 to receive additional signals on the same carrier C1. For example, this may be the scenario if the WT has adequate channel quality with respect to BS A 602 using carrier C1. However, if the decoding was not successful, operation proceeds from step 808 to step 810, where the WT changes its receiver to the second carrier, e.g., carrier C3 corresponding to BS B 604 downlink signaling.

Then, in step 812, the wireless terminal is operated to receive downlink broadcast signaling on the $2^{nd}$ carrier. In step 814, the wireless terminal attempts to decode the received signal. If the decoding is successful, operation proceeds from step 816 back to step 812 to receive and process additional signaling using the second carrier; however, if the decoding is unsuccessful, operation proceeds from step 816 to step 818. In step 818, the wireless terminal is operated to change to the $1^{st}$ carrier and operation returns to step 804 to receive additional signaling.

FIG. 9 illustrates another exemplary system 900 which is similar to the system of FIG. 6. However, the base station downlink signal timing structure for the FIG. 9 embodiment which is indicated in FIG. 10 is slightly different than the timing structure indicated in FIG. 7 which corresponds to the FIG. 6 embodiment. In the example, of FIG. 10, the same signaling from each base station is intentionally spaced such that a wireless terminal receiver could receive the same segment from two adjacent base stations on an ongoing basis by switching back and forth between carriers, and, in some embodiments, recover the information bits by a combining process.

The exemplary system 900 includes a plurality of base stations 902, 904 (BS A, BS B), each base station supporting OFDM signaling on at least two different carrier frequencies, e.g., multiple carrier frequencies C1, C2, C3. In the example of FIG. 9, each base station 902, 904 supports three carriers (C1, C2, C3), with different transmission power levels being associated with, and used for, each carrier, as represented by different size circles surrounding each base station 902, 904. Base station A 902 transmits downlink signals on carriers (C1, C2, C3) at (high, intermediate, low) power levels as indicated by circles (906, 908, 910), respectively. Base station B 904 transmits downlink signals on carriers (C3, C1, C2) at (high, intermediate, low) power levels as indicated by circles (912, 914, 916), respectively. The exemplary system 900 also includes a plurality of wireless terminals, e.g., mobile nodes. Exemplary MN 918 is shown in system 900, and exemplary MN 918 may be moving.

In the example, of FIG. 10, the same signaling from each base station is intentionally spaced such that a wireless terminal receiver, e.g., MN 918, could receive the same segment from two adjacent base stations on an ongoing basis by switching back and forth between carriers, and, in some embodiments, recover the information bits by a combining process.

FIG. 10 includes a drawing 1000 plotting different BS carrier transmissions on vertical axis 1002 vs time on horizontal axis 1004. Drawing 1000 includes a sequence of exemplary BS A carrier C1 downlink broadcast transmission segments 1006 (segment 1 1008, segment 2, 1010, segment 3 1012, . . . ) and a sequence of exemplary BS B carrier C3 downlink broadcast transmission segments 1014 (segment 1 1016, segment 2 1018, segment 3 1020, . . . ). FIG. 10 illustrates exemplary transmission timing of segments (1008, 1010, 1012, . . . ) from BS A using carrier frequency C1 and exemplary transmission timing of segments (1016, 1018, 1020, . . . ) from BS B using carrier frequency C3. The same information is conveyed from the different BSs, but at different times and using different carriers, C1 and C3, respectively. For example, downlink broadcast segment 1 1008 transmitted by BS A 902 using carrier C1 conveys the same information as downlink broadcast segment 1 1016 transmitted by BS B 904 using carrier C3; however, the two segments are offset in time. In some embodiments, the two segments conveying the same information are offset in time by more than a segment duration. In some embodiments, the difference in time, between the end of transmission for a segment from a first base station, e.g., the end of transmission of DL broadcast segment 1 1008, and the start of transmission of the corresponding segment from an adjacent base station, e.g., the start of DL broadcast segment 1 1016, may be, e.g., less than one segment interval apart, but one or several, e.g., 2, 3, 10 or more, symbol transmission time periods apart. In some embodiments, the separation in time is such that the WT 918 can switch, e.g., back and forth, between the two carrier frequencies. In some embodiments, by combining information from the two broadcast segments conveying the same information, e.g., via different carriers from different base stations, the information being conveyed can be recovered where it might not otherwise be possible to recover the information if the segment was available from one base station but not from the other.

In some embodiments, each of the DL broadcast segments corresponding to a sequence of segments, e.g., (1008, 1010, 1012, . . . ) for a given base station and carrier, e.g., BS A 902 and carrier C1, are interspaced and interwoven such that a corresponding sequence of segments, e.g., (1016, 1018, 1020, . . . ) transmitted from an adjacent base station, e.g., BS B 904 using carrier C3, can also be received and processed by the same wireless terminal receiver including a single RF chain which switches between carriers.

In some embodiments, for a given base station and carrier a plurality of different broadcast channels may be supported, e.g., with each broadcast channel including a sequence of spaced segments, and the channels may be interwoven in time, e.g., channel 1 broadcast segment 1, channel 2 broadcast segment 1, channel 3 broadcast segment 1, channel 1 broadcast segment 2, channel 2 broadcast segment 2, channel 3 broadcast segment 2, channel 1 broadcast segment 3, channel 2 broadcast segment 3, channel 3 broadcast segment 3, . . . , channel 1 broadcast segment n, channel 2 broadcast segment n, channel 3 broadcast segment n. An adjacent base station, transmitting the same broadcast channels using a different carrier, e.g., at a different power level, may be intentionally timing offset, e.g., to allow for the wireless terminal to receive and process the same information from two or more sources. For example, at the approximate time, e.g., within several, e.g., 2, 3, 10 or more, OFDM symbol transmission time intervals of when the first base station using carrier C1 is starting to transmit channel 3 segment 1, the second base station may be start to transmit channel 1 segment 1.

Figure 11:
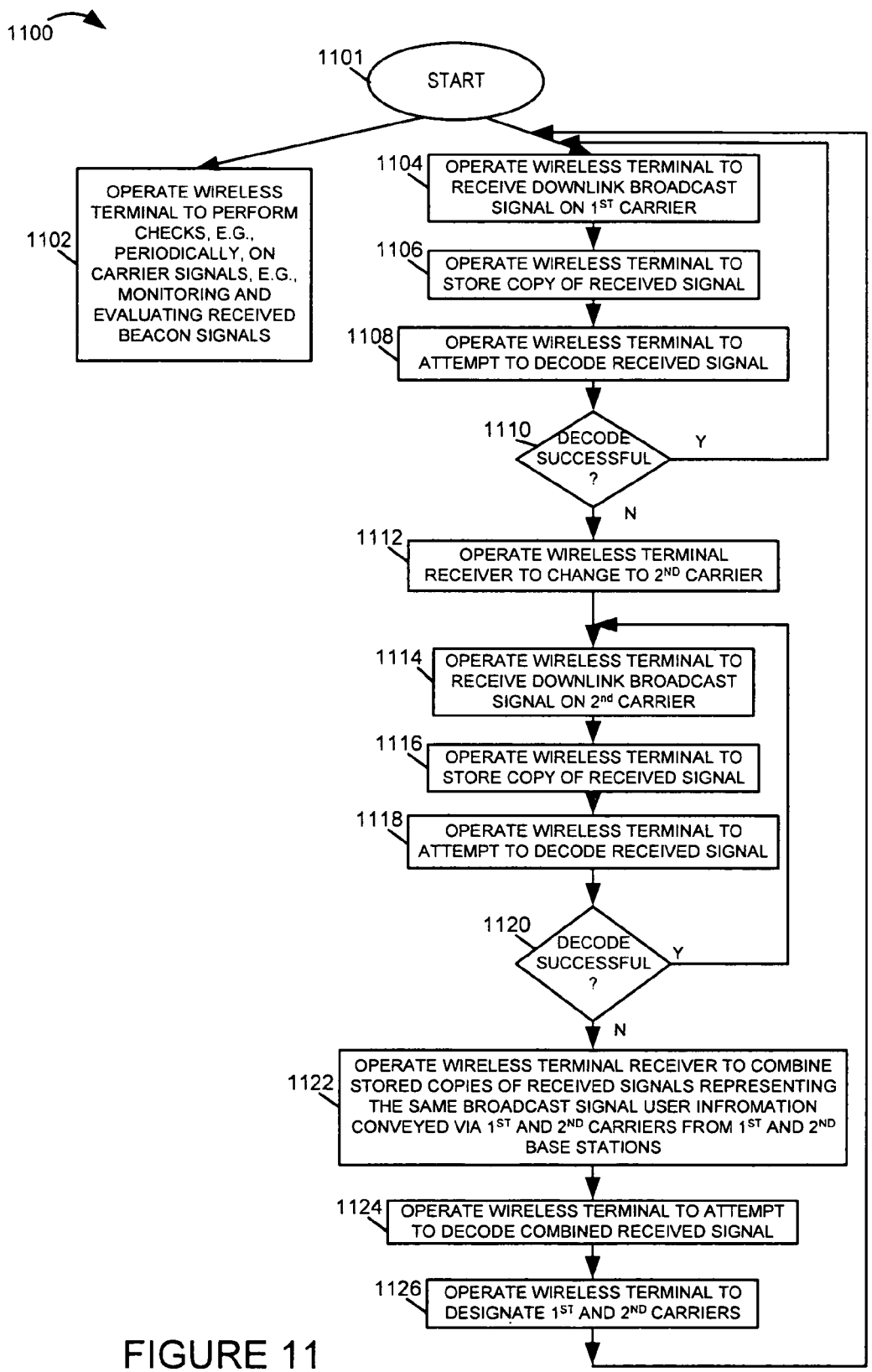
FIG. 11 is a flowchart of an exemplary method of operating a wireless terminal to receive downlink broadcast signaling from multiple adjacent base stations using different carrier frequencies for each base station to convey the same information.

FIG. 11 is a flowchart 1100 of an exemplary method of operating a wireless terminal to receive downlink broadcast signaling from multiple adjacent base stations using different carrier frequencies for each base station to convey the same information. The exemplary wireless terminal may have a single RF receiver chain. Operation starts in step 1101 where the WT, e.g., the exemplary MN 918 of FIG. 9, is powered on and initialized. Operation proceeds from step 1101 to step 1102 and step 1104. In, step 1102, the WT is operated to perform checks, e.g., periodically, on carrier signals. For example, beacon signals may be monitored, received and evaluated, and a $1^{st}$ carrier identified corresponding to a first base station and a $2^{nd}$ carrier identified corresponding to a carrier of an adjacent base station which carries the same broadcast information as the identified first carrier, but with a timing offset. The first carrier may be, e.g., carrier C1 corresponding to BSA 902 of FIG. 9, while the $2^{nd}$ carrier may be carrier C3 corresponding to BSB 904 of FIG. 9.

In step 1104, the WT is operated to receive downlink broadcast signals on the first carrier, e.g., signals from BS A using carrier C1. Next, in step 1106, the wireless terminal is operated to store a copy of the received signal. Then in step 1108, the WT is operated to attempt to decode the received signal. In step 1110, if the decoding was successful, operation proceeds back to step 1104 to receive additional signals on the same carrier. For example, this may be the scenario if the WT has adequate channel quality with respect to BSA using carrier C1. However, if the decoding was not successful, operation proceeds from step 1110 to step 1112, where the wireless terminal is operated to change its receiver to the second carrier, e.g., carrier C3 corresponding to BSB downlink signaling.

Then, in step 1114, the wireless terminal is operated to receive downlink broadcast signaling on the $2^{nd}$ carrier. In step 1116, the wireless terminal is operated to store a copy of the received signal from step 1114. In step 1118, the wireless terminal attempts to decode the received signal. If the decoding is successful, operation proceeds from step 1120 back to step 1114 to receive and process additional signaling using the second carrier; however, if the decoding is unsuccessful, operation proceeds from step 1120 to step 1122.

In step 1122, the wireless terminal is operated to combine stored copies of the received signals representing the same broadcast signal user information conveyed via $1^{st}$ and $2^{nd}$ carriers from $1^{st}$ and $2^{nd}$ base stations, e.g., signals stored in steps 1106 and step 1116. Operation proceeds from step 1122 to step 1124. In step 1124, the wireless terminal is operated to attempt to decode the combined received signal. In step 1126, the wireless terminal is operated to designate $1^{st}$ and $2^{nd}$ carriers. Operation proceeds from step 1126 to step 1104, to receive and process additional downlink broadcast signaling.

In some embodiments, a mobile node, e.g., a mobile node situated at the edge of three or more cells, may hop between the different carriers associated with each of the different base stations, each conveying the same digital broadcast information, e.g., video bits, with the same segments from the three different base stations being transmitted at different times with enough timing separation to facilitate that an individual wireless terminal can receive and process the signals from the three base stations. In some embodiments, the signals from the three base stations may be stored and combined to recover information, that could not have been otherwise recovered using only signals from one or two base stations.

In some embodiments, a mobile node situated at the edge of three or more cells, may hop between different carriers associated with different base station, individual base stations may convey the same digital broadcast video information bits, with the same segments from different base stations being transmitted at different times with enough timing separation to facilitate that an individual wireless terminal can receive and process the signals from the different base stations. In some embodiments, the signals from three or more base stations may be stored and combined to recover information that could not have been otherwise recovered using only signals from one or two base stations.

In some embodiments, the information to be transmitted in the downlink segments is packed and transmitted on different carriers taking into account the buffer capacity of WTs and the time needed to switch between carriers. For example, the same information may be transmitted enough symbol transmission times apart to allow a WT to switch between carriers and receive the information while the time difference between the transmission of the information remains within the buffering capacity of the WT. In this manner, it is possible to eliminate, reduce and/or minimize dead time in the decoding and presentation, e.g., display, of a received program such as a movie or other video program. In some embodiments, an assignment channel functions like a TV guide informing the wireless terminal when to hop between carriers for purposes of receiving information corresponding to a particular program or broadcast.

In some embodiments, the downlink video broadcasting functions like a TV channel or channels. In some embodiments, video on-demand capabilities are incorporated into the system. For example, a wireless terminal may tell the network what it wants to see broadcast, e.g., via an uplink signal transmitted from the WT to a BS.

In accordance with various embodiments, precise synchronization between base stations is not required, with a coarse level of synchronization being sufficient, e.g., timing synchronization sufficient to allow a WT to receive information from different BSs within a time window supported by the WTs buffering capabilities will suffice in many cases. Wireless terminals can be implemented using a single RF receiver chain. However WTs with multiple receiver chains, allowing a WT to receive information from two carriers at once, can also be used without conflict with single receive chain WTs. Wireless terminals may receive signals using different carriers but conveying the same information from different base stations in accordance with various embodiments. The different base stations intentionally time offset transmissions of information segments having equivalent information content to allow WTs to switch and receive the same information from multiple base stations if necessary.

Figure 12:
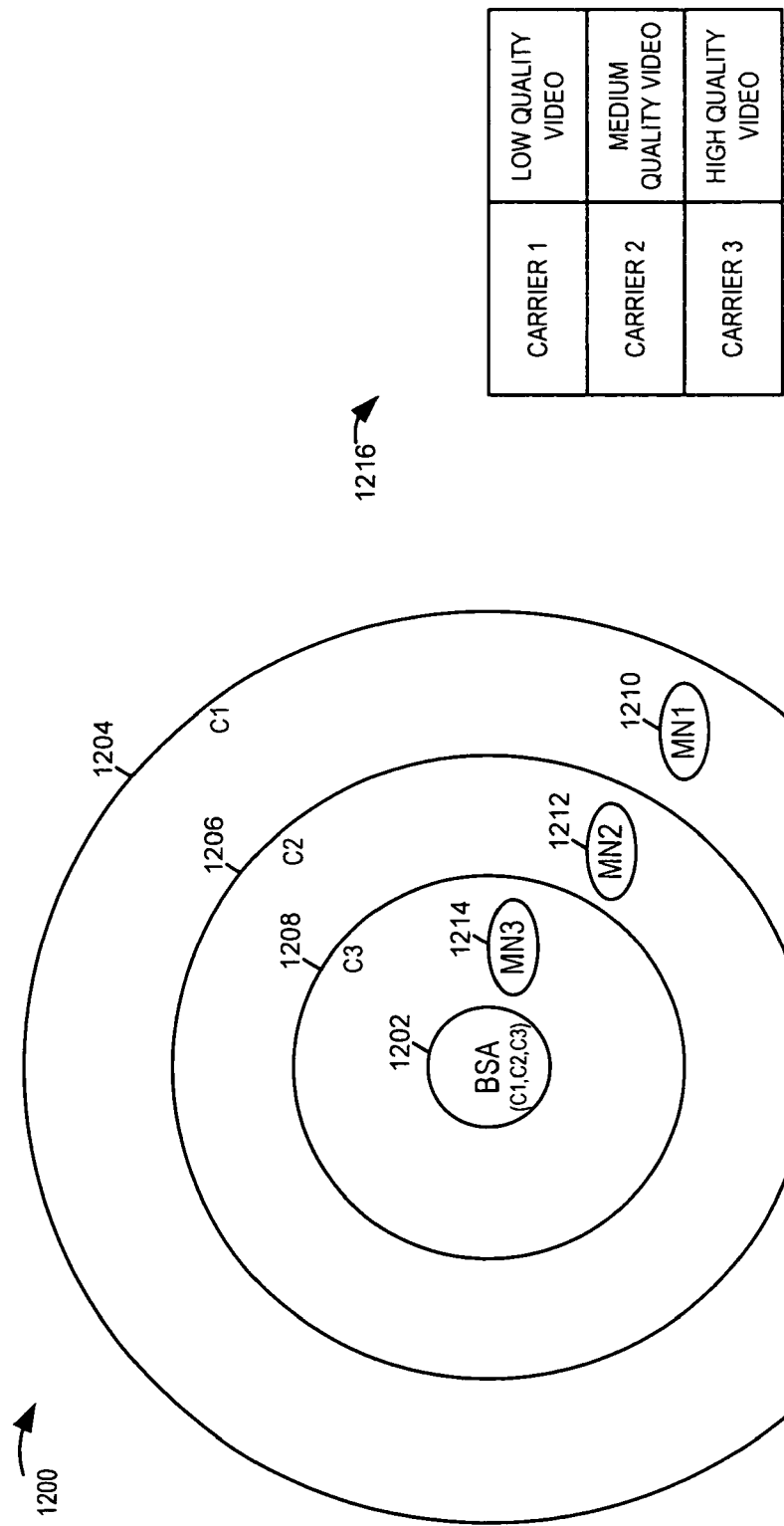
FIG. 12 illustrates another feature of some embodiments; a base station using multiple carriers of different strength levels may convey different broadcast information, e.g., different video, on each of the different carriers.

FIG. 12 illustrates exemplary system 1200 including a plurality of base stations including BS A 1202 and wireless terminals, e.g., mobile nodes MN 1 1210, MN2 1212, MN3 1214. A base station using multiple carriers of different strength levels may convey different broadcast information, e.g., video, on each of the different carriers. Table 1216 illustrates that for exemplary base station 1202, carrier 1 corresponds to low quality video, carrier 2 corresponds to medium quality video, and carrier 3 corresponds to high quality video. Exemplary base station A 1202 supports downlink signaling using three carriers (C1, C2, C3), at (high, intermediate, low) power levels, as indicated by circles (1204, 1206, 1208), respectively. For example, the strongest carrier, e.g., C1, may be used to convey the lowest quality or lowest resolution information bits. Therefore, each WT in the system (MN1 1210, MN2 1212, MN3 1214) can receive the low quality video. Carrier 2 may convey information bits that when combined with the information bits extracted from the carrier 1 signal allows a medium quality video signal to be displayed to the user. Thus, carrier 2 may communicate what is known as enhancement layer video signals. Alternatively, carrier 2 may convey information bits that when used alone provide medium quality video. In this example, MN2 1212 and MN3 1214 can receive the carrier 2 signal. MN2 1212 may view medium quality video images. Carrier 3 may convey information bits that when combined with the information bits extracted from the carrier 1 signal and carrier 2 signals allows a high quality video signal to be displayed to the user. Alternatively, carrier 3 may convey information bits that when used alone provide high quality video. In this example, MN3 1214 can receive the carrier 3 signal. MN3 1214 may view high quality video images. Thus, the quality of the image received can be a function of how close the mobile is to the base station.

In some embodiments, the base stations can transmit location-specific information. For example, the BS can transmit location-specific information for each broadcast region, e.g., ring corresponding to a particular transmission power level. So, in the FIG. 12 embodiment, the BS 1202 may and in some implementations does, transmit information about restaurants, stores or other businesses in each ring using the particular carrier frequency corresponding to the ring. For example, the BS 1202 may transmit the location of restaurants in the innermost ring on carrier C3, restaurants in the middle ring on carrier C2 and restaurants in the outermost ring on carrier C1. A mobile in the innermost ring can, for example, decode information communicated on carrier C3 and therefore discover restaurants in its ring.

Mobiles located very close to the base station may be able to receive the information transmitted on the weakest carrier, but mobiles far away from the base station may be unable to receive and/or decode the signals. In some embodiments, a failure to decode can determine hopping to different carriers. Hopping to different carriers may also occur if the mobile decides that it wants to receive finer quality resolution information. The location-specific information can grade carriers from weakest to strongest.

In some embodiments, the BS can choose when and if to send higher quality resolution information.

The methods and apparatus can be used without requiring a reduction in tone spacing and without the need to use long cyclic prefixes as may be required in systems.

FIG. 13 illustrates an exemplary base station 1300. The base station 1300 may be used, e.g., as one of the base stations shown in FIG. 6, FIG. 9 or FIG. 12. The base station 1300 includes antennas 203, 205 and receiver transmitter circuitry 202, 204. The transmitter circuitry supports multiple different carrier frequencies, e.g., C1, C2, C3. The receiver circuitry 202 includes a decoder 233 while the transmitter circuitry 204 includes an encoder/packetizer 235. Requests for video on demand can be received from a wireless terminal via receiver circuitry 202. The circuitry 202, 204 is coupled by a bus 230 to an I/O interface 208, processor (e.g., CPU) 206, and memory 210. The I/O interface 208 couples the base station 1300 to the Internet and/or other nodes, e.g., adjacent base stations, with which the base station 1300 may maintain a coarse timing synchronization. As discussed above, timing synchronization between base stations need not, and often is not at the level of the duration of a cyclic prefix and in many cases the base stations are not synchronized to the duration of a cyclic prefix or even several OFDM symbol transmission time periods. Synchronization may be measured in fractions of a second and, in some cases, the adjacent base stations are not even synchronized to a second. The memory 210 includes routines, which when executed by the processor 206, control the base station 1300 to operate in accordance with various embodiments. Memory includes a communications routine 223 used for controlling the base station 1300 to perform various communications operations, including transmitting information signals, e.g., video programs, radio programs, multicast information, etc. on multiple carrier frequencies. The memory 210 also includes a base station control routine 225 used to control the base station 1300 to implement the steps of the method. The base station control routine 225 includes a scheduling module 226 used to control transmission scheduling and/or communication resource allocation and to schedule transmission of information in coarse alignment with transmissions by neighboring base stations of the same information, e.g., but with the same information being transmitted from different base stations intentionally at different times. Thus, module 226 may serve as a scheduler. Memory 210 also includes information used by communications routine 223, and control routine 225. The information 212 includes a program entry 213, 213' for each program, e.g., video or audio program, to be transmitted. This entry may include the program information, e.g., video data to be transmitted and, optionally, information about the time, e.g., day and time, at which the program is to be transmitted.

FIG. 14 illustrates an exemplary wireless terminal, e.g., mobile node 1400. The mobile node 1400 may be used as a mobile terminal (MT) and is capable of receiving, decoding and outputting program and/or multicast information received from a base station. The wireless terminal 1400 includes a receiver module 302, a transmitter module 304, a processor 306, a display 307, an audio output device 308, and a memory 310 which are coupled together via a bus 309 over which the various elements may interchange data and information. The program may be, e.g., a television program or audio program. The mobile node 1400 includes receiver and transmitter antennas 303, 305 which are coupled to receiver and transmitter circuitry 302, 304 respectively. The receiver circuitry 302 includes a decoder 333 while the transmitter circuitry 304 includes an encoder/packetizer 335. Processor 306, under control of one or more routines stored in memory 310 causes the mobile node 1400 to operate. This includes, e.g., receiving program information on different carriers, switching between carries, combining program information received from different carrier frequencies and displaying or otherwise outputting decoded program information. In order to control mobile node 1400 operation, memory 310 includes communications routine 323, and mobile node control routine 325. The mobile node control routine 325 is responsible for controlling mobile node 1400 operation. The memory 310 also includes user/device/session/resource information 312 which may be accessed and used to implement methods and/or data structures. Memory 310 also includes a received program buffer 327 used for storing received program information, a video decoder 329 for decoding received compressed video information such as MPEG-4 video signals, and audio decoder 331 for decoding received compressed audio signals and a program playback routine 333 which is used for controlling the display and/or audio output of received decoded programs.

FIG. 15, is a drawing of an exemplary base station 1500. Exemplary BS 1500 may be any of the exemplary base stations of FIG. 6, 9, or 12. Exemplary base station 1500 includes receiver 1502, a transmitter 1504, a processor 1506, a clock module 1508, an I/O interface 1510 and memory 1512 coupled together via a bus 1514 over which the various elements may interchange data and information. In some embodiments, base station 1500 is a sectorized base station supporting a plurality of sectors, and BS 1500 includes additional transmitters and/or receivers, e.g., a separate transmitter/receiver pair corresponding to each sector. For example, in an M sector embodiment of BS 1500 receiver 1502 and transmitter 1504 may correspond to sector 1, while receiver 1516 and transmitter 1518 correspond to sector M. Receiver 1516 and transmitter 1518 may also be coupled to bus 1514. Each of the sectors may support a plurality of carriers. For example, in some embodiments, each sector may support simultaneous transmissions using three different downlink carriers, each of the three downlink carriers being associated with a non-overlapping tone block.

Receiver 1502, e.g., a multi-carrier receiver, associated with sector 1, is coupled to receive antenna 1520 through which it receives uplink signals from wireless terminals. Receiver 1502 includes a decoder 1522 which decodes received uplink signals. Receiver 1516, e.g., a multi-carrier receiver, associated with sector M, is coupled to receive antenna 1524 through which it receives uplink signals from wireless terminals. Receiver 1516 includes a decoder 1526 which decodes received uplink signals.

Transmitter 1504, e.g., a multi-carrier transmitter, associated with sector 1, is coupled to transmit antenna 1528 through which it transmits downlink signals to wireless terminals, e.g., including broadcast signals. Transmitter 1504 includes an encoder 1530 which encodes downlink data/information prior to transmission. Transmitter 1518, e.g., a multi-carrier transmitter, associated with sector M, is coupled to transmit antenna 1532 through which it transmits downlink signals to wireless terminals, e.g., including broadcast signals. Transmitter 1518 includes an encoder 1534 which encodes downlink data/information prior to transmission.

Memory 1512 includes routines 1536 and data/information 1538. The processor 1506, e.g., a CPU, executes the routines 1536 and uses the data/information 1538 to control the operation of the base station 1500 and to implement the methods. I/O interface 1510 couples the BS 1500 to other network nodes, e.g., other base stations, routers, AAA servers, content provider servers, and/or the Internet. I/O interface 1510 couples the base station 1500 to a backhaul network providing connectivity for WT using the base station 1500 as its point of network attachment with other nodes and/or sources of information outside the base station's cellular coverage region. In some embodiments, a service provider node may send a program of information, e.g., information representing a digital video broadcast stream, over the I/O interface 1510 to BSs 1500, the program to be broadcast in segments by a plurality of base stations, e.g., adjacent base stations.

Routines 1536 include communications routines 1540, and base station control routines 1542. The communications routines 1540 implement the various communications protocols used by BS 1500. The base station control routines 1542 include a scheduler module 1544, a carrier/sector power level control module 1546, a program segment timing transmission control module 1548, and a timing synchronization module 1550.

The scheduler module 1544 schedules WT users to uplink and downlink communications segments. Some of the communications channel segments may be traffic channel segments scheduled to one or more users. Some of the downlink communications segments may be broadcast segments including programs of information. In some embodiments, at least some of the broadcast programs may be made available to any subscribing wireless terminal users in the coverage area. In some embodiments, at least some of the broadcast programs may be made available to a select group of subscribing wireless terminal users, e.g., a specific multi-cast group, in the coverage area, e.g., via encryption and selective distribution of keys. The scheduler module 1544 includes a program segment/carrier/sector/communications segments coordination module 1552. Each program to be broadcast is associated with at least one carrier frequency and one sector. Each program to be broadcast over the downlink may be subdivided into a plurality of program segments, and module 1552 may associate each program segment with one or more carrier frequency, one or more sectors, and one or more communications segments in a downlink timing and frequency structure. In some embodiments one program segment is communicated for a given sector and given carrier frequency using a plurality of communications segments. Coding, e.g., block encoding of the program information may be performed on a program segment basis and/or on a communications segment basis.

Carrier/sector power level control module 1546 controls the downlink transmission power levels of the transmitters (1504, 1518) associated with each of the carriers supported by the transmitter (1504, 1518). In some embodiments, at least some of the sectors of BS 1500 support a plurality of power levels, with a different power level being associated with each different carrier frequency supported by the sector, e.g., three carriers and three power levels. Adjacent sectors using the same carriers, from the same cell or different cells, may have different power levels associated with the same carrier.

Program segment timing transmission control module 1548 controls operations of BS 1500 such that segments of a broadcast program maintain a timing sequence in an overall coordinated timing sequence structured between a plurality of adjacent base stations, e.g., maintaining offsets in sequences of segments corresponding to a program being transmitted by two adjacent base stations, potentially to be received by the same MN, e.g., at different times.

Timing synchronization module 1550 operates in coordination with clock module 1508 to maintain timing synchronization for the BS 1500. Timing synchronization module 1550 includes a base station/base station coarse synchronization module 1554 and a BS synchronization module 1556. BS/BS coarse synchronization module 1554 is operated to maintain approximate synchronization between adjacent base stations, e.g., with stability to within several, e.g., 2, 3, 10 or more OFDM symbol transmission time intervals. In some embodiments, the same program segment broadcast from adjacent base stations may be intentionally, offset such that a WT with a single RF receiver stage, can switch and receive both transmissions of the same segment, using different carrier frequencies. BS/BS coarse synchronization module 1554 maintains inter-base stations tolerances, e.g., with respect to program segment transmissions, such that the methods, utilizing broadcast signals from a plurality of adjacent base stations may be employed. Base station synchronization module 1556 maintains a high level of synchronization, e.g., less than an OFDM symbol transmission time interval, between signaling of the various sectors of the base station such that OFDM symbols are aligned with respect to different carriers in the same sector and/or with respect to different sectors of BS 1500.

Data/information 1538 includes system, e.g., OFDM system, timing/frequency structure information 1558, Base station/sector identification information 1560, wireless terminals information 1562, user/device/session/resource information 1564, program segment timing information 1566, and a plurality of set of information corresponding to each carrier/sector combination in regard to an attachment point which may be used by the BS 1500 for broadcast of downlink signals (carrier 1 sector 1 data/information 1568, carrier N sector M data/information 1570). In some embodiments, one or more sets of multi-resolution video program information (multi-resolution video program 1 1572, . . . , multi-resolution video program N 1574). In some embodiments, a plurality of sets of geographically based program information 1576 is included.

System timing and frequency structure information 1558, includes, e.g., uplink and downlink communications segment structure, uplink and downlink carrier frequencies, bandwidths, tone blocks, tone interspacing, sector information, uplink and downlink tone hopping sequences, OFDM symbol transmission timing intervals, grouping of OFDM symbol transmission timing intervals into slots, superslots, beacon slots, ultra slots, etc., timing control tolerance information with respect to the different sectors of the BS, timing control tolerance information with regard to different, e.g., adjacent base stations. Base station/sector identification information 1560 includes base station identifiers and/or sector identifiers. In some embodiments, the BS/sector ID information 1560 is conveyed to WTs via the downlink using beacons and/or pilot signals which are periodically broadcast. Wireless terminals' information 1562, includes information pertaining to WTs which may have registered with one of the base stations points of network attachment, e.g., a sector/carrier frequency combination. WTs' information 1562 may include WT active user IDs, e.g., temporarily assigned by BS 1500 for WTs which seek to send uplink signals to BS 1500, e.g., as part of a communications session. In some embodiments, at least some of the WTs receiving downlink broadcast signals, e.g., a downlink broadcast program, need not and do not, identify themselves to the base station and obtain an active user ID. For example, at least some of the WTs may have subscribed to receive some downlink broadcast programs with a service provider affiliated with BS 1500, have been provided with decoding information which is valid for a given time interval, and can then receive and decode downlink broadcast programs. In some embodiments, at least some of the WTs need to register with BS 1500 prior to receiving downlink broadcast program information, e.g., to receive a temporarily valid decoding and/or descrambling information and/or for accounting, e.g., billing, purposes. Program segment timing information 1566 includes information used to time the transmission of each of the programs segments to be broadcast by the base station. For example, two adjacent base stations may broadcast the same program segments, but the timing of broadcast for different BSs 1500 in the system may intentionally offset. Program segment timing information 1566 also includes information associating each program segment with one or more communications segments in the downlink timing and frequency structure of the base stations.

Program 1 1578 includes a plurality of segments (segment 1 1551, segment N 1553); program N 1580 also includes a plurality of segments (segment 1 1555, segment N 1557).

Carrier 1 sector 1 data/information 1568 includes frequency information 1586, e.g., a downlink carrier frequency used, tone block information 1587, e.g., a set of tones associated with the carrier frequency, power level information 1588, e.g., high, low, or intermediate power level associated with the carrier and sector, program association information 1589, e.g., information identifying which of the program or programs is to be broadcast by the sector transmitter using carrier identified by 1586, data rate 1590, e.g., an information bit data rate of program information, which is a function of coding rate, modulation scheme, and timing intervals between program segments transmitted, geographic coverage area information 1591, e.g., information identifying physical coverage area associated with the sector and carrier to which the broadcast programs are expected to reach, and, in some embodiments, resolution level information 1592, e.g., in embodiments including multi-level resolution video, information associating the carrier and sector with a high, low, or medium level of video capability.

Multi-level resolution video program 1 1572 includes a plurality of sets of segments of different resolution video information ((high resolution segment 1 1593, . . . , high resolution segment N 1594), (medium resolution segment 1 1595, . . . , medium resolution segment N 1596), (low resolution segment 1 1597, . . . , low resolution segment N 1598)) corresponding to program 1. Multi-level video program N 1574 includes a plurality of sets of segments of different resolution video information ((high resolution segment 1 1599, . . . , high resolution segment N 1501), (medium resolution segment 1 1503, . . . , medium resolution segment N 1505), (low resolution segment 1 1507, . . . , low resolution segment N 1509)) corresponding to program N.

Geographically based program information 1576, a plurality of sets of region specific segments ((region 1 segment 1 1511, . . . , region 1 segment N 1513), . . . (region N segment 1 1515, . . . , region N segment N 1517). Different program segment sets of a specific region may be customized to accommodate the geographic region, e.g., locations of restaurants, theaters, stores, parking, emergency facilities, etc., in the region. In some embodiments, at least some of a geographically based program set for a region includes advertising pertinent to the region. In some embodiments, geographically based programs may be provided as a service to the wireless terminal user, e.g., who desires to find a restaurant. In some embodiments, a geographically based program may be intermixed with a program set, e.g., program set 1 1568, may be providing a video stream such as a movie, a show, a Internet broadcast, etc., and the geographically based information, e.g., (region 1 segment 1 1511, region 1 segment N) may be interweaved as at least some of the commercial advertising directed to the WT user.

FIG. 16 illustrates an exemplary wireless terminal 1600, e.g., mobile node. Exemplary WT 1600 may be any of the exemplary WTs used in the exemplary systems of FIG. 6, 9, or 12. The wireless terminal 1600 is capable of receiving, decoding and outputting program and/or multicast information received from a base station. The program may be, e.g., a television program or audio program. The wireless terminal, e.g., mobile node, 1600 includes receiver and transmitter antennas 1603, 1605 which are coupled to receiver and transmitter modules 1602, 1604 respectively. The receiver module 1602 includes a decoder 1633 while the transmitter module 1604 includes an encoder 1635. Wireless terminal 1600 also includes a processor 1606, user I/O devices 1608, and memory 1610.

User I/O devices 1608 include user input device 1601, e.g., keypad, keyboard, touch-screen, video camera, microphone, etc., display 1607, e.g., a LCD display, LEDs, indicator lights, CRT, flat screen display, image projection device, video output feed line/interface, etc., and audio output device 1609, e.g., a speaker, alarm, audio output feed line/interface, etc. The various elements 1602, 1604, 1606, 1608, and 1610 are coupled together via a bus 1605 over which the various elements may interchange data/information. Processor 1606, e.g., a CPU, under control of one or more routines stored in memory 1610 causes the wireless terminal 1600, e.g., mobile node, to operate. This includes, e.g., receiving program information on different carriers, switching between carries, combining program information received from different carrier frequencies and displaying or otherwise outputting decoded program information. In order to control wireless terminal 1600, e.g., mobile node, operation memory 1610 includes communications routine 1623 which implement the communications protocols used by the WT 1600, and wireless terminal control routines 1625.

The wireless terminal control routines 1625 are responsible for insuring that the wireless terminal 1600, e.g., mobile node, operates and performs the steps described in regard to wireless terminal operations. The memory 1610 also includes user/device/session/resource information 1627 which may be accessed and used to implement the methods and/or data structures.

Wireless terminal control routines 1625 include a receiver control module 1629, a transmitter control module 1631, I/O devices control module 1633, carrier signal monitor/evaluation module 1635, carrier switching module 1637, segment combining module 1639, received program decoder module 1641, and a program playback module 1643. The received program decoder module 1641 includes an audio decoder module 1645, a video decoder module 1647, and a decode evaluation module 1649. The video decoder module 1647, in some embodiments, includes a multi-level resolution module 1651. Receiver control module 1602, operating in conjunction with other modules, e.g., module 1635,1637, 1639 and/or 1641 controls operation of receiver 1602 and decoder 1633 to receive and process downlink signals from BSs, e.g., including downlink broadcast signals including programs of information communicated in segments. Transmitter control module 1631 controls operation of transmitter 1604 and encoder 1635 in regard to uplink signaling to BSs. I/O devices control module 1633 controls operations of user I/O devices 1608 and may operate in conjunction with program playback module 1643. Carrier signal monitor/evaluation module 1635, may monitor the strength and/or quality of received carrier signals, e.g., measuring beacon strength levels, interference levels, decoding success rates, etc. Carrier switching module 1637 uses results from carrier signal monitoring/evaluation module 1635 and/or program segment timing information, to decide when and if to switch between carriers so that program segments from one or more base stations can be received. Segment combining module 1639 combines segments, e.g., corresponding segments from two different adjacent base stations using two different carrier frequencies conveying at least some of the same information content, in order to recover information. Segment combining module 1639 may also combine different segment conveying different incremental amounts of information, e.g., to achieve a higher video level. Segment combining module 1639 may also combine multiple received and successfully decoded segments corresponding to a program into a combined program segment set of information, e.g., information 1657.

Video decoder module 1647 controls decoding of video while audio decoder module 1645 controls decoding of audio. Multi-level resolution module 1651, when implemented, controls operation related to multi-level video selection, decoding, combing, processing, etc. Decode evaluation module 1649 determines whether a decode, e.g., a single program segment decode from a base station or a combined decode of joint segments was successful. In some embodiments, the result of decode evaluation module 1649 is used to trigger: switching to another carrier from another base station, the attempted recovery of a corresponding segment from an adjacent base station, and/or the combining of multiple corresponding segments to attempt a recovery, where a single segment was unable to be successfully recovered.

Data/information included in memory 1610 includes received program buffer, corresponding to a $1^{st}$ carrier 1653, processed (decoded) program buffer corresponding to the $1^{st}$ carrier 1655, combined program segments corresponding to a received program 1657, currently selected downlink carrier information 1659, selected decoded audio and/or video for streaming and/or playback 1661, current BS/sector ID information 1665, system, e.g., OFDM system, timing/frequency structure information 1667, and programs' directory information 1669.

In some embodiments, a plurality of received program buffers are included, e.g., received program buffer corresponding to Nth carrier 1671. In some embodiments, a combined program buffer 1673 corresponding to a combination of information for multiple carriers is included. In some embodiments, a plurality of processed (decoded) program buffers are included, e.g., processed (decoded) program buffer corresponding to Nth carrier 1675. In some embodiments, a combined processed (decoded) program buffer 1677 is included.

In some embodiments, e.g., where the base station broadcast information is directed to a specific geographic region, geographically based received information, e.g., restaurants, hotels, etc., 1679 is included. In some embodiments, e.g., supporting multiple levels of video broadcast, video resolution level information 1681 is included. Video level resolution information 1681 includes information identifying the current video level capability, the current video level being currently received, and the current video level being displayed.

Received program buffers (1653, 1671, 1673) are used for storing received program information. Video decoder module 1647 is for decoding received compressed video information such as MPEG-4 video signals, and audio decoder module 1645 for decoding received compressed audio signals. Program playback module 1643 is used for controlling the display and/or audio output of received decoded programs.

Figure 17:
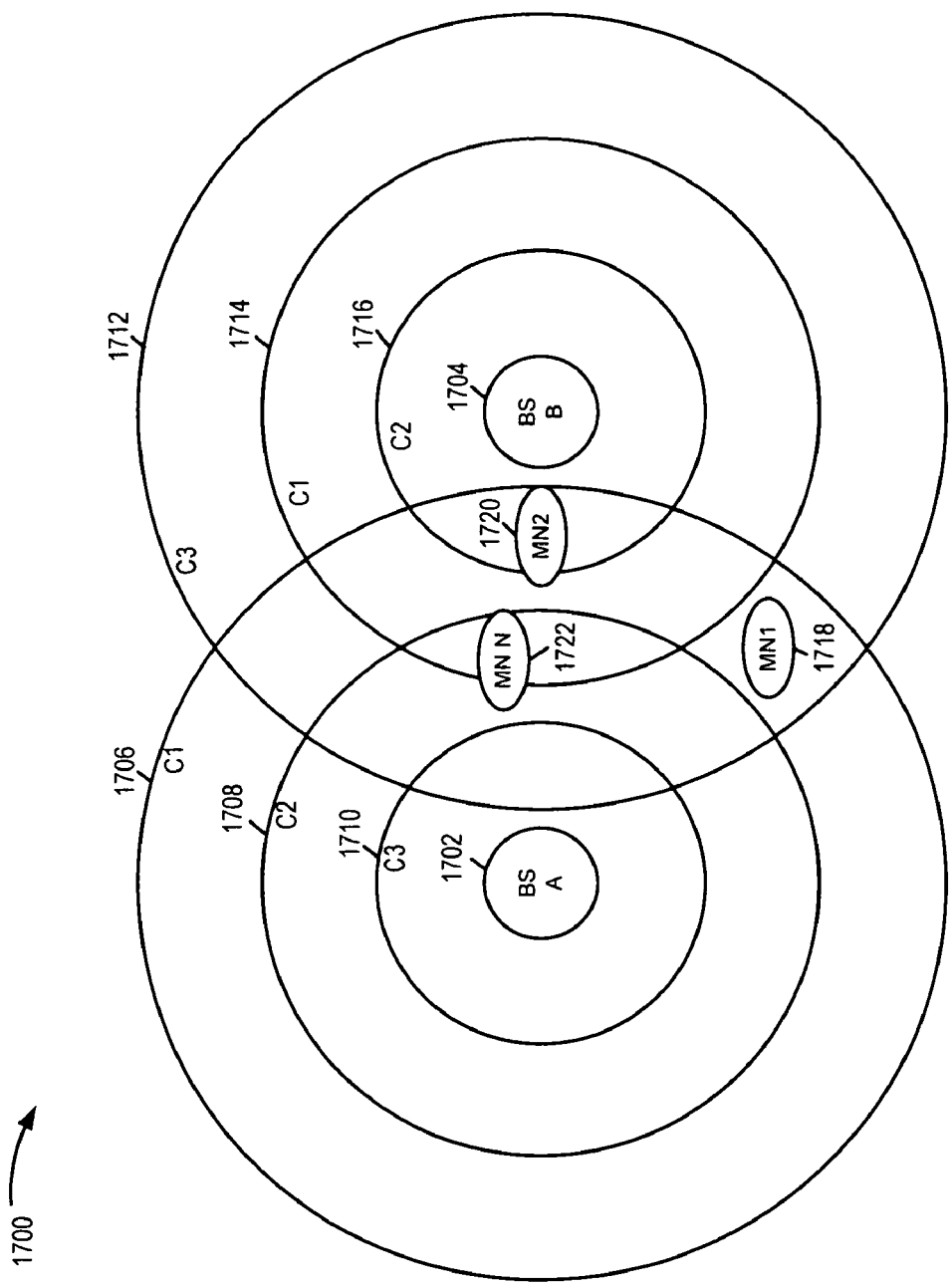
FIG. 17 is a drawing of an exemplary system, the base stations each support three carriers at different power levels and the ordering of the power levels is different with respect to the two adjacent base stations.

FIG. 17 is a drawing of an exemplary system 1700. System 1700 includes a plurality of base stations (BS A 1702, BS B 1704) and a plurality of mobile nodes (MN1 1718, MN 2 1720, MN N 1722). The base stations (1702, 1704) may be any of the exemplary BSs of FIG. 13 or FIG. 15, while the MNs (1718, 1720, 1722) may be any of the exemplary wireless terminals of FIG. 14 or FIG. 16. BS A 1702 and BS B 1704 each support three carriers at different power levels and the ordering of the power levels is different with respect to the two adjacent base stations. FIG. 17 illustrates that the selected power levels associated with different carriers of the adjacent base stations provide overlapping coverage ranges, from adjacent base stations, e.g., where a wireless terminal can be expected to be able to receive and decode signals from adjacent base stations. Multi-carrier, multi-power level embodiments, such as shown in FIG. 17 are advantageous in implementing the downlink broadcast methods.

BS A 1702 uses carrier C1 at a high transmit power level with coverage area represented by larger circle 1706; BS A 1702 uses carrier C2 at an intermediate transmit power level with coverage area represented by intermediate circle 1708; BS A 1702 uses carrier C3 at a low transmit power level with coverage area represented by small circle 1710. BS B 1704 uses carrier C3 at a high transmit power level with coverage area represented by larger circle 1712; BS B 1704 uses carrier C1 at an intermediate transmit power level with coverage area represented by intermediate circle 1714; BS B 1704 uses carrier C2 at a low transmit power level with coverage area represented by small circle 1716. Exemplary MN 1 1718 is in a coverage region where it is likely to be able to receive and recover signals: from BS A 1702 which were transmitted using carrier C1 and from BS B 1704 which were transmitted using carrier C3. Exemplary MN 2 1720 is in a coverage region where it is likely to be able to receive and recover signals: from BS A 1702 which were transmitted using carrier C1 and from BS B 1704 which were transmitted using any of carriers C3, C1 and C2. Exemplary MN N 1722 is in a coverage region where it is likely to be able to receive and recover signals: from BS A 1702 which were transmitted using any of carrier C1 and C2 and from BS B 1704 which were transmitted using any of carriers C3 and C1.

In some embodiments, segments, e.g., program segments, carry the same information transmitted by two base stations at different times. In some embodiments a segment A carrying information (A0, A1) is sent by one base station, and a segment B carrying information (A0, A2) is sent by another base station, e.g., an adjacent base station. In this exemplary embodiment, the information carried by segments A and B is not identical completely. However, it is important that an information set which is the same, A0 in this case, is repeated in the two segments.

In some embodiments, the timing offset of a first base station, e.g., BS A, sending a segment in carrier C1 and the second base station, e.g., BS B sending the segment in carrier C3 is fixed, e.g., like the relative power relationship between the carriers C1 and C3 is fixed. In this manner, a wireless terminal, e.g., mobile node, knows when to turn, e.g., switch, to which carrier to decode the segment.

Figure 18:
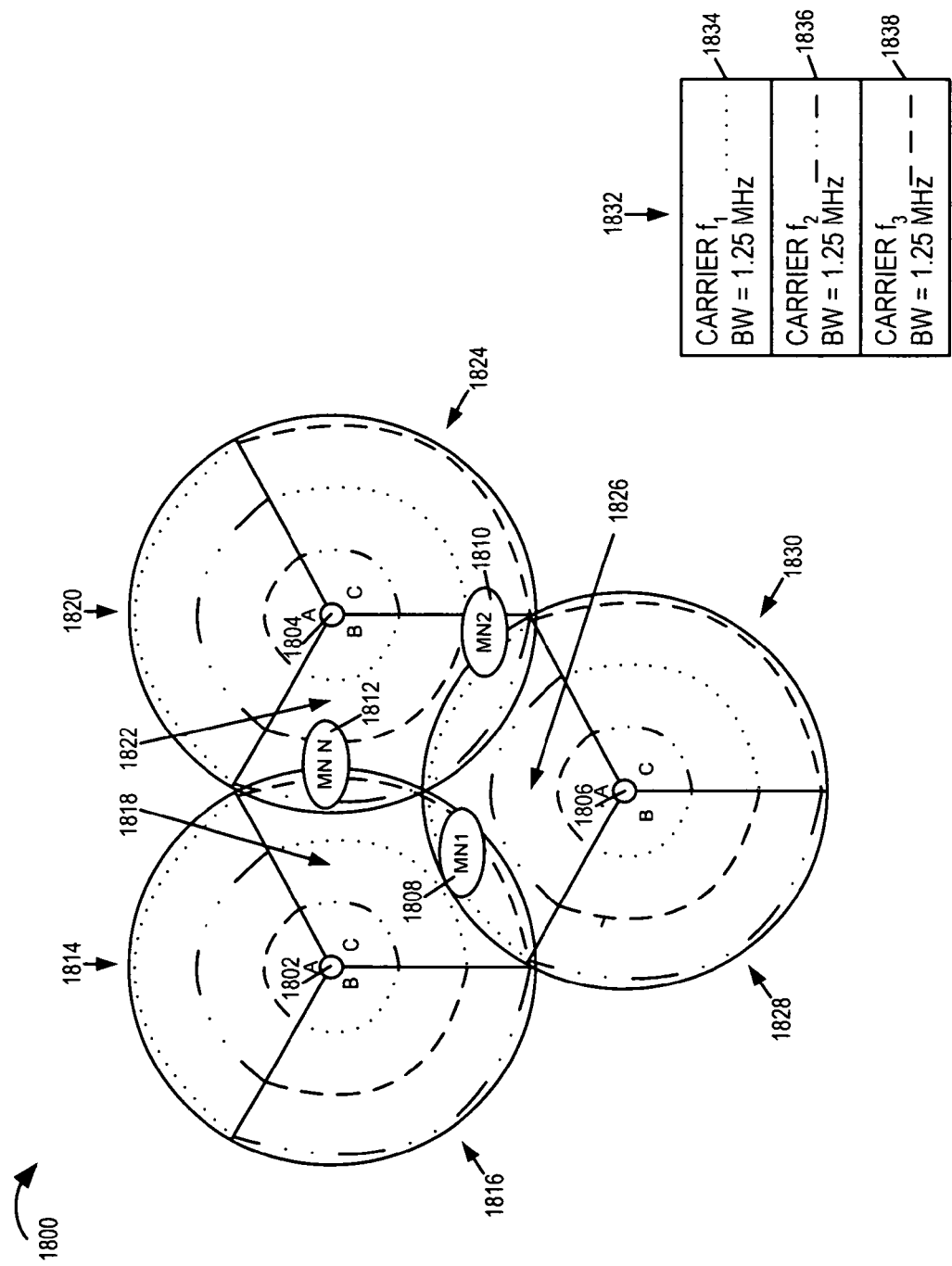
FIG. 18 is a drawing of an exemplary system; the base stations each support three sectors and three carriers in each sector; in each sector the three carriers are at different power levels and the ordering of the power levels is different with respect to the two adjacent sectors.

FIG. 18 is a drawing of an exemplary system 1800. System 1800 includes a plurality of base stations (first base station 1802, second base station 1804, third base station 1806) and a plurality of mobile nodes (MN 1 1808, MN 2 1810, MN N 1812). The base stations (1802, 1804, 1806) may be any of the exemplary BSs of FIG. 13 or FIG. 15, while the MNs (1808, 1810, 1812) may be any of the exemplary wireless terminals of FIG. 14 or FIG. 16. The base stations (1802, 1804, 1806) each support three sectors and three carriers in each sector; in each sector the three carriers are at different power levels and the ordering of the power levels is different with respect to the two adjacent sectors. Power levels are indicated by relative size of the circles surrounding the base stations; the pattern of the line for the circle portion in a given sector indicates the corresponding carrier. Legend 1832 indicates that: a dotted line 1834 is used to represent carrier $f_1$ with a bandwidth of 1.25 MHz, a dash/dot line 1836 is used to represent carrier $f_2$ with a bandwidth of 1.25 MHz, and a dashed line 1838 is used to represent carrier $f_3$ with a bandwidth of 1.25 MHz. Overlap regions between adjacent sectors and cells occurs in accordance with the selected frequencies and power levels relationships selected and used. Multi-carrier, multi-power level, multi-sector embodiments, such as shown in FIG. 18 are advantageous in implementing the downlink broadcast methods.

First base station 1802 supports a sector A 1814, a sector B 1816, and a sector C 1816. Second base station 1804 supports a sector A 1820, a sector B 1822, and a sector C 1824. Third base station 1806 supports a sector A 1826, a sector B 1828, and a sector C 1830.

For sector A 1814 of first base station 1802 carriers ($f_1, f_2, f_3$) use (high, intermediate, low) transmit power levels, respectively. For sector B 1816 of first base station 1802 carriers ($f_2, f_3, f_1$) use (high, intermediate, low) transmit power levels, respectively. For sector C 1818 of first base station 1802 carriers ($f_3, f_1, f_2$) use (high, intermediate, low) transmit power levels, respectively.

For sector A 1820 of second base station 1804 carriers ($f_1, f_2, f_3$) use (high, intermediate, low) transmit power levels, respectively. For sector B 1822 of second base station 1804 carriers ($f_2, f_3, f_1$) use (high, intermediate, low) transmit power levels, respectively. For sector C 1824 of second base station 1804 carriers ($f_3, f_1, f_2$) use (high, intermediate, low) transmit power levels, respectively.

For sector A 1826 of third base station 1806 carriers ($f_1, f_2, f_3$) use (high, intermediate, low) transmit power levels, respectively. For sector B 1828 of third base station 1806 carriers ($f_2, f_3, f_1$) use (high, intermediate, low) transmit power levels, respectively. For sector C 1830 of third base station 1806 carriers ($f_3, f_1, f_2$) use (high, intermediate, low) transmit power levels, respectively.

Exemplary MN 1 1808 is located in a region where it is likely to be able to receive and recover signals from a first base station sector C attachment point which were transmitted using carrier $f_3$. Exemplary MN 1 1808 is located in a region where it is likely to be able to receive and recover signals from a third base station sector A attachment point which were transmitted using carrier $f_1$.

Exemplary MN 2 1810 is located in a region where it is likely be able to receive and recover signals from a second base station sector B attachment point which were transmitted using carrier $f_2$ and from a second base station sector C attachment point which were transmitted using carrier $f_3$. Exemplary MN 2 1810 is located in a region where it is likely to be able to receive and recover signals from a third base station sector A attachment point which were transmitted using carrier $f_1$.

Exemplary MN N 1812 is located in a region where it is likely to be able to receive and recover signals from a first base station sector C attachment point which were transmitted using carrier $f_3$. Exemplary MN N 1812 is located in a region where it is likely be able to receive and recover signals from a second base station sector B attachment point which were transmitted using carrier $f_2$.

Figure 19:
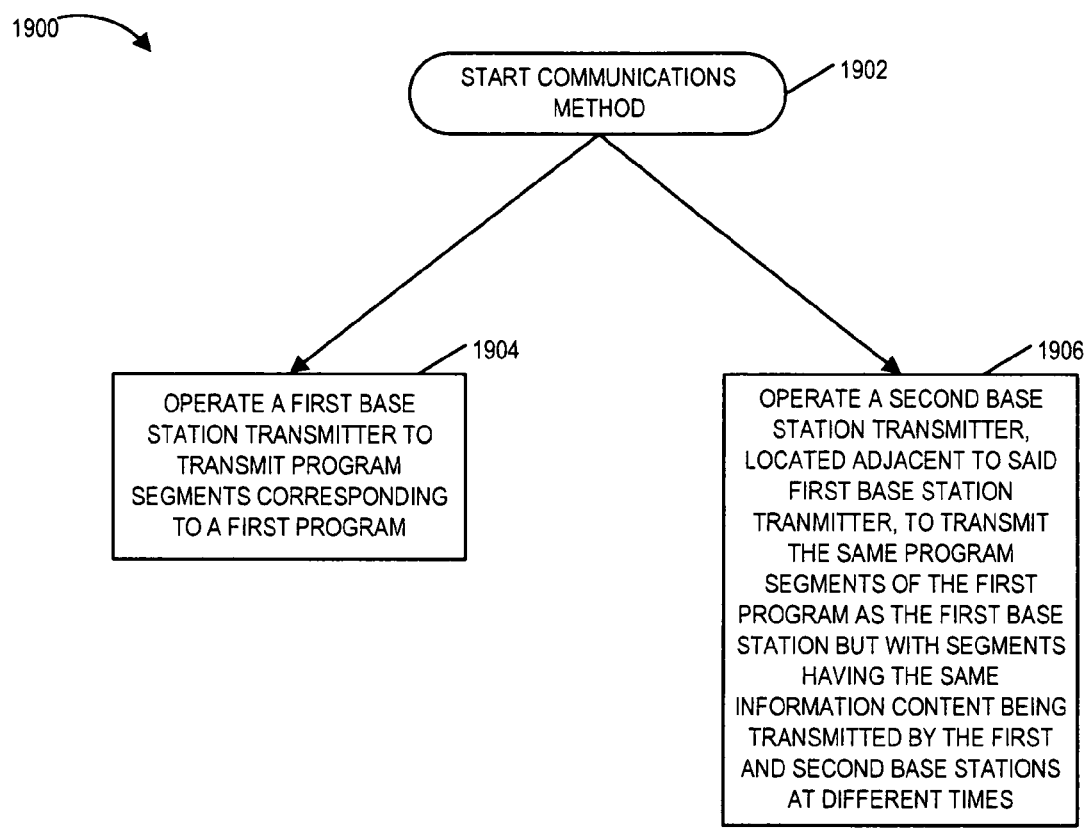
FIG. 19 is a flowchart 1900 of an exemplary communications method.

FIG. 19 is a flowchart 1900 of an exemplary communications method. Operation starts in step 1902 where a base station or base stations in the system including first and second base station transmitters are powered on and initialized. The exemplary system may be, e.g., a spread spectrum OFDM wireless communications system including a plurality of base station transmitters, capable of broadcasting downlink OFDM signals, and a plurality of wireless terminals, capable of receiving and processing OFDM signals. The first and second base station transmitters may be timing controlled such that there is a coarse level of timing synchronization between the two base station transmitters, but need not be timing controlled to achieve and maintain a high level of timing synchronization between the two base stations. For example, if the first and second base station transmitters use OFDM signaling, and the first and second base station transmitters correspond to different cells, the timing synchronization between first and second base station transmitters is not controlled to be within a cyclic prefix duration. In step 1902, a communications program may be communicated to the base station or stations including first and second base station transmitters, e.g., via a backhaul network with the program originating from a content provider's server node. The backhaul network may include wired and/or wireless links, e.g., fiber optic cables, microwave links, etc. Alternatively, in step 1902, an initial portion of the program may have been provided to the base station or stations including first and second base station transmitters, with additional portions being provided at subsequent times, e.g., while the first and second base station transmitters are in the process of broadcasting the previously received portions over downlink wireless channels to be available for reception by wireless terminals, e.g., mobile nodes.

Operation proceeds from start step 1902 to steps 1904 and 1906. In step 1904, a first base station transmitter is operated to transmit program segments corresponding to a first program. In step 1906, a second base station transmitter, located adjacent to the first base station transmitter, is operated to transmit the same program segments of the first program as the first base station transmitter but with segments having the same information content being transmitted by the first and second base station transmitters at different times.

In some embodiments, the first and second base station transmitters are located in adjacent single sector cells. In other embodiments, the first and second base station transmitters are sector transmitters located in adjacent sectors, the communications method being used in a system with multi-sector cells, and the adjacent sectors are sectors of the same cell or sectors of adjacent multi-sector cells.

In various embodiments, the first base station transmitter transmits program segments corresponding to the first program using a first carrier, and the second base station transmitter transmits program segments corresponding to the first program using a second carrier which has a different frequency from the first carrier. In some such embodiments, the program segments transmitted by the first base station transmitter corresponding to the first program are transmitted at a first transmission power level, and the program segments transmitted by the second base station transmitter corresponding to the first program are transmitted at a second transmission power level which is different than the first transmission power level.

In some embodiments, the step of operating a second base station transmitter, located adjacent to the first base station transmitter to transmit the same program segments of the first program as the first base station but with segments having the same information content being transmitted by the first and second base station transmitters at different times includes controlling the different times to be due to a timing offset, e.g., a fixed timing offset with a corresponding timing offset tolerance being maintained by the second base station transmitter. In some such embodiments, where the information program segments are transmitted using OFDM symbols which are transmitted with cyclic prefixes, the transmission timing offset between the program segments having the same information content by the first and second base station transmitters is greater than the duration of a cyclic prefix.

In some OFDM embodiments, the first and second base station transmitters are not synchronized to within a cyclic prefix duration and the transmission offset between program segments transmitted by the first and second base stations with the same information content exceeds the duration of a symbol transmission time period which includes the time used to transmit one OFDM symbol and a corresponding cyclic prefix. In some such embodiments, the time offset between transmission of a program segment by the first base station transmitter and the transmission of a program segment having the same program content by the second base station transmitter at least equals the amount of time used to transmit the program segment, e.g., the amount of time used to transmit the program segment by the first and second transmitters, the amount of time used to transmit the program segment by the second transmitter, or the amount of time used to transmit the program segment by the first transmitter.

In various embodiments, the first base station transmitter does not transmit a program segment corresponding to the first program when the second base station transmitter transmits a program segment corresponding to the first program, the first and second base station transmitters transmitting program segments corresponding to the first program on an interleaved basis. In some such embodiments, the interleaved program segments are transmitted on a periodic basis by the first and second base station transmitters with the transmission time between program segments corresponding to the first program being less than 5 seconds.

In some embodiments, the first and second base station transmitters each transmit signals using multiple carrier frequencies, and adjacent base station transmitters use different transmission power levels for the same carrier frequency. In some such embodiments, each carrier frequency corresponds to a different OFDM tone block, the tones of different OFDM tone blocks being non-overlapping in terms of frequency.

In some embodiments, the first and second base station transmitters each transmit signals using three carrier frequencies; adjacent base station transmitters use different transmission power levels for the same carrier frequency; each carrier corresponds to a different OFDM tone block; the tones of different OFDM tone block being non-overlapping in terms of frequency, and for a given transmitter, its three tone blocks being contiguous tone blocks in terms of frequency.

Figure 20:
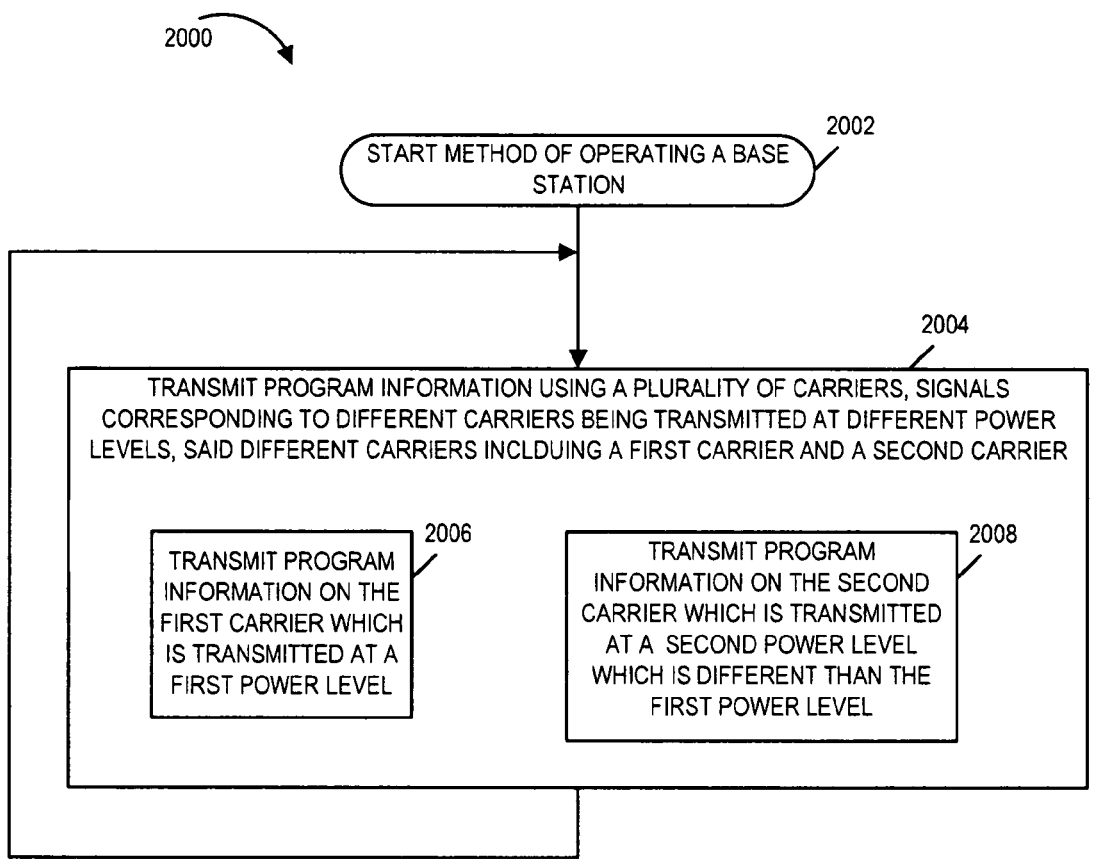
FIG. 20 is a drawing of a flowchart 2000 of an exemplary method of operating a base station.

FIG. 20 is a drawing of a flowchart 2000 of an exemplary method of operating a base station in accordance with various embodiments. The method starts in step 2002, where the base station is powered on and initialized. Operation proceeds from start step 2002 to step 2004. In step 2004, the base station is operated to transmit program information using a plurality of carriers, signals corresponding to different carriers being transmitted at different power levels, said different carriers including a first carrier and a second carrier. In some embodiments, the plurality of carriers includes at least three different carriers and step 2004 includes transmitting some of the same program information each of the three different carriers but at different power levels.

Step 2004 includes sub-steps 2006 and 2008. In sub-step 2006, the base station is operated to transmit program information on the first carrier which is transmitted at a first power level. In sub-step 2008, the base station is operated to transmit program information on the second carrier which is transmitted at a second power level which is different than the first power level.

In various embodiments, transmitting program information on a second carrier, e.g. sub-step 2008, includes transmitting program information at a second transmitted information data rate which is different from a first transmitted information data rate at which program information is transmitted on the first carrier. For example, in some such embodiments, the first power level is lower than the second power level and the first information data rate is higher than the second transmitted information data rate.

In various embodiments, the program information includes a video program and transmitting program information on the first carrier, e.g., sub-step 2006, includes transmitting at least a portion of the video program at a first video resolution on the first carrier. In some such embodiment, transmitting program information on the second carrier, e.g., sub-step 2008, includes transmitting program information on the second carrier at a resolution which is lower than the resolution at which program information is transmitted on the first carrier. In some embodiments, step 2004 includes transmitting at least some of the same program information on both said first and second carriers but at different resolutions.

In some embodiments, transmitting program information includes transmitting the same program information on the first and second carriers and transmitting on said first carrier additional program information not transmitted on said second carrier. In some embodiments, transmitting program information includes transmitting more program information on a first carrier during a period of time than is transmitted on said second carrier during the same time period.

In some embodiments, the second carrier signal covers a wider geographic region than the first carrier region, e.g., due to a higher power level associated with the second carrier, and the method further comprises transmitting information about businesses located within a first coverage area of the first carrier and transmitting information about businesses outside said first coverage area but within the coverage area of said second carrier using the second carrier.

In various embodiments, the program information transmitted on the second carrier, e.g., in sub-step 2008, is basic video information and the program information transmitted on the first carrier, e.g., in sub-step 2006, is enhancement information which can be combined with the basic video program to provide a higher quality video presentation than is possible using only the program information transmitted on the second carrier.

In some embodiments, the program information transmitted on the second carrier, e.g. in sub-step 2008, is a basic program and the program information transmitted on the first carrier, e.g., in sub-step 2006, includes the basic program plus additional content. In some such embodiments the additional content includes at least one of: video content not included in the basic program, support for additional languages not included in the basic program, a text stream to be displayed with the basic video content, advertisements not transmitted on the second carrier.

In some embodiments, the program information transmitted on the second carrier, e.g., in sub-step 2008, is a basic program and the program information transmitted on the first carrier, e.g., in sub-step 2006, can be combined with the program information on the second carrier to provide additional content. In some such embodiments the additional content includes at least one of: video content not included in the basic program, support for additional languages not included in the basic program, a text stream to be displayed with the basic video content, and advertisements.

Figure 21:
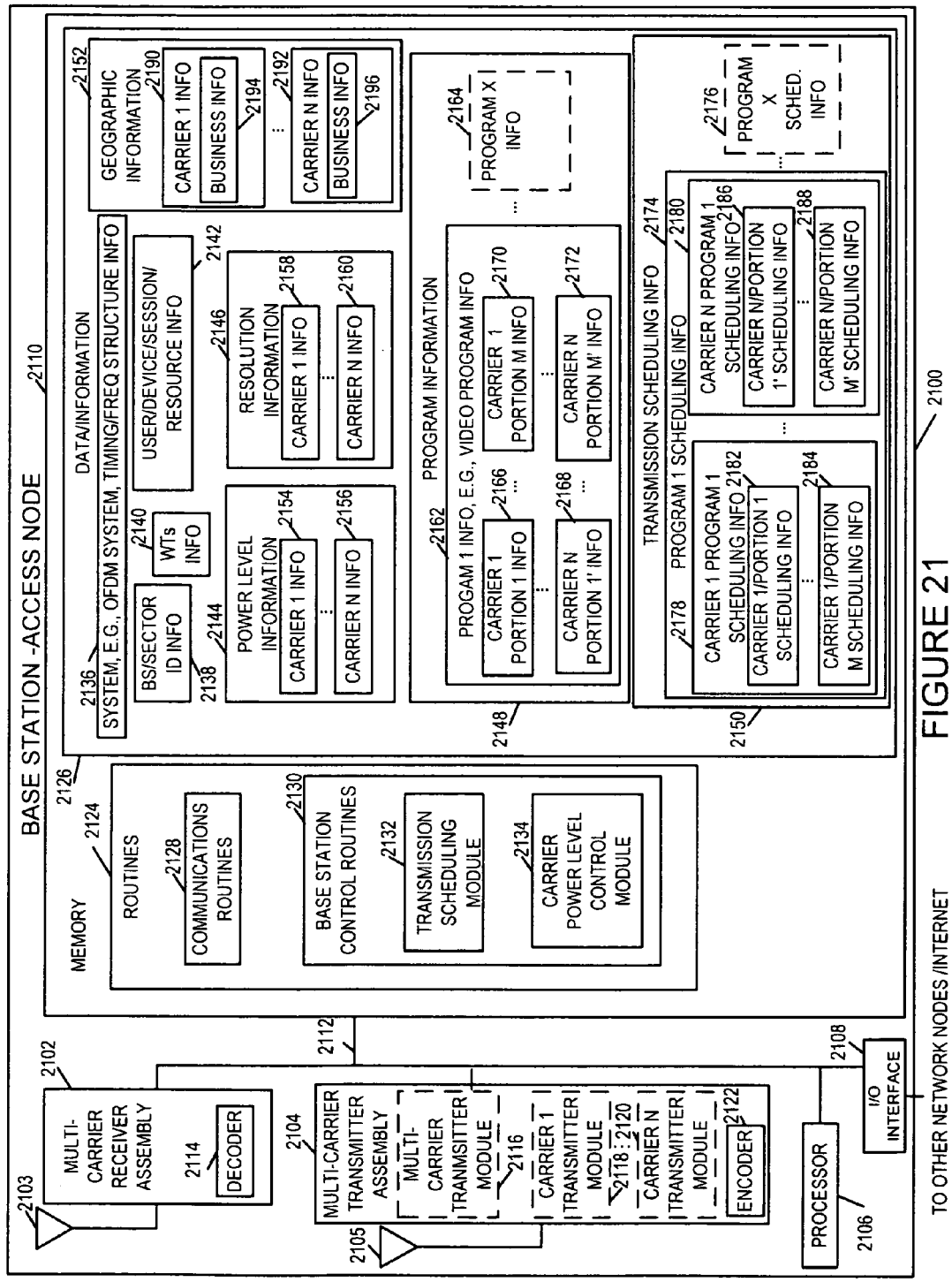
FIG. 21 is a drawing of an exemplary base station, e.g., access node.

FIG. 21 is a drawing of an exemplary base station 2100, e.g., access node 2100. Exemplary base station 2100 includes a multi-carrier receiver assembly 2102, a multi-carrier transmitter assembly 2104, a processor 2106, an I/O interface 2108, and memory 2110 coupled together via a bus 2112 via which the various elements interchange data and information. Memory 2110 includes routines 2124 and data/information 2126. The processor 2106, e.g., a CPU, executes the routines 2124 and uses the data/information 2126 in memory 2110 to control the operation of the base station 2100 and implements methods.

I/O interface 2108 couples the base station 2100 to other network nodes, e.g., routers, other base stations, program content servers, AAA servers, routers, control nodes, core nodes, etc., and/or the Internet. Thus program information to be broadcast is received, e.g., from various program content servers, via I/O interface 2108.

Multi-carrier receiver assembly 2102 is coupled to receive antenna 2103 via which the base station receives uplink signals from wireless terminals. Multi-carrier receiver assembly 2102 includes a decoder 2114 for decoding at least some of the received uplink signals. Received uplink signals, in some embodiments, include registration request signals from wireless terminal, requesting to receive a broadcast program.

Multi-carrier transmitter assembly 2104 transmits program information under control of transmission scheduling module 2132 using at least a first and second carrier. In various embodiments, the multi-carrier transmitter assembly 2104 transmits program information on first and second carriers at first and second transmitted information data rates, respectively, and the first and second transmission data rates are different. Multi-carrier transmitter assembly 2104 is coupled to a transmit antenna 2105 via which the base station 2100 transmits downlink signals to wireless terminals. Downlink broadcast signals include information conveying one or more broadcast programs. In some embodiments, the multi-carrier transmitter assembly 2104 includes one or more multi-carrier transmitter modules 2116. For example, in some embodiments a single base station transmitter transmits on frequencies corresponding to a plurality of downlink carriers, e.g., three downlink carriers with each downlink carrier corresponding to a downlink OFDM tone block. In some embodiments, the multi-carrier transmitter assembly 2104 includes a plurality of single carrier transmitter modules (carrier 1 transmitter module 2118, . . . , carrier N transmitter module 2120).

In one exemplary embodiment, where the base station 2100 corresponds to a single sector cell using three downlink carriers, the multi-carrier transmitter assembly 2104 includes a single three-carrier transmitter module 2116. In one exemplary embodiment, where the base station 2100 corresponds to a single sector cell using three downlink carriers, the multi-carrier transmitter assembly 2104 includes three single carrier transmitter modules.

In one exemplary embodiment, where the base station 2100 corresponds to a three sector cell using three downlink carriers, the multi-carrier transmitter assembly 2104 includes three three-carrier transmitter modules 2116. In one exemplary embodiment, where the base station 2100 corresponds to a three sector cell using three downlink carriers, the multi-carrier transmitter assembly 2104 includes nine single carrier transmitter modules.

Multi-carrier transmitter assembly 2104 includes an encoder 2122 for encoding at least some of the information to be broadcast via downlink broadcast signals. In some embodiments, various downlink programs are encrypted, e.g., with access being limited to authorized wireless terminals.

Routines 2124 include communications routines 2128 and base station control routines 2130. The communications routines 2128 implement the communications protocols used by the base station 2100. The communications routines 2128 also handle various communications operations, e.g., controlling I/O interface 2108 operation to receive program content, from program content servers, to be broadcast.

Base station control routines 2130 include a transmission scheduling module 2132 and a carrier power level control module 2134. Transmission scheduling module 2132 schedules the transmission of program information on a plurality of carriers, e.g., first and second downlink carriers being used by multi-carrier transmitter assembly 2104. Carrier power level control module 2134 uses the data/information 2126 including the power level information 2144 to control the transmission power level of the plurality of downlink carriers being used by the base station 2100, e.g., to maintain a power differential between first and second downlink carriers corresponding to a multi-carrier transmitter assembly 2104. In various embodiments, the carrier power level control module 2134 controls a first power level associated with a first downlink carrier to be lower than a second power level associated with a second downlink carrier with regard to a multi-carrier transmitter assembly 2104.

Data/information 2126 includes system, e.g., OFDM system, timing and frequency structure information 2136, base station/sector identification information 2138, wireless terminals' information 2140 and user/device/session/resource information 2142. In various embodiments, the downlink channel structure includes segments, e.g., indexed segments in a recurring structure with at least some of the indexed segments being allocated for conveying downlink broadcast program information. System timing and frequency structure information 2136 includes downlink/uplink channel structure information, downlink/uplink carrier information, downlink/uplink tone block information, downlink/uplink tone hopping information, etc. Base station/sector identification information 2138 includes base station cell identification information, sector identification information and/or sector type information, e.g., corresponding to each multi-carrier transmitter assembly 2104. Wireless terminals' information 2140 includes information associated with a plurality of wireless terminals using base station 2100. In some embodiments, WTs information 2140 includes registration information, security information and/or accounting information associated with wireless terminals receiving transmitted programs. User/device/session/resource information 2142 includes user identification information, device identification information, and air link resource information associated with wireless terminals participating in communications sessions with peer nodes and/or receiving transmitted, e.g., broadcast, programs. In various embodiments base station 2100 supports both transmitted, e.g., broadcast, programs and communications sessions including two peer wireless terminals. In various embodiments, at least some of the broadcast programs are directed to select groups of uses, e.g., a multi-cast group having authorized access. In some embodiments, base station 2100 supports broadcast signaling but does not support communications sessions including two peer wireless terminals.

Data/information 2126 also includes power level information 2144, resolution information 2146, program information 2148, and transmission timing scheduling information 2150. Power level information 2144 includes a plurality of power level information (carrier 1 power level information 2154, . . . , carrier N power level information 2156) used by carrier power level control module 2134 to control multi-carrier transmitter assembly 2104. In some embodiments, the power level information 2144 indicates that at least two of the different carriers used by multi-carrier transmitter assembly 2104 will be transmitted at different power levels. In some embodiments, the power level information 2144 indicates that each of the different carriers used by multi-carrier transmitter assembly 2104 will be transmitted at different power levels. Resolution information 2146 includes a plurality of resolution levels (carrier 1 resolution information 2158, . . . , carrier N resolution information 2160) associated with each of the carriers used by multi-carrier transmitter assembly 2104. For example, in some embodiments, carrier N for multi-carrier transmitter module 2104, corresponds to information facilitating a basic level of video resolution, while carrier 1 for multi-carrier transmitter module 2104 corresponds to information facilitating a high level of video resolution, e.g., an enhanced video resolution level with respect to the basic level.

Program information 2148 includes information corresponding to one or more programs to be transmitted from base station 2100 (program 1 information 2162, . . . , program X information 2164). Program 1 information 2162, e.g., video program information, includes a plurality of portions of program 1 information corresponding to each of the carriers being used by multi-carrier transmitter assembly 2104 to convey program 1 information (carrier 1 portion 1 information 2166, . . . , carrier 1 portion M information 2170), . . . , (carrier N portion 1' information 2168, . . . , carrier N portion M' information 2172).

Transmission scheduling information 2150, e.g., used by and/or generated by transmission scheduling module 2132 includes a plurality of sets of program scheduling information corresponding to the one or more programs to be transmitted (program 1 scheduling information 2174, . . . , program X scheduling information 2176). Program 1 scheduling information 2174 includes a plurality of sets of program scheduling information associated with the plurality of carriers used by multi-carrier transmitter assembly 2104 to transmit program 1 (carrier 1 program 1 scheduling information 2178, . . . , carrier N program 1 scheduling information 2180). Carrier 1 program 1 scheduling information 2178 includes scheduling information corresponding to a plurality of portions of program 1, (carrier 1/portion 1 scheduling information 2182, . . . , carrier 1/portion M scheduling information 2184). Carrier N program 1 scheduling information 2180 includes scheduling information corresponding to a plurality of portions of program 1, (carrier N/portion 1' scheduling information 2186, . . . , carrier N/portion M' scheduling information 2188).

Geographic information 2152 includes a plurality of sets of information associated with the different carriers used by multi-carrier transmitter assembly 2104 (carrier 1 geographic information 2190, . . . , carrier N geographic information 2192). Carrier 1 geographic information 2190 includes business information 2194 and carrier N geographic information 2192 includes business information 2196. For example, in some embodiments, a second carrier, e.g. carrier N, covers a wider geographic region than a first carrier, e.g., carrier 1, corresponding to the multi-carrier transmitter module 2104 and the multi-carrier transmitter module 2104 is controlled, e.g., via the transmission scheduling module 2132, to transmit information about businesses located within a first coverage area of first carrier using the first carrier and transmit information about businesses outside the first coverage area but within the coverage area of the second using the second carrier.

Figure 22:
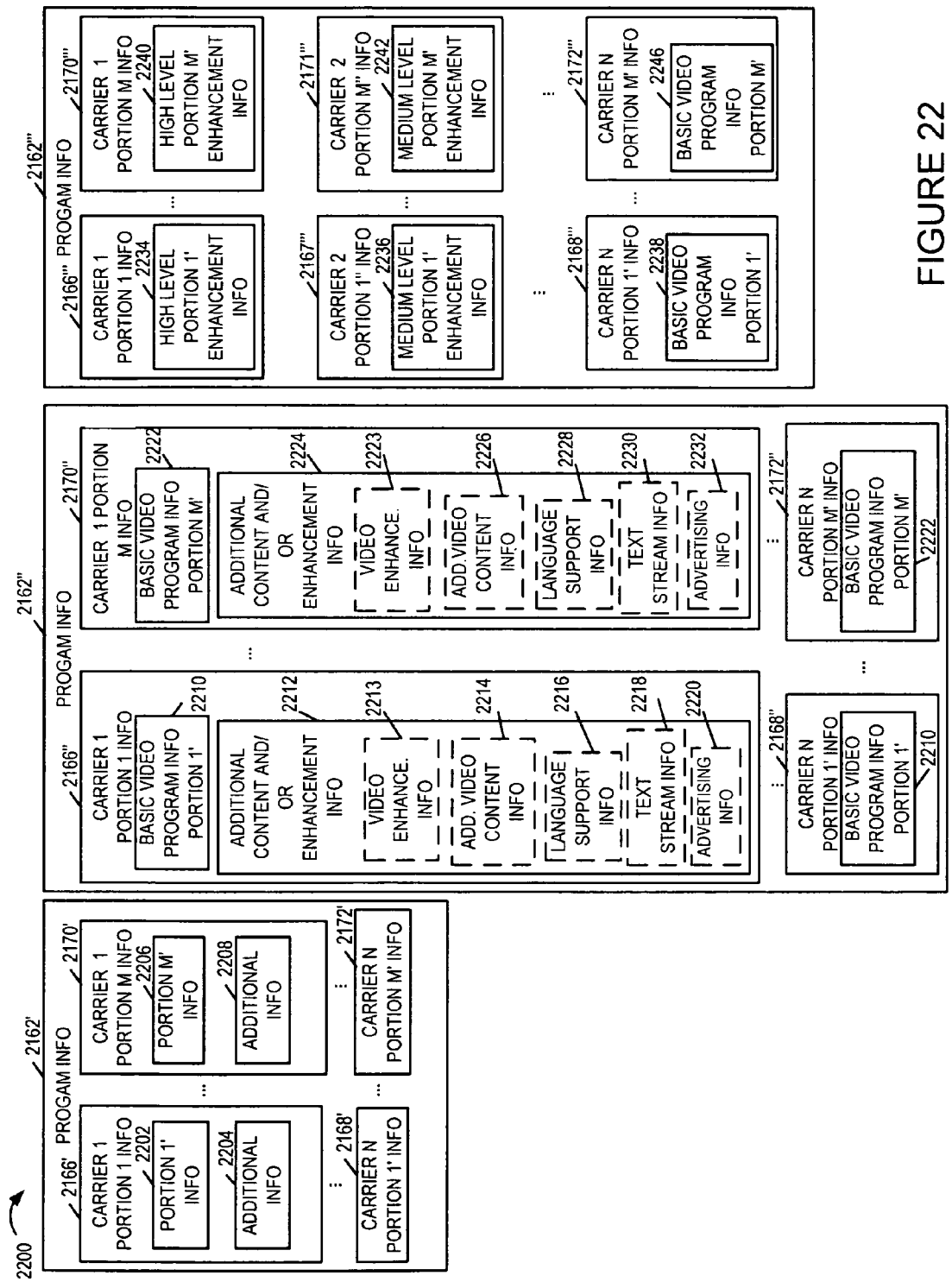
FIG. 22 is a drawing illustrating several exemplary sets of program information.

FIG. 22 is a drawing 2200 illustrating several exemplary sets of program information (2162', 2162", 2162'''). A set of program information, e.g., set 2162', set 2162", or set 2162''' may be any of the program information sets (program 1 information 2162, . . . , program X information 2164) of FIG. 21.

Exemplary program information set 2162' includes a plurality of sets of carrier 1 information (carrier 1 portion 1 information 2166', . . . carrier 1 portion M information 2170') and a plurality of sets of carrier N information (carrier N portion 1' information 2168', . . . , carrier N portion M' information 2172'). Carrier 1 portion 1 information 2166' includes portion 1' information 2202 and additional information 2204. Carrier N portion M information 2170' includes portion M' information 2206 and additional information 2208. In various embodiments, portion 1' information 2202 is the same as carrier N portion 1' information 2168' and portion M' information 2206 is the same as carrier N portion M' information 2172'. In some such embodiments, the additional information (2204, . . . , 2208) transmitted using carrier 1 is not transmitted using carrier N with respect the multi-carrier transmitter assembly 2104.

Exemplary program information set 2162" includes a plurality of sets of carrier 1 information (carrier 1 portion 1 information 2166", . . . carrier 1 portion M information 2170") and a plurality of sets of carrier N information (carrier N portion 1' information 2168", . . . , carrier N portion M' information 2172"). Carrier N portion 1' information 2168" includes basic video program information portion 1' 2210 and carrier N portion M' information 2172" includes basic video program information portion M' 2222. Carrier 1 portion 1 information 2166" includes basic video program information portion 1' 2210 and additional content and/or enhancement information 2212. Additional content and/or enhancement information 2212 includes at least one of video enhancement information 2213, additional video content information 2214, language support information 2216, text stream information 2218, and advertising information 2220. Carrier 1 portion M information 2170" includes basic video program information portion M' 2222 and additional content and/or enhancement information 2224. Additional content and/or enhancement information 2224 includes at least one of video enhancement information 2223, additional video content information 2226, language support information 2228, text stream information 2230, and advertising information 2232.

Exemplary program information set 2162''' includes a plurality of sets of carrier 1 information (carrier 1 portion 1 information 2166''', . . . carrier 1 portion M information 2170'''), a plurality of sets of carrier 2 information (carrier 2 portion 1" information 2167''', . . . , carrier 2 portion M" information 2171''') and a plurality of sets of carrier N information (carrier N portion 1' information 2168''', . . . , carrier N portion M' information 2172'''). Carrier N portion 1' information 2168''' includes basic video program information portion 1' 2238 and carrier N portion M' information 2172''' includes basic video program information portion M' 2246. Carrier 2 portion 1" information 2167''' includes medium level portion 1' enhancement information 2236 and carrier N portion M" information 2171''' includes medium level portion M' enhancement information 2242. Carrier 1 portion 1 information 2166''' includes high level portion 1' enhancement information 2234 and carrier N portion M information 2170''' includes high level portion M' enhancement information 2240.

In some embodiments, the enhancement data associated with a particular carrier is such that a wireless terminal receiving and decoding program information from two carriers, the carrier carrying the basic video and the carrier carrying the enhancement, can achieve the level of enhancement associated. For example, if a wireless terminal receives and successfully decodes carrier N and carrier 2 information with respect to the program, the wireless terminal can combine the information to achieve a medium level of video presentation which is higher than the basic level of video presentation. Continuing with the example, if a wireless terminal receives and successfully decodes carrier N and carrier 1 information with respect to the program, the wireless terminal can combine the information to achieve a high level of video presentation which is higher than the medium level of video presentation.

In some embodiments, the enhancement data associated with various carriers is such that a wireless terminal can achieves a basic level of presentation when using the carrier associated with the basic video program, and a first level of enhancement when using two carriers, and a third level of enhancement when using three carriers, etc. For example, consider that program information 2162''' includes information corresponding to three carriers, e.g., N=3. If carrier 3 program information is successfully received and decoded by a wireless terminal the basic video program can be displayed. If carrier 3 program information and carrier 2 program information are received and successfully decoded a medium level of enhanced program can be displayed. If carrier 3 program information, carrier 2 program information, and carrier 1 program information are successfully received and decoded a high level of enhanced program can be displayed. In various embodiments, the power levels and/or information data rates associated with the carriers are such the basic video program is expected to have a higher probability of successful decoding than the medium level enhancement information is expected to have, and the medium level enhancement information is expected to have a higher probability of successful decoding than the high level enhancement information is expected to have.

Figure 23:
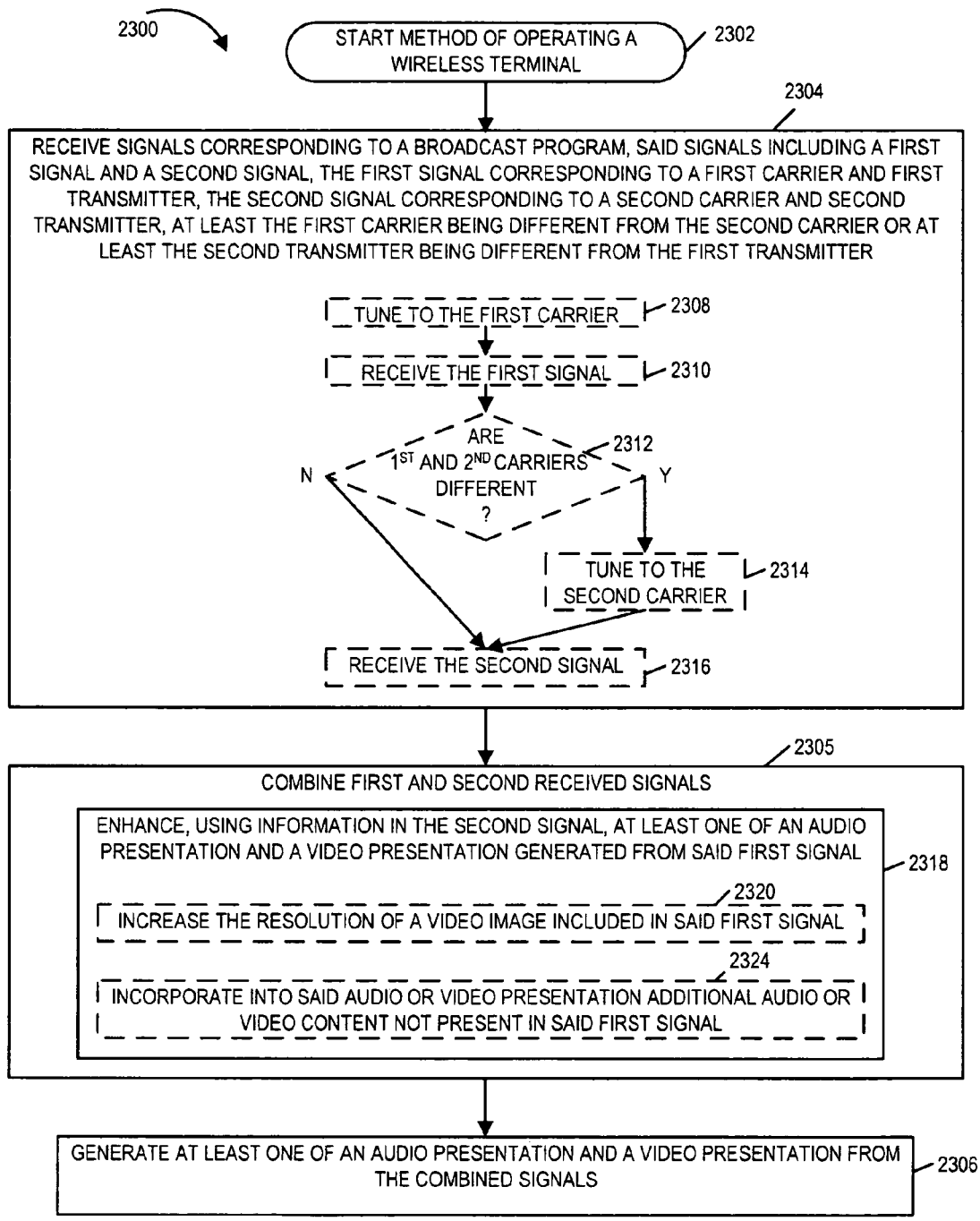
FIG. 23 is a drawing of a flowchart of an exemplary method of operating a wireless terminal.

FIG. 23 is a drawing of a flowchart 2300 of an exemplary method of operating a wireless terminal. The exemplary method starts in step 2302, where the wireless terminal is powered on and initialized. Operation proceeds from start step 2302 to step 2304.

In step 2304, the wireless terminal is operated to receive signals corresponding to a broadcast program, said signals, e.g., OFDM signals, including a first signal and a second signal, the first signal corresponding to a first carrier and first transmitter, the second signal corresponding to a second carrier and second transmitter, at least the first carrier being different from the second carrier or at least the second transmitter being different from the first transmitter. In one example, the first and second carriers are the same and the first and second transmitters are different. In another example, the first and second carriers are different and the first and second transmitters are the same transmitter. In another example, the first and second carriers are different and the first and second transmitters are different.

In some embodiments, e.g., some embodiments using a single receiver chain where first and second carriers may be different, step 2304, includes sub-steps 2308, 2310, 2312, 2314 and 2316.

In sub-step 2308, the wireless terminal tunes to a first carrier, and then in sub-step 2310 the wireless terminal receives the first signal. Operation proceeds from sub-step 2310 to sub-step 2312. In sub-step 2312, the wireless terminal checks as to whether the first and second carriers are different. If the wireless terminal determines in sub-step 2312 the first and second carriers are different, then operation proceeds to sub-step 2314, where the wireless terminal re-tunes to the second carrier. Operation proceeds from sub-step 2314 to sub-step 2316. If the wireless terminal determines in sub-step 2312 the first and second carriers are the same, then operation proceeds to sub-step 2316. In sub-step 2316, the wireless terminal receives the second signal.

Operation proceeds from step 2304 to step 2305. In step 2305 the wireless terminal combines the first and second signals. In some embodiments, the first signal is a basic program signal and the second signal is an enhancement signal. Step 2305 includes sub-step 2318. In sub-step 2318, the wireless terminal enhances, using information in the second signal, at least one of an audio presentation and a video presentation generated from the first signal. In various embodiments, sub-step 2318 includes at least one of sub-steps 2320 and 2324. In sub-step 2320, the wireless terminal increases the resolution of a video image included in said first signal. In sub-step 2324, the wireless terminal incorporates into said audio or video presentation additional audio or video content not present in said first signal. For example, in some embodiments, additional content includes at least one of: video content not included the basic program, audio content not include in the basic program, support for additional languages not included in the basic program, a text stream to be displayed with said basic video content, and advertisements.

Operation proceeds from step 2305 to step 2306. In step 2306, the wireless terminal generates at least one of an audio presentation and a video presentation from the combined signals.

Figure 24:
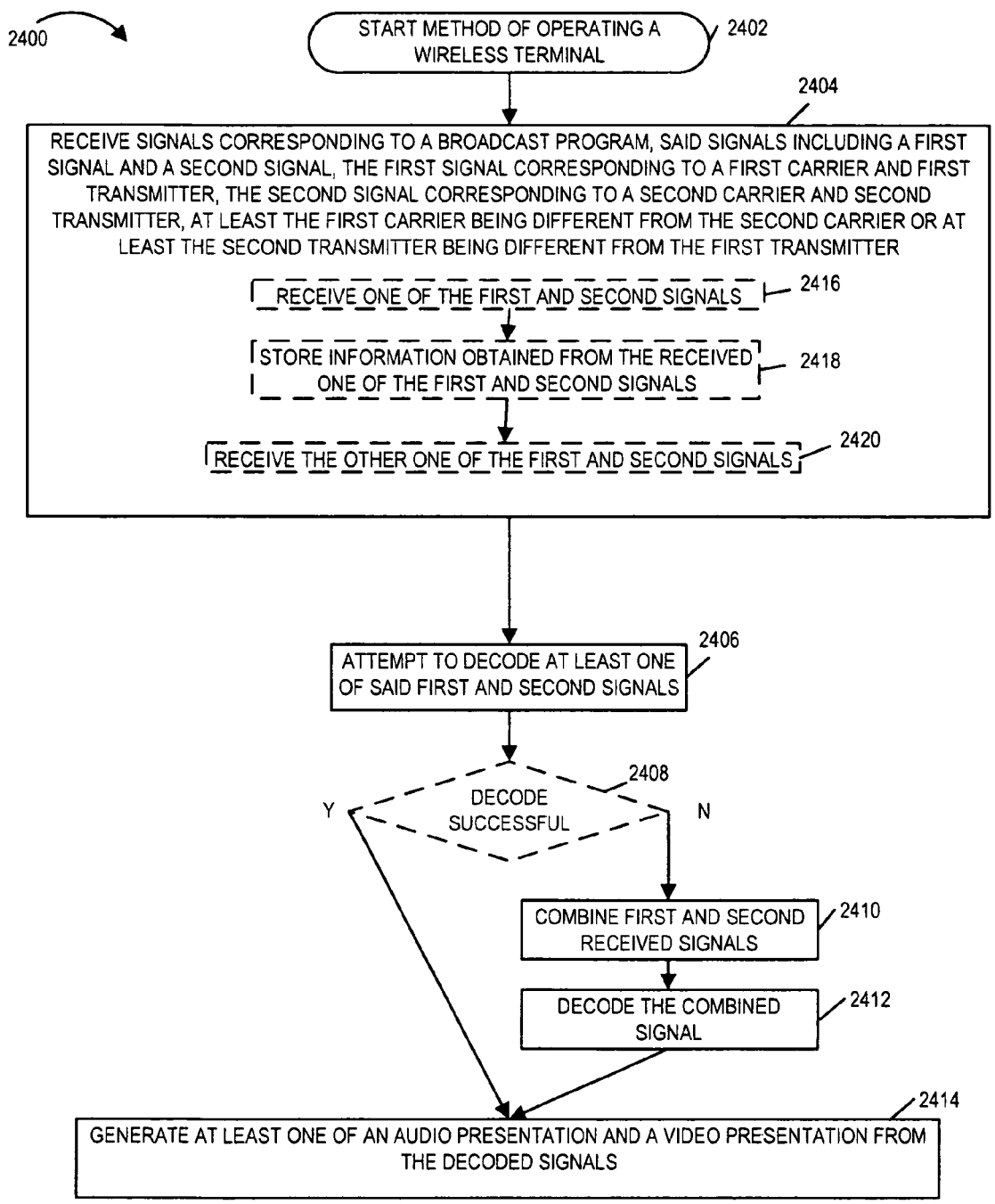
FIG. 24 is a drawing of a flowchart of an exemplary method of operating a wireless terminal.

FIG. 24 is a drawing of a flowchart 2400 of an exemplary method of operating a wireless terminal. The exemplary method starts in step 2402, where the wireless terminal is powered on and initialized. Operation proceeds from start step 2402 to step 2404.

In step 2404, the wireless terminal is operated to receive signals corresponding to a broadcast program, said signals including a first signal and a second signal, the first signal corresponding to a first carrier and first transmitter, the second signal corresponding to a second carrier and second transmitter, at least the first carrier being different from the second carrier or at least the second transmitter being different from the first transmitter. In one example, the first and second carriers are the same and the first and second transmitters are different. In another example, the first and second carriers are different and the first and second transmitters are the same transmitter. In another example, the first and second carriers are different and the first and second transmitters are different. In some embodiments, the first and second signals include the same content but are received on different carriers or from different transmitters.

In some embodiments, e.g., some embodiments where the first and second signals are received at different times, step 2404, includes sub-steps 2416, 2418 and 2420. In sub-step 2416, the wireless terminal receives one of the first and second signals. Operation proceeds from sub-step 2416 to sub-step 2418. In sub-step 2418, the wireless terminal stores information obtained from the received one of the first and second signals. Operation proceeds from sub-step 2418 to sub-step 2420. In sub-step 2420, the wireless terminal receives the other one of the first and second signals which was not received in sub-step 2416.

Operation proceeds from step 2404 to step 2406. In step 2406, the wireless terminal attempts to decode at least one of said first and second signals, and then in step 2408 the result of the attempted decode is checked. If the attempted decode of step 2406 was successful, operation proceeds from step 2408 to step 2414. If the attempted decode of step 2406 was unsuccessful, operation proceeds from step 2408 to step 2410. In step 2410, the wireless terminal combines first and second received signal, and then in step 2412, the wireless terminal decodes the combined signal. Operation proceeds from step 2412 to step 2414. In step 2414, the wireless terminal generates at least one of an audio presentation and video presentation from the decoded signal information.

Figure 25:
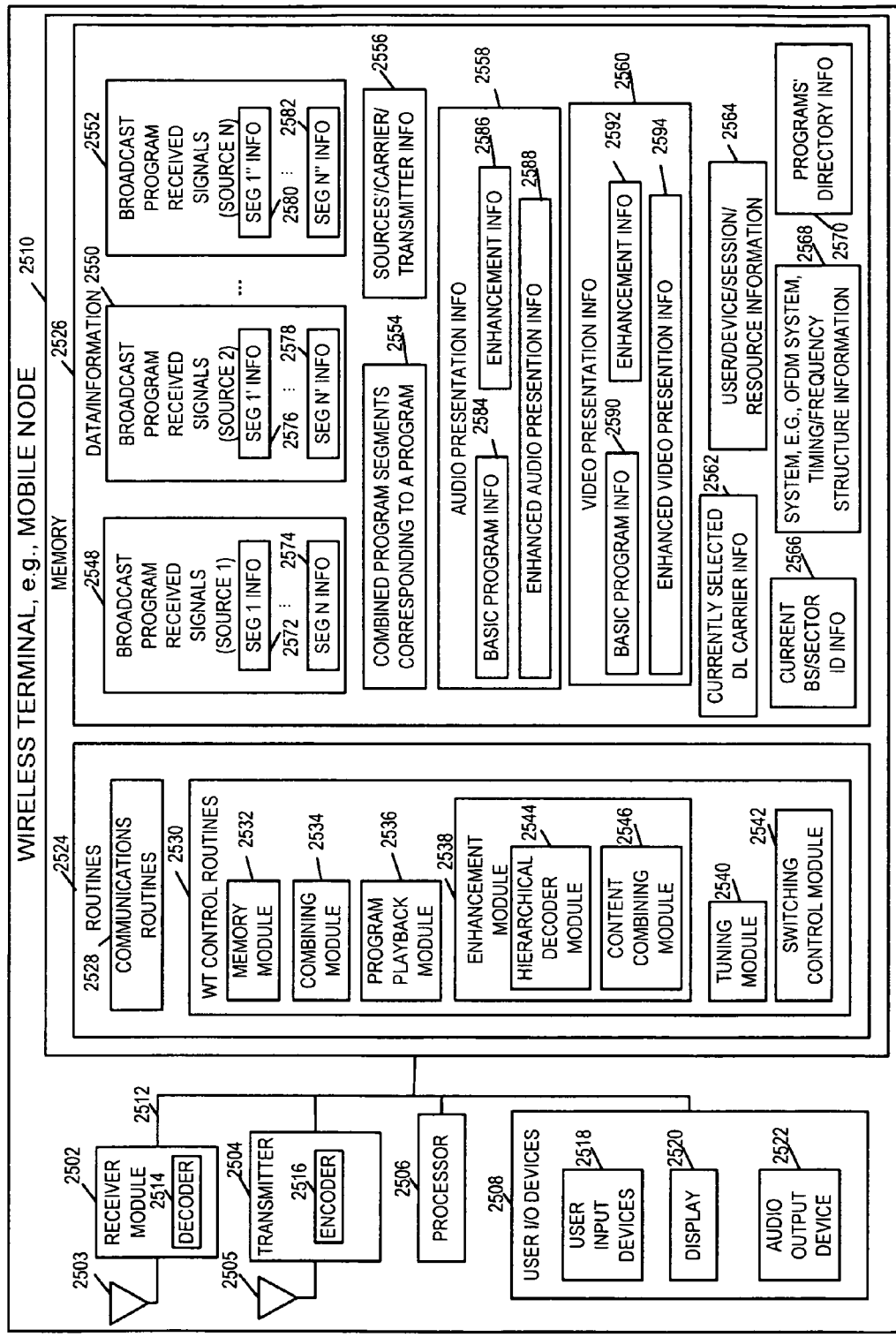
FIG. 25 is a drawing of an exemplary wireless terminal, e.g., mobile node.

FIG. 25 is a drawing of an exemplary wireless terminal 2500, e.g., mobile node. Exemplary wireless terminal 2500 includes a receiver module 2502, a transmitter module 2504, a processor 2506, user I/O devices 2508, and memory 2510 coupled together via a bus 2512 via which the various elements interchange data and information. Memory 2510 includes routines 2524 and data/information 2526. The processor 2506, e.g., a CPU, executes the routines 2524 and uses the data/information 2526 in memory 2510 to control the operation of the wireless terminal and implement methods.

Receiver module 2502, e.g., an OFDM receiver, is coupled to receive antenna 2503 via which the wireless terminal receives downlink signals from base station transmitters, the downlink signals including broadcast program information from one or more sources. Receiver module 2502 receives signals corresponding to a broadcast program, said signals including a first and second signal, the first signal corresponding to a first carrier and a first transmitter, the second signal corresponding to a second carrier and a second transmitter, at least the first carrier being different from the second carrier or at least the second transmitter being different from the first transmitter. Receiver module 2502 includes a decoder 2514 for decoding at least some of the received downlink signals.

Transmitter module 2504, e.g., an OFDM transmitter, is coupled to transmit antenna 2505 via which the wireless terminal 2500 transmits uplink signals to base stations. In some embodiments, the uplink signals include registration signals and/or requests for access to receive and recover a broadcast program. Transmitter module 2504 includes a encoder 2516 for encoding at least some of the uplink signals to be transmitted.

User I/O devices 2508 include user input devices 2518, e.g., keypad, keyboard, switches, microphone, camera input, etc., a display 2520, and an audio output device 2522, e.g., speaker and associated amplification and/or audio processing circuitry.

User input devices 2518 are used by an operator of wireless terminal 2500 to select a broadcast program, to request access, to logon, and/or to perform other interface operations. Display 2520 allows a user of wireless terminal 2500 to view recovered presented video program information. Audio output device 2522 allows a user of wireless terminal 2500 to listen to recovered presented audio presentation information.

Routines 2524 include a communications routine 2528 and wireless terminal control routines 2530. The communications routines 2528 implement various communications protocols used by the wireless terminal 2500. Wireless terminal control routines 2530 include a memory module 2532, a combining module 2534, a program playback module 2536, an enhancement module 2538, a tuning module 2540, and a switching control module 2542. Enhancement module 2538 includes a hierarchical decoder module 2544 and a content combining module 2546.

Memory module 2532 stores multiple received signals corresponding to the broadcast program received from different carriers and/or different transmitters. Different transmitters may correspond to different base stations, different base station sector transmitters of the same base station, and/or different carrier transmitters for the same sector of the same base station. Broadcast program received signals from source 1 2548, broadcast program received signals from source 2 2550, . . . , broadcast program received signals from source N 2552 are examples of information stored by memory module 2532.

Combining module 2534 combines received signals received on different carriers and/or from different base station for use in generating a program presentation. Broadcast program received signals (2548, 2550, 2552) are inputs to combining module 2534 and combined program segments corresponding to a program 2554 is an output of combining module 2534.

Program playback module 2536 generates at least one of an audio presentation and video presentation from the combined signals, e.g., represented by audio presentation information 2558 and video presentation information 2560.

Enhancement module 2538 enhances, using information in a second signal, e.g., received broadcast information from a second source, at least one of audio presentation information and a video presentation generated from a first signal, e.g., received broadcast information from a first source. For example, basic audio program information 2584 and/or basic video program information 2590 can be from first signal from source 1, while audio presentation enhancement information 2586 and/or video presentation enhancement information 2590 can include information form a second signal from source 2, and the enhancement module 2538 operations result in an enhanced audio presentation information 2588 and/or enhanced video presentation information 2594.

Hierarchical decoder module 2544 increases the resolution of a video image included in a first signal, e.g., from a first source, by performing a hierarchical decoding operation using a second signal, e.g., from a second source as an enhancement signal. In various embodiments, the hierarchical decoder further increases the resolution of a video image, by performing a hierarchical decoding operation including using a third signal, e.g., from a third source as a further enhancement signal.

Content combining module 2546 incorporates into an audio presentation and/or video presentation additional audio and/or video content from a second signal, e.g., from a second source, which is not present in the first signal.

Tuning module 2540 tunes to one of the carriers being used by the wireless terminal receiver module 2502 to receive broadcast program signals, e.g., one of a first and second carrier corresponding to source 1 and source 2. Switching control module 2542 controls the tuning module 2540 to switch between first and second carriers, e.g., in accordance with stored timing information corresponding to broadcast program segment timing associated with different transmission sources.

Data/information 2526 includes one or more sets of broadcast program received signals (broadcast program received signals from source 1 2548, broadcast program received signals from source 2 2550, . . . , broadcast program received signals from source N 2552), combined program segments corresponding to a program 2554, sources'/carrier/transmitter information 2556, audio presentation information 2558, video presentation information 2560, currently selected downlink carrier information 2562, user/device/session/resource information 2564, current base station/sector identification information 2566, system, e.g., OFDM system, timing/frequency structure information 2568 and programs' directory information 2570.

Broadcast program received signals from source 1 2548 includes one or more segments information (segment 1 information 2572, . . . , segment N information 2574). Broadcast program received signals from source 2 2550 includes one or more segments information (segment 1' information 2576, . . . , segment N' information 2578). Broadcast program received signals from source N 2552 includes one or more segments information (segment 1" information 2580, . . . , segment N" information 2582).

Audio presentation information 2558 includes basic program information 2584, enhancement information 2586, and enhanced audio presentation information 2588. Video presentation information 2560 includes basic program information 2590, enhancement information 2592, and enhanced video presentation information 2594.

Sources'/carrier/transmitter information 2556 includes information correlating each of the different sources of broadcast program signals with a downlink carrier being used and information identifying the transmitter. Currently selected downlink carrier information 2562 includes information identifying the carrier to which receiver module 2502 is currently tuned to. User/device/session/resource information 2564 includes, e.g., user identification information, device identification information, device parameter setting information, session information, and air link resource information, e.g., which downlink traffic channel segments the wireless terminal should receive and process to receive an audio/video program presentation. Current base station/sector identification information 2566 includes information identifying the base station, sector, and/or carrier associated with the sources of broadcast signals being received by wireless terminal 2500. System, e.g., OFDM system, timing/frequency structure information 2568 includes, e.g., system downlink/uplink channel structure information, downlink uplink carrier information, downlink/uplink tone OFDM tone block information, downlink/uplink frequency hopping information, symbol timing information, timing information related to grouping of multiple OFDM symbol transmission times, and program segment timing information. Programs' directory information 2570 includes, e.g., information identifying a plurality of audio and/or video programs, information associating the different programs with different base station attachments points, a base station attachment point corresponding to a base station, base station sector and downlink carrier, and information identifying the type of information being conveyed via a base station attachment point broadcast of the program, e.g., a basic program or presentation enhancement information.

Figure 26:
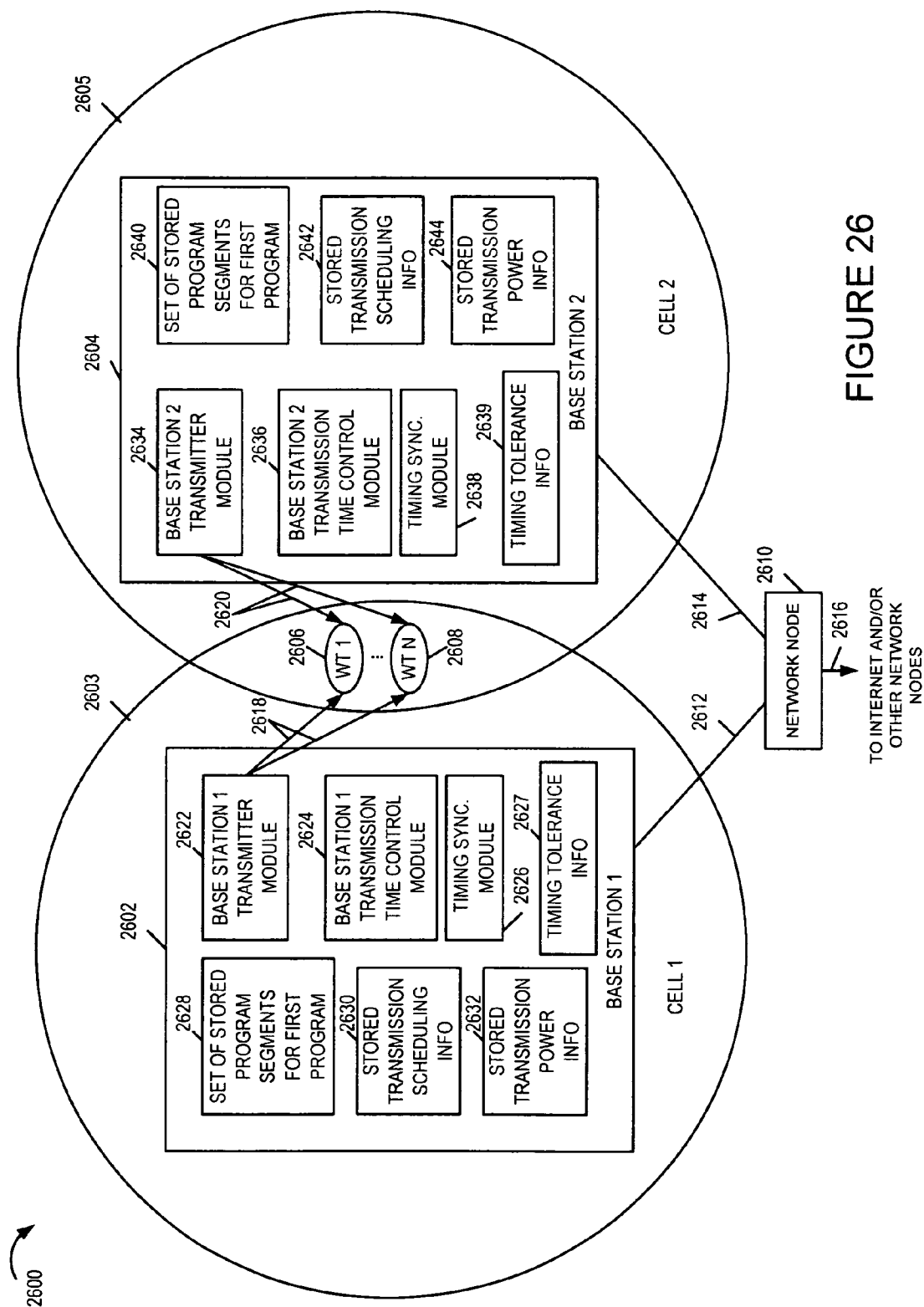
FIG. 26 is a drawing of an exemplary communications system, e.g. an OFDM communications system supporting broadcast of programs.

FIG. 26 is a drawing of an exemplary communications system 2600, e.g. an OFDM communications system supporting broadcast of programs Exemplary communications system 2600 includes a plurality of base stations (base station 1 2602, base station 2 2604), a plurality of wireless terminals, e.g., mobile nodes (wireless terminal 1 2606, . . . , wireless terminal N 2608), and a network node 2610. Base station 1 2602 is a single sector base station having a cellular coverage area of cell 1 2603; base station 2 2604 is a single sector base station having a cellular coverage area of cell 2 2605. Base station 1 2602 and base station 2 2604 are located adjacent one another. The base stations (2602, 2604) are coupled to network node 2610, e.g., a router, via network links (2612, 2614), respectively. Network node is coupled to the Internet and/or other network nodes via network link 2616. Network links (2612, 2614, 2616) are, e.g., fiber optic links or copper wire lines.

The wireless terminals (2606, 2608) communicate with base stations via wireless links. The wireless terminals (2606, 2608) are shown receiving downlink broadcast program signals from the base stations. Base station 1 2602 transmits downlink broadcast program signals 2618 which is received by the wireless terminals (2606, 2608). Base station 2 2604 transmits downlink broadcast program signals 2620 which is received by the wireless terminals (2606, 2608).

Base station 1 2602 includes a transmitter module 2622, a transmission timing control module 2624, a timing synchronization module 2626, a set of stored program segments for the first program 2628, stored transmission timing scheduling information 2630, stored transmission power information 2632, and timing tolerance information 2627. Base station transmitter 2622 transmits program segments corresponding to the first program, e.g., at least some of the set of stored program segments for the first program 2628. Transmission timing control module 2624 controls the first base station transmitter 2622 to transmit program segments at times which are different from the times at which program segments having the same information content are transmitted by the second base station transmitter 2634. In some embodiments, the transmission timing control module 2622 controls the first base station transmitter 2622 to transmit program segments having the same information content as program segments being transmitted by the second base station transmitter, at different non-overlapping times than the times at which the same program segments are transmitted by the second base station transmitter. The stored transmission scheduling information 2630 includes information indicating when program segments corresponding to the first program are to be transmitted by the first base station transmitter 2622 using a first carrier. Stored transmission power level information 2632 includes information indicating a first transmission power level at which the program segments corresponding to the first program are to be transmitted from the first base station transmitter 2622 using the first carrier. In various embodiments, the first and second base station transmitters (2622, 2634) are not timing synchronized to within a cyclic prefix duration. Timing synchronization module 2622 maintains timing synchronization between first base station transmitter module 2622 and second base station transmitter module 2634 to maintain a level of timing synchronization which is within a maximum tolerance, said maximum timing tolerance being greater than an OFDM cyclic prefix duration of an OFDM symbol transmitted by the first base station transmitter 2622. Timing tolerance information 2627 includes the maximum timing tolerance value being used by timing synchronization module 2626.

Base station 2 2604 includes a transmitter module 2634, a transmission timing control module 2636, a timing synchronization module 2638, a set of stored program segments for the first program 2640, stored transmission timing scheduling information 2642, stored transmission power information 2644, and timing tolerance information 2639. Base station transmitter 2634 transmits program segments corresponding to the first program, e.g., at least some of the set of stored program segments for the first program 2640. Transmission timing control module 2636 controls the second base station transmitter 2634 to transmit program segments at times which are different from the times at which program segments having the same information content are transmitted by the first base station transmitter 2622. In some embodiments, the transmission timing control module 2636 controls the second base station transmitter 2634 to transmit program segments having the same information content as program segments being transmitted by the first base station transmitter 2622, at different non-overlapping times than the times at which the same program segments are transmitted by the first base station transmitter 2622. The stored transmission scheduling information 2642 includes information indicating when program segments corresponding to the second program are to be transmitted by the second base station transmitter 2634 using a second carrier, the second carrier being different from the first carrier. Stored transmission power level information 2642 includes information indicating a second transmission power level at which the program segments corresponding to the first program are to be transmitted from the second base station transmitter 2634 using the second carrier, the second transmission power level being different from the first transmission power level. Timing synchronization module 2638 maintains timing synchronization between second base station transmitter module 2634 and first base station transmitter module 2622 to maintain a level of timing synchronization which is within a maximum tolerance, said maximum timing tolerance being greater than an OFDM cyclic prefix duration of an OFDM symbol transmitted by the first base station transmitter 2622. Timing tolerance information 2639 includes the maximum timing tolerance value being used by timing synchronization module 2638.

In some other embodiments, the first and second base station transmitters are sector transmitters and at least one of the first and second transmitters are located in a multi-sector cell.

Figure 27:
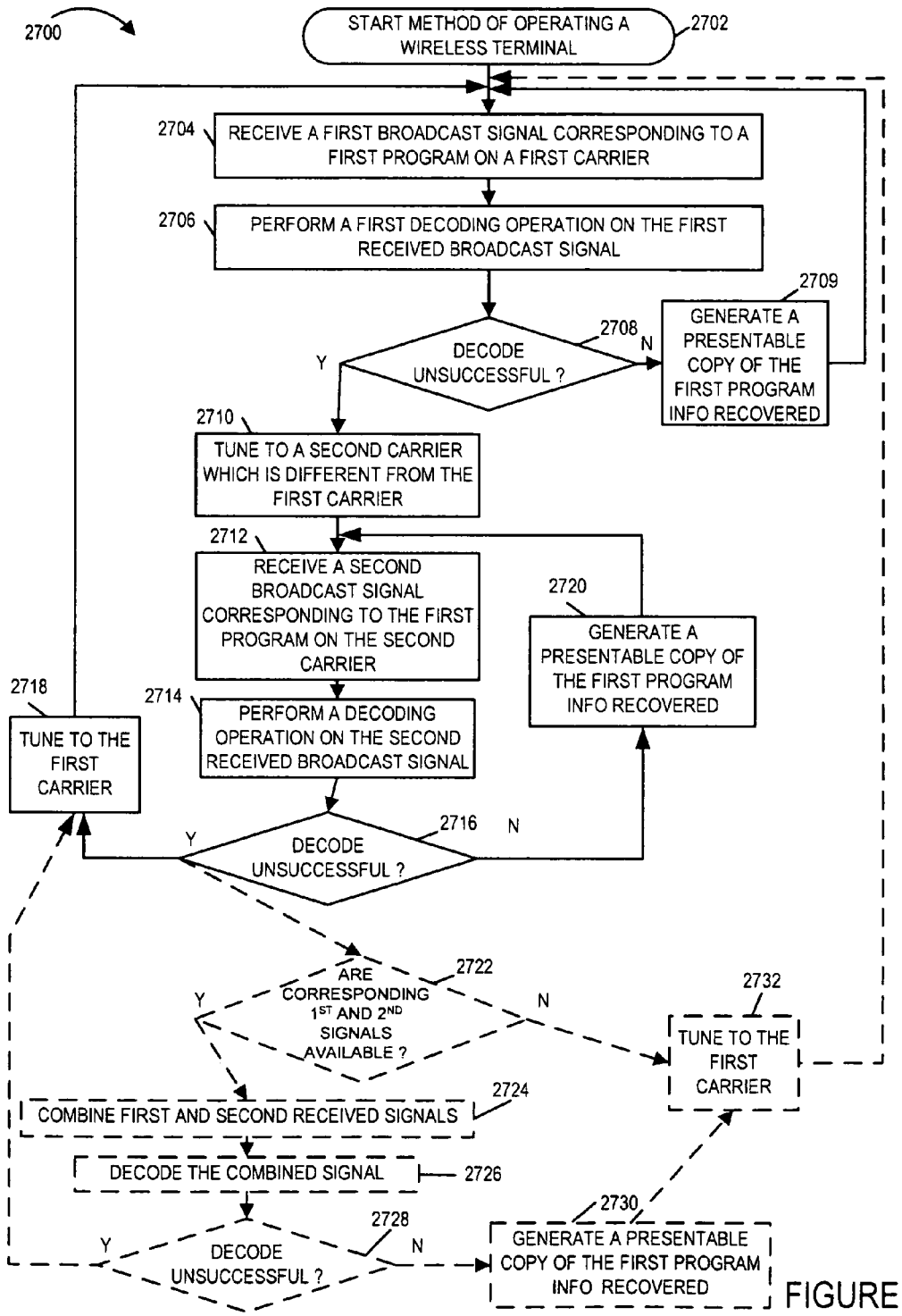
FIG. 27 is a flowchart of an exemplary method of operating a wireless terminal.

FIG. 27 is a flowchart 2700 of an exemplary method of operating a wireless terminal. The exemplary method starts in step 2702, where the wireless terminal is powered on and initialized. Operation proceeds from start step 2702 to step 2704. In step 2704, the wireless terminal is operated to receive a first broadcast signal corresponding to a first program on a first carrier. Operation proceeds from step 2704 to step 2706. In step 2706, the wireless terminal is operated to perform a first decoding operation on the first received broadcast signal, and then in step 2708 operation is directed based on the result of the decoding operation of step 2706. If the wireless terminal determines that the decode of step 2706 was unsuccessful, operation proceeds from step 2708 to step 2710; however, if it is determined that the decode of step 2706 was successful then operation proceeds from step 2708 to step 2709.

In step 2710, the wireless terminal tunes to a second carrier which is different from the first carrier, and in step 2712 the wireless terminal receives a second broadcast signal corresponding to the first program on the second carrier. Operation proceeds from step 2712 to step 2714. In step 2714, the wireless terminal performs a decoding operation on the second received broadcast signal, and in step 2716 operation is directed based upon the result of the decoding operation of step 2714. If the wireless terminal determines that the decode of step 2714 was unsuccessful, operation proceeds from step 2716 to step 2718; however, if the wireless terminal determines that the decode of step 2714 was successful, operation proceeds from step 2716 to step 2720.

Returning to step 2709, in step 2709, the wireless terminal generates a presentable copy of the first program information recovered. Operation proceeds from step 2709 to step 2704, where the wireless terminal receives another broadcast signal corresponding to the first program being conveyed by the first carrier, e.g., the next program segment.

Returning to step 2720, in step 2720, the wireless terminal generates a presentable copy of the first program information recovered. Operation proceeds from step 2720 to step 2712, where the wireless terminal receives another broadcast signal corresponding to the first program being conveyed by the second carrier, e.g., the next program segment.

Returning to step 2718, in step 2718, the wireless terminal tunes to the first carrier. Operation proceeds from step 2718 to step 2704, where the wireless terminal receives another broadcast signal corresponding to the first program being conveyed using the first carrier, e.g., the next program segment.

An alternative method of proceeding if the decode of step 2714 is unsuccessful will now be described. If the decode of step 2714 is unsuccessful, operation proceeds from step 2716 to step 2722. In step 2722, the wireless terminal determines if there are corresponding $1^{st}$ and $2^{nd}$ signals available, e.g., $1^{st}$ and $2^{nd}$ signals corresponding to the same program segment have been received and information stored. If the information is available, operation proceeds from step 2722 to step 2724; otherwise operation proceeds from step 2722 to step 2732. In step 2724, the wireless terminal combines first and second received signals, and then in step 2726 the wireless terminal performs a decoding operation on the combined signal. Operation proceeds from step 2726 to step 2728. In step 2728, the wireless terminal proceeds based on the result of the decoding operation of step 2726. If the wireless terminal determines that in step 2726, the decode was unsuccessful, operation proceeds from step 2728 to step 2718; however, if the wireless terminal determines that in step 2726 the decode was successful, then operation proceeds from step 2728 to step 2730. In step 2730, the wireless terminal generates a presentable copy of the first program information recovered. Operation proceeds from step 2730 to step 2732. In step 2732, the wireless terminal tunes to the first carrier. Operation proceeds from step 2732 to step 2704, where the wireless terminal receives another broadcast signal corresponding to the first program being conveyed on the first carrier, e.g., the next program segment.

Returning to step 2718, in step 2718 the wireless terminal tunes to the first carrier. Operation proceeds from step 2718 to step 2704, where the wireless terminal receives another broadcast signal corresponding to the first program being conveyed on the first carrier, e.g., the next program segment.

In some embodiments, following a successful decode, the recovered information is stored, and a presentable copy of the first program information that has been recovered is generated at a later time, e.g., the generation of the presentable copy of the first program information corresponding to the assembly of multiple recovered program segments.

In various embodiments, the first carrier corresponds to a first base station transmitter and the second carrier corresponds to a second base station transmitter, said first and second base station transmitters being located in adjacent cells of sectors. In various embodiments the first and second received signal include the same program content but are received at different times.

Figure 28:
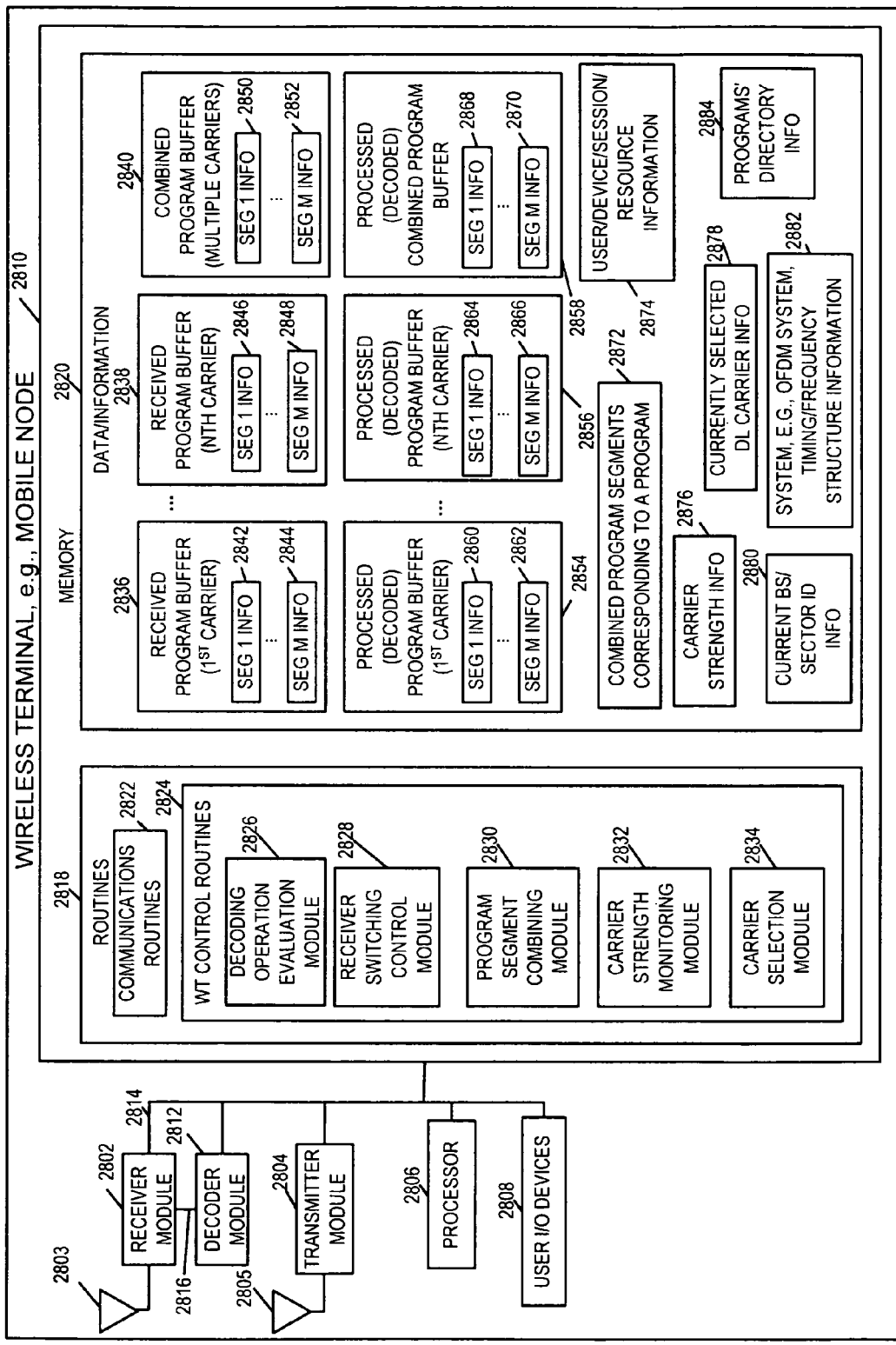
FIG. 28 is a drawing of an exemplary wireless terminal, e.g., mobile node.

FIG. 28 is a drawing of an exemplary wireless terminal 2800, e.g., mobile node. Exemplary wireless terminal 2800 includes a receiver module 2802, a transmitter module 2804, a processor 2806, user I/O devices 2808, memory 2810, and a decoder module 2812 coupled together via a bus 2814 over which the various elements interchange data and information. The decoder module 2812 is also coupled to receiver module 2802 via link 2816. In various embodiments, decoder module 2812 is included as part of receiver module 2802 and/or as part of memory 2810. Memory 2810 includes routines 2818 and data/information 2820. The wireless terminal 2800 executes the routines 2818 and uses the data/information 2820 in memory 2810 to control the operation of the wireless terminal.

Receiver module 2802, e.g., an OFDM receiver, is coupled to receive antenna 2803 via which the wireless terminal receives downlink signals, the downlink signals including broadcast programs from one or more base station transmitters. In various embodiments, receiver module 2802 is a single carrier receiver capable of receiving a single carrier at a time.

Decoder module 2812, which is coupled to receiver module 2802, performs decoding operations on the received broadcast signals. The decoding module 2802 can perform decoding operations on signals received from a single source and decoding operations on combined signals received from multiple sources.

User I/O devices 2808 allow a user to control at least some operations of the wireless terminal 2800, input information, select a broadcast program, hear an audio output presentation of a received and recovered broadcast program, and/or view a video output of a received and recovered broadcast program. User I/O devices 2808 include, e.g., user input devices such as keypad, keyboard, switches, touch-screen, microphone, camera, etc., display devices such as a video screen, and audio output devices such as a speaker.

Transmitter module 2804, e.g., an OFDM transmitter, is coupled to transmit antenna 2705 via which the wireless terminal transmits uplink signals to base stations. In some embodiments, some of the uplink signals include at least one of: a request for access to a broadcast program, accounting information, e.g., pertaining to a broadcast program or programs being received and presented to the user of wireless terminal 2800, an authorization to charge for one or more broadcast programs. In some embodiments, the same antenna is used for the receiver module 2802 and transmitter module 2804. In some embodiments, some of the wireless terminals 2800 do not include a transmitter module 2804.

Routines 2818 include a communications routines 2822 and wireless terminal control routines 2824. The communications routine performs various communications functions and implements the communications protocols used by the wireless terminal 2800. Wireless terminal control routines 2824 include a decoding operation evaluation module 2826, a receiver switching control module 2828, a program segment combining module 2830, a carrier strength monitoring module 2832, and a carrier selection module 2834.

The decoding operation evaluation module 2826 determines if a decoding of a broadcast signal was unsuccessful. Receiver switching control module 2828 controls the receiver module 2802 to switch between carriers, e.g., between a first and second carrier, in response to the decoding operation evaluation module 2826 determining that a decoding operation was unsuccessful. In some embodiments, the same program segments can be recovered from signals transmitted on both a first and second carrier but at different times, and the receiver switching control module 2828 includes switching functionality which switches within a period of time less than a time offset between segment transmission having the same information content.

Program segment combining module 2830 combines program segments generated by decoding signals received on different carriers to generate a presentable copy of a broadcast program being recovered.

Carrier strength monitoring module 2832 checks the strength of received signals, e.g., received beacon and/or pilot signals, indicative of the received strength of first and second carrier signals. Carrier selection module 2834 performs carrier selection operations as a function of the relative received strengths of carriers, e.g., first and second carriers, being used to convey a broadcast program, as determined by the carrier strength monitoring module 2832.

Data/information 2820 includes a plurality of sets of received program buffers (received program buffer for a $1^{st}$ carrier 2836, ..., received program buffer for an Nth carrier 2838, combined program buffer corresponding to received signals from multiple carriers 2840). In some embodiments, the first carrier corresponds to a first base station transmitter and the second carrier corresponds to a second base station transmitter, said first and second base station transmitters being located in adjacent cells or sectors. Received program buffer ($1^{st}$ carrier) 2836 includes received program segment information (segment 1 information 2842, ..., segment M information 2844). Received program buffer ($N^{nd}$ carrier) 2838 includes received program segment information (segment 1 information 2846, ..., segment M information 2848). Received program buffer (multiple carrier) 2840 includes received program segment information (segment 1 information 2850, ..., segment M information 2852). The information in received program buffer ($1^{st}$ carrier) 2836 and the information in received program buffer (Nth carrier) 2828 represents information from receiver module 2802, which may be forwarded to the decoder module 2812. The information in combined program buffer (multiple carriers) 2740 represents a composite of received information from multiple carriers which may be used by decoder module 2712, e.g., to attempt to decode a program segment when the program segment can not be successfully decoded using individually received information corresponding to a first carrier or received information corresponding to a second carrier.

Data/information 2820 also includes a plurality of sets of processed, e.g., decoded, program buffers (processed (decoded) program buffer for a $1^{st}$ carrier 2854, ..., processed (decoded) program buffer for an Nth carrier 2856, processed (decoded) program buffer corresponding to received signals from multiple carriers 2858). Processed, e.g., decoded, program buffer ($1^{st}$ carrier) 2854 includes processed, e.g., decoded, program segment information (segment 1 information 2860, ..., segment M information 2862). Processed, e.g., decoded, program buffer ($N^{th}$ carrier) 2838 includes processed, e.g., decoded, program segment information (segment 1 information 2864, ..., segment M information 2866). Processed, e.g., decoded, program buffer (multiple carrier) 2858 includes processed, e.g., decoded, program segment information (segment 1 information 2868, ..., segment M information 2870). The information in processed (decoded) program buffer ($1^{st}$ carrier) 2856, processed (decoded) program buffer ($N^{th}$ carrier) 2854, and processed (decoded) program buffer (multiple carriers) 2858 represents outputs from decoder module 2812.

Combined program segments corresponding to a program 2872 represent the output of program segment combining module 2830 and represents a composite of decoded program segment information form one or more of buffers 2854, 2856, 2858. For example, at some times information 2872 includes recovered program segments sourced from decoding of information from a single carrier, e.g., segment 1 info 2860, ... segment M info 2862 corresponding to the first carrier. At other times information 2872 includes recovered program segments sourced from decoding of information corresponding to the successful individual decoding of program segments from a plurality of carriers, an individual program segment being recovered from information from a single carrier, e.g., segment 1 info 2860 corresponding to $1^{st}$ carrier and segment M info 2866 corresponding to Nth carrier. At still other times information 2872 includes at least one recovered program segment from at least one of individual processed carrier buffers (2854, . . . 2856) and at least one recovered program segment from processed combined program buffer 2858, e.g., segment 1 info 2858 and segment 1 info 2864. At still other times the segments included in information 2872 is sourced from processed decoded combined program buffer 2858.

Carrier strength information 2876 includes measurements obtained by carrier strength monitoring module 2832, information correlating measured signals with transmit power level information associated with carriers being used by a transmitted, and relative signal strength information. Carrier strength information 2876 is used by carrier selection module 2834.

Currently selected downlink carrier information 2878 includes information identifying the alternative carriers, e.g., two carriers that that the wireless terminal may tune to, e.g., alternatively, to attempt to receive and decode a broadcast program, as well information identifying the current carrier that the wireless terminal has presently tuned its receiver module to, e.g., the one of the two alternative carriers to which receiver module 2802 is currently set to receive a broadcast program segment.

Current base station/sector identification information 2880 includes information identifying the base station, sector, sector type, and/or downlink carrier associated with the alternative base station attachment point transmitters to which the wireless terminal can tune, e.g., alternatively, to receive a selected broadcast program, and information identifying the attachment point transmitter to which the receiver module 2802 is currently tuned to receive a broadcast program segment.

System, e.g., OFDM system, timing/frequency structure information 2882 includes downlink/uplink channel structure information, downlink/uplink carrier information, downlink/uplink tone hopping information, etc. System structure information 2882 includes information identifying traffic channel segments in the downlink channel structure dedicated to broadcast programming.

Programs' directory information 2884 includes information identifying a plurality of different broadcast programs available. Programs' directory information 2884 includes for an individual program information identifying transmitters and carriers used by the transmitter associated with the program, and transmitting timing associated with the segments of the program for the transmitter/carrier combination.

User/device/session/resource information 2874 includes user identification information, e.g., login names, passwords, access information, device identification information, session information including accounting information corresponding to received broadcast programs, and information identifying air link resources used by the wireless terminal to recover the broadcast information.

Figure 29:
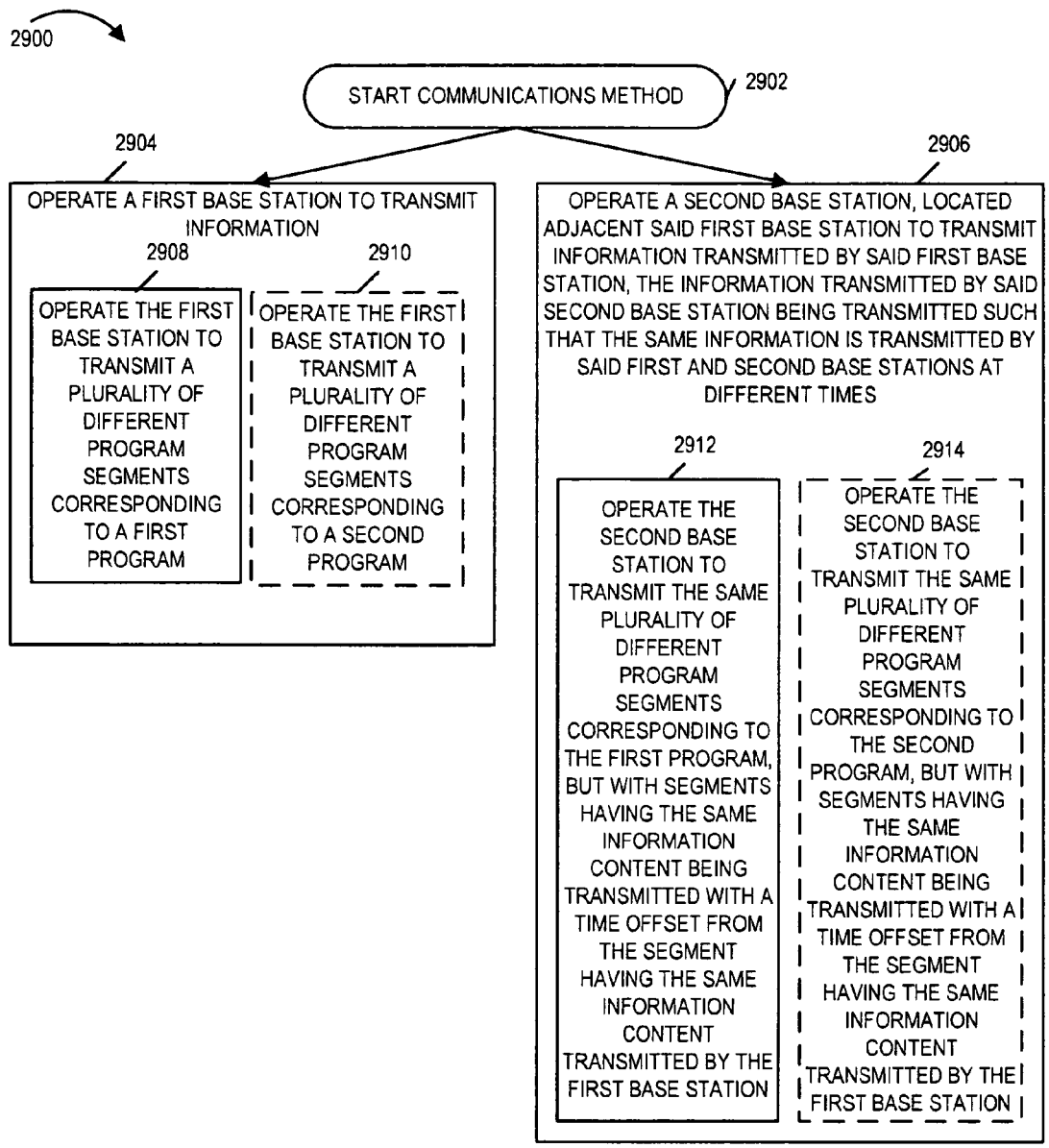
FIG. 29 is a flowchart of an exemplary communications method.

FIG. 29 is a flowchart 2900 of an exemplary communications method. For example, the exemplary communications method may be used in an OFDM communications system including broadcasting of one or more programs, e.g., with a program being sub-divided into program segments. Operation starts in step 2902 where the base stations in the system are powered on and initialized. Operation proceeds from start step 2902 to steps 2904 and 2906.

In step 2904, a first base station is operated to transmit information. Step 2906 includes sub-step 2908. In sub-step 2908, the first base station is operated to transmit a plurality of different program segments corresponding to a first program.

In step 2906, a second base station, located adjacent said first base station, is operated to transmit information transmitted by said first base station, the information transmitted by the second base station being transmitted such that the same information is transmitted by the first and second base stations at different times. Step 2906 includes sub-step 2912. In sub-step 2912, the second base station is operated to transmit the same plurality of different program segments corresponding to the first program but with the segments having the same information content being transmitted with a time offset from the segment having the same information content transmitted by the first base station.

In some embodiments, during at least some times, step 2904 includes sub-step 2910 and step 2906 includes sub-step 2914. In step 2910, the first base station is operated to transmit a plurality of different program segments corresponding to the second program. In step 2914, the second base station is operated to transmit the same plurality of different program segments corresponding to the second program but with the segments having the same information content being transmitted with a time offset from the segment having the same information content transmitted by the first base station.

In various embodiments, the operating the first base station to transmit information includes transmitting the information using a first carrier, and operating the second base station to transmit information includes transmitting the information using a second carrier, said second carrier having a different frequency than the first carrier. In some such embodiments, the first and second base stations transmit said information at different power levels.

In some embodiments, transmitting the information from the first base station includes transmitting the information using at least one OFDM symbol and a cyclic prefix having a cyclic prefix duration, and said first and second base stations are not synchronized to within the cyclic prefix duration.

Figure 30:
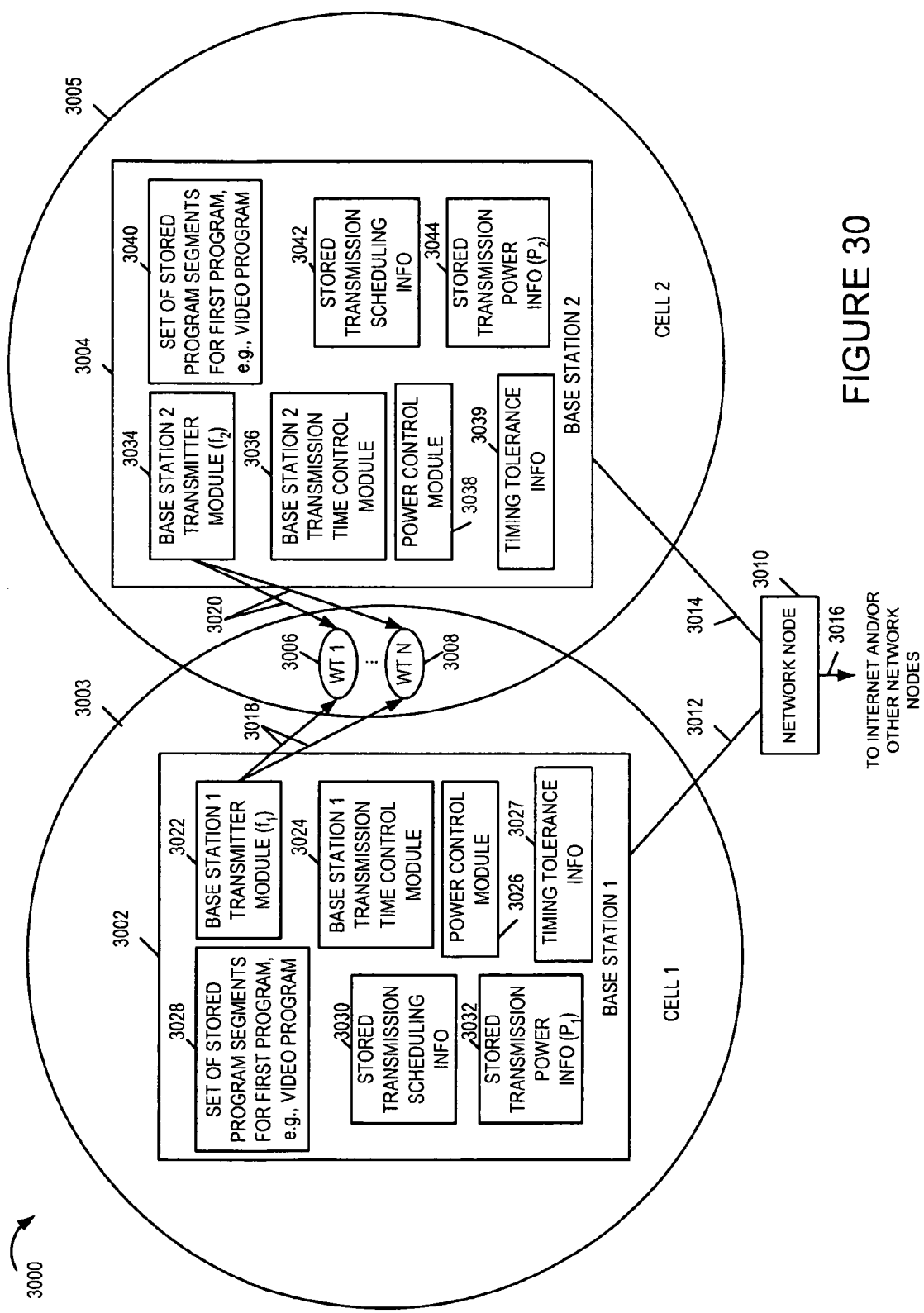
FIG. 30 is a drawing of an exemplary communications system, e.g. an QFDM communications system supporting broadcast of programs.

FIG. 30 is a drawing of an exemplary communications system 3000, e.g. an OFDM communications system supporting broadcast of programs Exemplary communications system 3000 includes a plurality of base stations (base station 1 3002, base station 2 3004), a plurality of wireless terminals, e.g., mobile nodes (wireless terminal 1 3006, . . . , wireless terminal N 3008), and a network node 3010. Base station 1 3002 is a single sector base station having a cellular coverage area of cell 1 3003; base station 2 3004 is a single sector base station having a cellular coverage area of cell 2 3005. Base station 1 3002 and base station 2 3004 are located adjacent one another. The base stations (3002, 3004) are coupled to network node 3010, e.g., a router, via network links (3012, 3014), respectively. Network node is coupled to the Internet and/or other network nodes via network link 3016. Network links (3012, 3014, 3016) are, e.g., fiber optic links or copper wire lines.

The wireless terminals (3006, 3008) communicate with base stations via wireless links. The wireless terminals (3006, 3008) are shown receiving downlink broadcast program signals from the base stations. Base station 1 3002 transmits downlink broadcast program signals 3018 which is received by the wireless terminals (3006, 3008). Base station 2 3004 transmits downlink broadcast program signals 3020 which is received by the wireless terminals (3006, 3008).

Base station 1 3002 includes a transmitter module 3022, a transmission time control module 3024, a power control module 3026, a set of stored program segments for the first program 3028, stored transmission timing scheduling information 3030, stored transmission power information 3032, and timing tolerance information 3027. Base station transmitter 3022, e.g., an OFDM transmitter using carrier frequency $f_1$, transmits information, e.g., information in set of stored program segments for first program, e.g., video program 3028. Transmission time control module 3024 controls the first base station transmitter 3022 to transmit the same information transmitted by the second base station transmitter but with a time difference from transmission by the second transmitter so that portions, e.g., program segments, of the same information which have the same content are transmitted by the first base station transmitter and second base station transmitter at different times. Power control module 3026 controls the first base station transmitter 3022 to transmit information at a first power level, e.g., power level $P_1$.

The stored transmission scheduling information 3030 includes information indicating when program segments corresponding to the first program are to be transmitted by the first base station transmitter 3022 using a first carrier, e.g., $f_1$. Stored transmission power level information 3032 includes information indicating a first transmission power level at which the program segments corresponding to the first program are to be transmitted from the first base station transmitter 3022 using the first carrier, e.g. $P_1$. In various embodiments, the first and second base station transmitters (3022, 3034) are timing synchronized to a level greater than a cyclic prefix duration but less than the transmission timing difference between transmissions by the first base station transmitter and second base station transmitter of portion, e.g., program segments, of the information having the same information content. Timing tolerance information 3027 includes a maximum timing tolerance value being used by timing transmission timing control module 3026, e.g., in regard to the level of synchronization between first and second base station transmitters (3022, 3040).

Base station 2 3004 includes a transmitter module 3034, a transmission time control module 3036, a set of stored program segments for the first program 3040, stored transmission timing scheduling information 3042, stored transmission power information 3044, and timing tolerance information 3039. Base station transmitter 3034, e.g., an OFDM transmitter using carrier frequency $f_2$ where $f_2$ is different from $f_1$, transmits information, e.g., information in set of stored program segments for first program, e.g., video program 3040. Information in set of stored program segments for first program 3040 has the same content as information in the set of stored program segments for first program 3028. Transmission time control module 3036 controls the second base station transmitter 3034 to transmit the same information transmitted by the first base station transmitter but with a time difference from transmission by the first transmitter so that portions, e.g., program segments, of the same information which have the same content are transmitted by the first base station transmitter and second base station transmitter at different times. In some such embodiments, segments from different sources, e.g., base station 1 transmitter 3022 and base station 2 transmitter 3034, conveying the same information are timing controlled such as to be non-overlapping. Power control module 3038 controls the second base station transmitter 3034 to transmit information at a second power level, e.g., power level $P_2$, where $P_2$ is different than $P_1$.

The stored transmission scheduling information 3042 includes information indicating when program segments corresponding to the first program are to be transmitted by the second base station transmitter 3034 using a second carrier, e.g., $f_2$. Stored transmission power level information 3044 includes information indicating a second transmission power level at which the program segments corresponding to the first program are to be transmitted from the second base station transmitter 3044 using the second carrier, e.g. $P_2$. In various embodiments, the first and second base station transmitters (3022, 3034) are timing synchronized to a level greater than a cyclic prefix duration but less than the transmission timing difference between transmissions by the first base station transmitter and second base station transmitter of portion, e.g., program segments, of the information having the same information content. Timing tolerance information 3039 includes a maximum timing tolerance value being used by timing transmission timing control module 3036, e.g., in regard to the level of synchronization between first and second base station transmitters (3022, 3040).

Note, that various embodiments maintain a relatively coarse level of synchronization between adjacent base stations. In some embodiments, the coarse level of transmitter timing synchronization is controlled in the system by a node outside the base stations, e.g., network node 3010. In some embodiments, the base stations 3002, 3004 exchange signaling to coordinate and maintain this coarse level of synchronization. In some embodiments, the base stations, need not, in and various embodiments, do not exchange signaling for the purposes of achieving and/or maintaining this coarse level of synchronization between base stations. In some such embodiments, an individual base station, e.g., base station 3002 uses its own timing reference, e.g., an accurate clock reference signal, and/or an external timing source reference signal to maintain the coarse level of desired timing synchronization between the base stations.

In some other embodiments, the first and second base station transmitters are sector transmitters and at least one of the first and second transmitters are located in a multi-sector cell.

Figure 31:
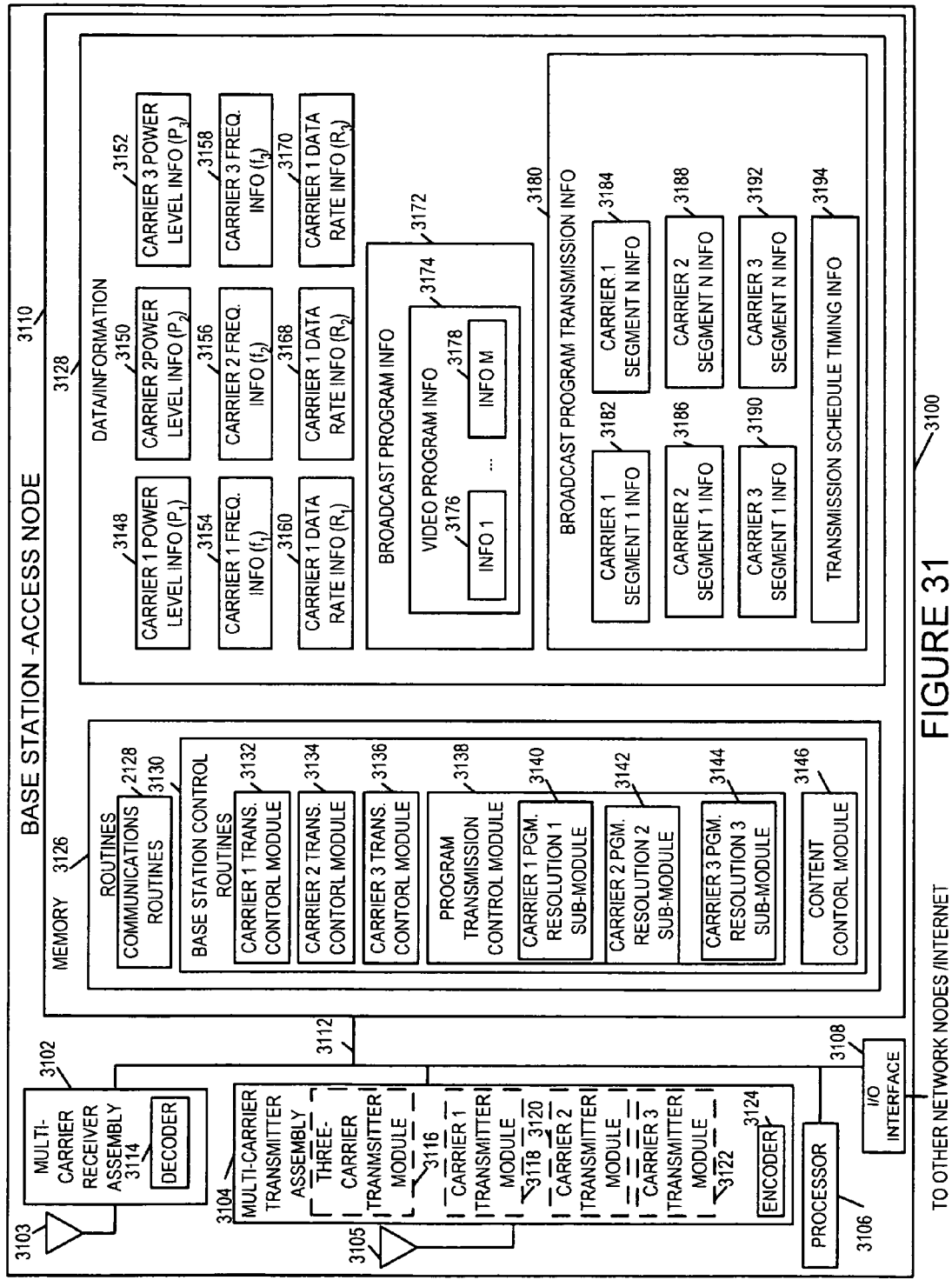
FIG. 31 is a drawing of an exemplary base station, e.g., access node.

FIG. 31 is a drawing of an exemplary base station 3100, e.g., access node. Exemplary base station 3200 includes a multi-carrier receiver assembly 3102, a multi-carrier transmitter assembly 3104, a processor 3106, an I/O interface 3108, and memory 3110 coupled together via a bus 3112 over which the various elements interchange data and information. Memory 3110 includes routines 3126 and data/information 3128. The base station 3100 executes the routines 3126 and uses the data/information 3128 in memory 3110 to control the operation of the base station 3100 and implement methods.

Multi-carrier receiver assembly 3102, e.g., an OFDM receiver assembly, is coupled to a receive antenna 3103 via which the base station 3100 receives uplink signals from wireless terminals. In some embodiments, the received uplink signals include requests for access to broadcast programs, information indicating a user's authorization to charge for a broadcast program, and/or accounting information pertaining to broadcast programmed accessed by a wireless terminal. Receiver assembly 3102 includes a decoder for decoding at least some of the received signals. In some embodiments, e.g., some embodiments where base station 3100 functions solely in a broadcast mode with respect to its wireless interface, receiver assembly 3102 is not included.

Multi-carrier transmitter assembly 3104, e.g., an OFDM multi-carrier transmitter assembly, is coupled to a transmit antenna 3105 via which the base station 3100 transmits downlink signals to wireless terminals, at least some of the transmitted signals include broadcast program signals. Two alternative exemplary embodiments of multi-carrier transmitter module 3104 are illustrated. In a first embodiment, a three carrier transmitter module 3116 is included, while in the second embodiments three separate single carrier transmitter modules are used (carrier 1 transmitter module 3118, carrier 2 transmitter module 3120, carrier 3 transmitter module 3122). For example, if the three-carrier transmitter module 3116 is used, in some embodiments, the three-carrier transmitter module 3116 may generate OFDM symbols including three non-overlapping downlink tones blocks, e.g., an OFDM symbol using 339 tones and including three tone blocks of 113 tones each, each tone block associated with a carrier frequency to be used by the wireless terminal recovering the individual tone block. As another example, in some embodiments, if the three separate carrier transmitter modules (3118, 3120, 3122) are used each OFDM symbol corresponding to a carrier is independently generated and transmitted, e.g., each OFDM symbol using a tone block of 113 tones. Multi-carrier transmitter assembly 3104 also includes encoder module 3124 for encoding at least some of the downlink signals.

I/O interface 3108 is used for coupling the base station 3100 to the Internet and/or to other network nodes, e.g., program content servers, other base stations, routers, security server nodes, accounting nodes, etc.

Routines 3126 include a communications routine 3128 and base station control routines 3130. The communications routines 3128 implement various communications protocols used by the base station 3100 and perform various communications operations, e.g., controlling I/O interface 3108. Base station control routines 3130 include a carrier 1 transmission control module 3132, a carrier 2 transmission control module 3134, a carrier 3 transmission control module 3136, a program transmission control module 3188 and a content control module 3146. The program transmission control module 3138 includes a carrier 1 program resolution level 1 sub-module 3140, a carrier 2 program resolution level 2 sub-module 3142, and a carrier 3 program resolution 3 sub-module 3144.

Carrier 1 transmission control module 3132 control multi-carrier transmitter module 3104 with respect to carrier 1 transmissions, e.g., controlling transmission of program information on carrier $f_1$ at power level $P_1$ at a data rate $R_1$. Carrier 2 transmission control module 3134 control multi-carrier transmitter module 3104 with respect to carrier 2 transmissions, e.g., controlling transmission of program information on carrier $f_2$ at power level $P_2$ at a data rate $R_2$. Carrier 3 transmission control module 3136 controls multi-carrier transmitter module 3104 with respect to carrier 3 transmissions, e.g., controlling transmission of program information on carrier $f_3$ at power level $P_3$ at a data rate $R_3$.

Program transmission control module 3138 operations include controlling the video resolution level corresponding to signals transmitted. Carrier 1 program resolution level 1 sub-module 3140 controls that at least a portion of a video program is transmitted at a first video resolution level on carrier 1. Carrier 2 program resolution level 2 sub-module 3142 controls that at least a portion of a video program is transmitted at a second video resolution level on carrier 2, e.g., a lower resolution level than the resolution level used with respect to carrier 1. Carrier 3 program resolution level 3 sub-module 3144 controls that at least a portion of a video program is transmitted at a third video resolution level on carrier 3.

Content control module 3146 controls the content in broadcast segments corresponding to the different carriers. In some embodiments, content control module 3146 performs operations to include at least some of the same program information on multiple carriers, e.g., a first and second carrier or a first, second and third carrier, but at different resolutions. Content control module 3146 incorporates video program information 3174 into broadcast transmission segments associated with each of the carriers.

Data/information 3128 includes carrier 1 power level information 3148 including information identifying transmission power level $P_1$, carrier 2 power level information 3150 including information identifying transmission power level $P_2$, and carrier 3 power level information 3152 including information identifying transmission power level $P_3$. In various embodiments $P_1$ is not equal to $P_2$ and $P_2$ is not equal to $P_3$.

Data/information 3128 also includes carrier 1 frequency information 3154 including information identifying downlink carrier 1 as $f_1$, carrier 2 power frequency information 3156 including information identifying downlink carrier 2 as $f_2$, and carrier 3 frequency information 3158 including information identifying carrier 3 as $f_3$. In various embodiments $f_1$ is different than $f_2$ and $f_2$ is different from $f_3$. In some such embodiments, a non-overlapping downlink tone block, e.g., OFDM tone block of 113 tones, is associated with each of the three carriers.

Data/information 3128 also includes carrier 1 data rate information 3160 including information identifying $R_1$ as the info data rate to be used for broadcast program segments on carrier 1, carrier 2 data rate information 3168 including information identifying $R_2$ as the info data rate to be used for broadcast program segments on carrier 2, and carrier 3 data rate information 3170 including information identifying $R_3$ as the info data rate to be used for broadcast program segments on carrier 3. In various embodiments $R_1$ is different than $R_2$, and $R_2$ is different from $R_3$.

Data/information 3128 also includes broadcast program information 3172 and broadcast program transmission information 3180. Broadcast program information 3172 includes video program information 3178. Video program information 3174 includes a plurality of information corresponding to a video program (information 1 3176, information M 3178). In various embodiments, the broadcast program information 3172 includes information corresponding to a plurality of different programs. In some embodiments, the broadcast program information 3176 includes audio program information.

Broadcast program transmission information 3180 includes a plurality of sets of information corresponding to carrier 1 (carrier 1 segment 1 information 3182, . . . , carrier 1 segment N information 3184), a plurality of sets of information corresponding to carrier 2 (carrier 2 segment 1 information 3186, . . . , carrier 2 segment N information 3188), a plurality of sets of information corresponding to carrier 3 (carrier 3 segment 1 information 3190, . . . , carrier 3 segment N information 3192) and transmission schedule timing information 3194.

The techniques of various embodiments may be implemented using software, hardware and/or a combination of software and hardware. Various embodiments are directed to apparatus, e.g., mobile nodes such as mobile terminals, base stations, communications system. It is also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus of various embodiments, are applicable to a wide range of communications systems including many non-OFDM and/or non-cellular systems.

Numerous additional variations on the methods and apparatus of various embodiments described above will be apparent to those skilled in the art in view of the above description. Such variations are to be considered within scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the described methods.

What is claimed is:

1. A method operating a wireless terminal, comprising:
receiving a first broadcast signal at a receiver, said first broadcast signal corresponding to a first program on a first carrier;
performing a first decoding operation on the first received broadcast signal;
determining whether said first decoding operation was unsuccessful; and
if it is determined that said decoding operation was unsuccessful, tuning said receiver to a second carrier to obtain a second broadcast signal corresponding to the first program, said second carrier having a frequency which is different from a frequency of said first carrier,
wherein the first and second carriers each broadcast the first program concurrently, and
wherein the respective received broadcasts of the first program in the first and second carriers are deliberately offset from each other in time.

2. The method of claim 1, further comprising:
operating the wireless terminal to receive the second broadcast signal corresponding to the first program on the second carrier.

3. The method of claim 2, further comprising:
performing a decoding operation on the received second broadcast signal.

4. The method of claim 3, further comprising:
determining whether said second decoding operation was unsuccessful; and
if it is determined that said decoding operation was unsuccessful, tuning said receiver to the first carrier.

5. The method of claim 4, further comprising:
switching between the first and second carriers on an ongoing basis if a received signal can not be decoded.

6. The method of claim 1, where the first carrier is associated with a first base station transmitter and the second carrier is associated with a second base station transmitter, said first and second base station transmitters being located in adjacent cells or sectors.

7. The method of claim 1, wherein said first and second broadcast signals include the same program content of the first program but are received at different times such that the second broadcast signal corresponds to a time-delayed version of the first broadcast signal.

8. The method of claim 7, further comprising:
combining the first and second broadcast signals to generate a presentable copy of said first program.

9. The method of claim 1, wherein the first and second broadcast signals contain the same content portion of the first program.

10. The method of claim 1, wherein broadcast signals on the second carrier are each deliberately time-delayed versions of corresponding broadcast signals on the first carrier.

11. A wireless terminal, comprising:
a receiver for receiving broadcast signals associated with a broadcast program and transmitted on first and second carriers, said first and second carriers having different frequencies, wherein the first and second carriers broadcast the broadcast program concurrently, and wherein the respective transmissions of corresponding broadcast signals associated with the broadcast program in the first and second carriers are deliberately offset from each other in time;
a decoder coupled to said receiver for performing decoding operations on the received broadcast signals;

a decoding operation evaluation module for determining whether decoding of a broadcast signal was unsuccessful; and a control module for controlling said receiver to switch receiving said broadcast signals between said first and second carriers in response to said decoding operation evaluation module determining that a decoding operation was unsuccessful.

12. The wireless terminal of claim 11, further comprising:
a program segment combining module for combining program segments generated by decoding signals received on different carriers to generate a presentable copy of said broadcast program.

13. The wireless terminal of claim 11, wherein the same program segments can be recovered from signals transmitted on both the first and second carriers but at different times, said control module including switching functionally which switches within a period of time which is less than a time offset between segment transmission having the same information content.

14. The wireless terminal of claim 12, further comprising:
a carrier strength monitoring module for checking the strength of signals indicative of the received strength of said first and second carrier signals; and a carrier selection module for performing a carrier selection operation as a function of the relative received strengths of the first and second carriers as determined by the carrier strength monitoring module.

15. The wireless terminal of claim 12, wherein said receiver is a single carrier receiver capable of receiving a single carrier at a time.

16. The wireless terminal of claim 11, where the first carrier is associated with a first base station transmitter and the second carrier is associated with a second base station transmitter, said first and second base station transmitters being located in adjacent cells or sectors.

17. A wireless terminal, comprising:
receiver means for receiving broadcast signals associated with a broadcast program and transmitted on first and second carriers, said first and second carriers having different frequencies, wherein the first and second carriers broadcast the broadcast program concurrently, and wherein the respective transmissions of corresponding broadcast signals associated with the broadcast program in the first and second carriers are deliberately offset from each other in time;

decoder means coupled to said receiver for performing decoding operations on the received broadcast signals;

decoding operation evaluation means for determining whether decoding of a broadcast signal was unsuccessful; and control means for controlling said receiver to switch between said first and second carriers in response to said decoding operation evaluation module determining that a decoding operation was unsuccessful.

18. The wireless terminal of claim 17, further comprising:
program segment combining means for combining program segments generated by decoding signals received on different carriers to generate a presentable copy of said broadcast program.

19. The wireless terminal of claim 17, wherein the same program segments can be recovered from signals transmitted on both the first and second carriers but at different times, said control means including means for switching between the first and second carriers within a period of time which is less than a time offset between segment transmission having the same information content.

20. The wireless terminal of claim 18, further comprising:
carrier strength monitoring means for checking the strength of signals indicative of the received strength of said first and second carrier signals; and a carrier selection means for performing a carrier selection operation as a function of the relative received strengths of the first and second carriers as determined by the carrier strength monitoring module.

21. A non-transitory computer readable medium embodying instructions which, in response to being executed by a processor direct said processor to:
operate a wireless terminal to:
receive at a receiver a first broadcast signal corresponding to a first program on a first carrier;
perform a first decoding operation on the first received broadcast signal;
determine whether said first decoding operation was unsuccessful; and
if it is determined that said decoding operation was unsuccessful, tune said receiver to a second carrier to obtain a second broadcast signal corresponding to the first program, said second carrier having a frequency that is different from a frequency of said first carrier,
wherein the first and second carriers each broadcast the first program concurrently, and
wherein the respective received broadcasts of the first program in the first and second carriers are deliberately offset from each other in time.

22. The non-transitory computer readable medium of claim 21, wherein said instructions, in response to being executed by said processor, further direct said processor to:
operate the wireless terminal to receive the second broadcast signal corresponding to the first program on the second carrier.

23. The non-transitory computer readable medium of claim 22, wherein said instructions, in response to being executed by said processor, further direct said processor to:
operate the wireless terminal to perform a decoding operation on the received second broadcast signal.

24. The non-transitory computer readable medium of claim 23, wherein said instructions, in response to being executed by said processor, further direct said processor to:
operate the wireless terminal to:
determine whether said second decoding operation was unsuccessful; and
if it is determined that said decoding operation was unsuccessful, tune said receiver to the first carrier.

25. The non-transitory computer readable medium of claim 24, wherein said instructions, in response to being executed by said processor, further direct said processor to:
operate the wireless terminal to switch between the first and second carriers on an ongoing basis when a received signal cannot be decoded.

\* \* \* \* \*